US008806534B2

(12) United States Patent
Beadle et al.

(10) Patent No.: US 8,806,534 B2
(45) Date of Patent: *Aug. 12, 2014

(54) SYSTEM AND METHOD FOR CREATING AND USING A SMART CHANNEL TUNER LIST

(75) Inventors: Edward R. Beadle, Melbourne, FL (US); John L. DeLay, Mason, OH (US)

(73) Assignee: Imagine Communications Corp., Englewood, CO (US)

( * ) Notice: Subject to any disclaimer, the term of this patent is extended or adjusted under 35 U.S.C. 154(b) by 1504 days.

This patent is subject to a terminal disclaimer.

(21) Appl. No.: 11/812,773

(22) Filed: Jun. 21, 2007

(65) Prior Publication Data

US 2008/0320517 A1 Dec. 25, 2008

(51) Int. Cl.
*G06F 3/00* (2006.01)
*G06F 13/00* (2006.01)
*H04N 21/482* (2011.01)

(52) U.S. Cl.
CPC ............................... *H04N 21/4826* (2013.01)
USPC .......................................................... 725/46

(58) Field of Classification Search
None
See application file for complete search history.

(56) References Cited

U.S. PATENT DOCUMENTS

| | | | |
|---|---|---|---|
| 5,900,916 A | 5/1999 | Pauley | |
| 5,933,192 A * | 8/1999 | Crosby et al. | 375/240.25 |
| 6,359,661 B1 | 3/2002 | Nickum | |
| 6,421,067 B1 | 7/2002 | Kamen et al. | |
| 6,438,752 B1 | 8/2002 | McClard | |
| 6,446,261 B1 | 9/2002 | Rosser | |
| 6,481,011 B1 | 11/2002 | Lemmons | |
| 6,563,515 B1 | 5/2003 | Reynolds et al. | |
| 6,618,858 B1 | 9/2003 | Gautier | |
| 6,927,806 B2 * | 8/2005 | Chan | 348/731 |
| 6,934,964 B1 | 8/2005 | Schaffer et al. | |
| 6,968,565 B1 | 11/2005 | Slaney et al. | |
| 6,980,977 B2 | 12/2005 | Hoshi et al. | |
| 7,120,922 B2 | 10/2006 | Rodriguez et al. | |
| 7,260,823 B2 * | 8/2007 | Schlack et al. | 725/9 |
| 7,373,650 B1 | 5/2008 | Rodriguez et al. | |
| 7,434,244 B2 | 10/2008 | Popov et al. | |
| 2001/0030644 A1 | 10/2001 | Allport | |

(Continued)

FOREIGN PATENT DOCUMENTS

EP 1653734 A1 5/2006

OTHER PUBLICATIONS

International Searching Authority, International Search Report in related International Application No. PCT/US2008/067486, mailed Jan. 29, 2009, p. 1-4.

*Primary Examiner* — Nathan Flynn
*Assistant Examiner* — Omar S Parra
(74) *Attorney, Agent, or Firm* — Tarolli, Sundheim, Covell & Tummino LLP

(57) ABSTRACT

Systems and/or methods are disclosed herein to identify a user interacting with a content presentation system, adaptively learn, in a passive manner, a user's pattern of accessing content over time, and globally store the user's identifying and use information. Specifically, disclosed are systems and/or methods for creating a smart channel tuner list, including determining an identity of a user interacting with a content presentation system, collecting channel switching information from the first channel to each of a plurality of second channels from the user's interaction with the content presentation system, determining a value for each of the plural second channels as a function of the channel switching information, and creating a smart channel tuner list as a function of the determined value.

73 Claims, 73 Drawing Sheets

(56) References Cited

U.S. PATENT DOCUMENTS

| | | | |
|---|---|---|---|
| 2001/0051996 A1 | 12/2001 | Cooper et al. | |
| 2002/0059588 A1 | 5/2002 | Huber et al. | |
| 2002/0083434 A1 | 6/2002 | Bacso et al. | |
| 2002/0104081 A1 | 8/2002 | Candelore et al. | |
| 2002/0124182 A1 | 9/2002 | Bacso et al. | |
| 2002/0129368 A1 | 9/2002 | Schlack et al. | |
| 2002/0152117 A1 | 10/2002 | Cristofalo et al. | |
| 2002/0166122 A1 | 11/2002 | Kikinis et al. | |
| 2002/0184652 A1 | 12/2002 | Cezeaux | |
| 2002/0188948 A1 | 12/2002 | Florence | |
| 2002/0199188 A1 | 12/2002 | Sie et al. | |
| 2003/0014752 A1 | 1/2003 | Zaslavsky et al. | |
| 2003/0018972 A1 | 1/2003 | Arora | |
| 2003/0018973 A1* | 1/2003 | Thompson | 725/47 |
| 2003/0028872 A1 | 2/2003 | Milovanovic et al. | |
| 2003/0084448 A1 | 5/2003 | Soundararajan | |
| 2003/0110491 A1 | 6/2003 | Rodriguez et al. | |
| 2003/0110500 A1 | 6/2003 | Rodriguez et al. | |
| 2003/0115589 A1 | 6/2003 | D'Souza | |
| 2003/0149574 A1 | 8/2003 | Rudman | |
| 2003/0220091 A1 | 11/2003 | Farrand et al. | |
| 2003/0237093 A1 | 12/2003 | Marsh | |
| 2004/0001081 A1 | 1/2004 | Marsh | |
| 2004/0003399 A1 | 1/2004 | Cooper | |
| 2004/0111741 A1 | 6/2004 | DePietro | |
| 2004/0177370 A1 | 9/2004 | Dudkiewicz | |
| 2004/0189879 A1 | 9/2004 | Read | |
| 2005/0055713 A1 | 3/2005 | Lee et al. | |
| 2005/0144637 A1* | 6/2005 | Shikata et al. | 725/35 |
| 2005/0216951 A1 | 9/2005 | MacInnis | |
| 2005/0229221 A1 | 10/2005 | Kerofsky et al. | |
| 2005/0240959 A1 | 10/2005 | Kuhn et al. | |
| 2005/0278743 A1 | 12/2005 | Flickinger et al. | |
| 2005/0289596 A1 | 12/2005 | Ku et al. | |
| 2006/0020973 A1 | 1/2006 | Hannum et al. | |
| 2006/0031882 A1 | 2/2006 | Swix et al. | |
| 2006/0064716 A1 | 3/2006 | Sull et al. | |
| 2006/0107281 A1 | 5/2006 | Dunton | |
| 2007/0083892 A1* | 4/2007 | Yun et al. | 725/39 |
| 2007/0083895 A1 | 4/2007 | McCarthy | |
| 2007/0143808 A1* | 6/2007 | Agrawal et al. | 725/119 |
| 2007/0156589 A1* | 7/2007 | Zimler et al. | 705/51 |
| 2007/0157220 A1 | 7/2007 | Cordray et al. | |
| 2007/0162502 A1 | 7/2007 | Thomas et al. | |
| 2007/0198435 A1 | 8/2007 | Siegal et al. | |
| 2008/0178210 A1 | 7/2008 | Casement et al. | |
| 2008/0244665 A1* | 10/2008 | Bowen et al. | 725/83 |
| 2009/0260037 A1 | 10/2009 | Knudson | |

\* cited by examiner

SYSTEM AND METHOD FOR CREATING AND USING A SMART CHANNEL TUNER LIST

CROSS-REFERENCE TO RELATED APPLICATIONS

Cross-reference is made to the following concurrently-filed patent applications, the specification of each being hereby incorporated herein in its entirety: application Ser. No. 11/812,781 filed on Jun. 21, 2007 entitled "System and Method for Biometric Identification Using Portable Interface Device for Content Presentation System"; application Ser. No. 11/812,779 filed on Jun. 21, 2007 entitled "System and Method for a Passively-Adaptive Preferred Channel List"; application Ser. No. 11/812,780 filed on Jun. 21, 2007 entitled "System and Method for Networking Data Collection Devices for Content Presentation Systems"; application Ser. No. 11/812,783 filed on Jun. 21, 2007 entitled "System and Method for Creating and Using a Smart Electronic Programming Guide"; and application Ser. No. 11/812,782 filed on Jun. 21, 2007 entitled "System and Method for Picture-in-Picture Assisted Time-Adaptive Surfing for a Content Presentation System".

BACKGROUND

There is a vast and growing industry dedicated to gathering, organizing, and presenting media content to consumers (viewers and/or users) of information such as news, entertainment, sports, emergency alerts, advertisements, and other subject matter. This industry is supplying information to consumers at an ever-increasing rate. This overabundance of information will soon surpass the standard methods consumers use to sift through the information to access the information that is desired. For example, serially switching channels on a television from one channel number to the next highest (or lowest) channel number is inefficient, frustrating, and time-consuming. The problem becomes exacerbated as the number of available television channels increases. The typical television viewer normally is not interested in viewing any but a small fraction of the available channels and the need to "surf" through a huge number of channels to reach a desired channel makes the viewing experience less than optimal. Even jumping to a particular channel (e.g., by entering the channel number into a remote control device) becomes problematic since the viewer must remember the channel number, manage the rearrangement of channels which may change from time-to-time as distributors rearrange their channel assignments to accommodate new programming and/or remove old programming, and associate desired content with completely different channel numbers if the viewer travels to a different geographic location. This problem is in no way limited to television viewing as is evident by the increase in the number of terrestrial radio stations as well as the advent of satellite radio "stations" with their large number of channels dedicated to particular musical, informational, or "talk radio" content. Similarly, for example, media content presented to consumers via the internet is continually expanding and the consumer is presented with comparable problems. A further example is a music-playing device, such as a personal portable music player for which the consumer can add/delete content at will. There are also other means of communication for which the need to manage the flow of information is becoming necessary.

Furthermore, current systems for interfacing with a content presentation system (e.g., a television, a radio, an internet-connected device, a music playing device, a portable entertainment device, a personal digital assistant, a cellular phone/information system, and combinations thereof) may not have the means to identify the user nor present content for which the identified user is most likely seeking access. Those systems that do require that the user actively input information into the system. Additionally, current interfacing systems do not share their information with other interfacing systems but rather are slaved to a particular content presentation system.

The present disclosure overcomes the above-mentioned limitations in existing systems by disclosing, among other things, systems and/or methods to identify a user interacting with a content presentation system, adaptively learn, in a passive manner, a user's pattern of accessing content over time, and globally store the user's identifying and use information.

According to one embodiment, the present disclosure relates to a novel method for creating a smart channel tuner list, including determining an identity of a user interacting with a content presentation system, collecting channel switching information from the first channel to each of a plurality of second channels from the user's interaction with the content presentation system, determining a value for each of the plural second channels as a function of the channel switching information, and creating a smart channel tuner list as a function of the determined value.

According to another embodiment, the present disclosure relates to a novel system for creating a smart channel tuner list, including circuitry for determining an identity of a user interacting with a content presentation system, circuitry for collecting channel switching information from the first channel to each of a plurality of second channels from the user's interaction with the content presentation system, circuitry for determining a value for each of the plural second channels as a function of the channel switching information, and circuitry for creating a smart channel tuner list as a function of the determined value.

According to yet another embodiment, the present disclosure relates to a novel method for switching from a first channel provided by a content provider to a second channel provided by the content provider, including determining an identity of a user interacting with a content presentation system, collecting channel switching information from the first channel to each of a plurality of second channels from the user's interaction with the content presentation system, determining a value for each of the plural second channels as a function of the channel switching information, and switching from the first channel to one of the second channels as a function of the determined value.

According to still another embodiment, the present disclosure relates to a novel system for switching from a first channel provided by a content provider to a second channel provided by the content provider, including circuitry for determining an identity of a user interacting with a content presentation system, circuitry for collecting channel switching information from the first channel to each of a plurality of second channels from the user's interaction with the content presentation system, circuitry for determining a value for each of the plural second channels as a function of the channel switching information, and circuitry for switching from the first channel to one of the second channels as a function of the determined value.

These and many other advantages of the present disclosure will be readily apparent to one skilled in the art to which the disclosure pertains from a perusal of the claims, the appended drawings, and the following detailed description.

DETAILED DESCRIPTION

Figure 1:
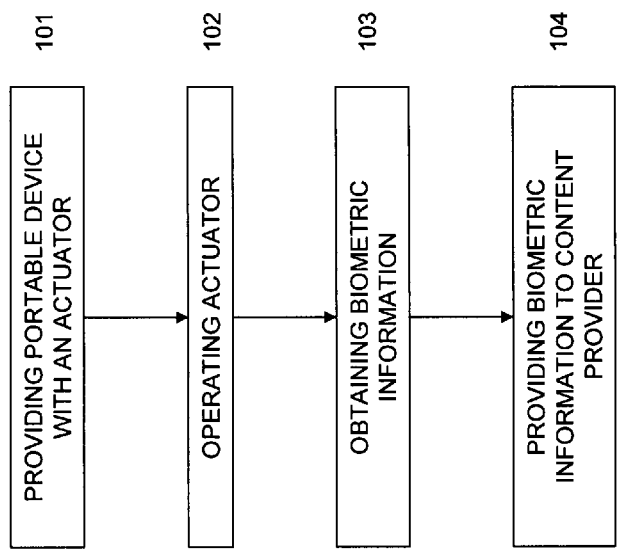
FIG. 1 is a flow diagram for identifying a viewer of a content presentation system according to an embodiment of the disclosure.

With reference now to FIG. 1, a flow diagram is shown for a method for identifying a viewer of a content presentation system according to an embodiment of the disclosure. The viewer may be a television viewer, a user of a system (e.g., a computerized system), a radio or music listener, or other similar consumer of information. At block 101, a portable device with an actuator is provided. The portable device may be akin to a remote control device which controls, for example, a television. The actuator may be a button on the remote control which, when operated by the viewer, changes a state of the content presentation system from off to on. An alternative arrangement is that the actuator may be a button which, when operated by the viewer, causes the content presentation system to switch from presenting to the viewer a first received signal from a content provider to presenting to the viewer a second received signal from the content provider. Alternatively, the actuator may be a scanner, a touch pad, a voice recognition device, an eye scanning device, a keypad for entering a password or code, etc. The first and/or second received signal may be a television signal on a television channel. In other words, the received signal conveys information from a television transmitter, a radio transmitter, a cable transmitter, an internet content provider, etc., to be consumed by the viewer.

The portable device is used to interact with a content presentation system, such as a television, a radio, an internet-connected device, a music playing device, a portable entertainment device, a personal digital assistant, a cellular phone/information system, and combinations thereof. The content presentation system is operatively connected to a content provider, such as one or more broadcasters, one or more cable television systems, one or more magnetic storage devices, one or more optical storage devices, one or more electronic storage devices, and combinations thereof.

The actuator is operable by the viewer for interacting with the content presentation system via the portable device, and the actuator and/or the portable device includes circuitry and/or software for obtaining biometric information from the viewer. The biometric information may be a fingerprint, for example a fingerprint from the finger depressing the actuator. In other embodiments, the biometric information may be obtained through voice recognition, input of a password or unique code, an eye scan, or other methods for obtaining biometric information from the viewer. At step 102, the actuator is operated by the viewer. At step 103, biometric information from the viewer is obtained via said actuator or other method as described above. At step 104, the obtained biometric information is provided to the content provider. In an embodiment, the obtained biometric information is provided to the content provider via a transmission path between the content provider and the content presentation system where the transmission path also carries said first received signal. As a nonlimiting example, the transmission path may be a wired, wireless, optical, or other transmission path over which may be traversed by both the first received signal and a signal carrying the biometric information.

Figure 2:
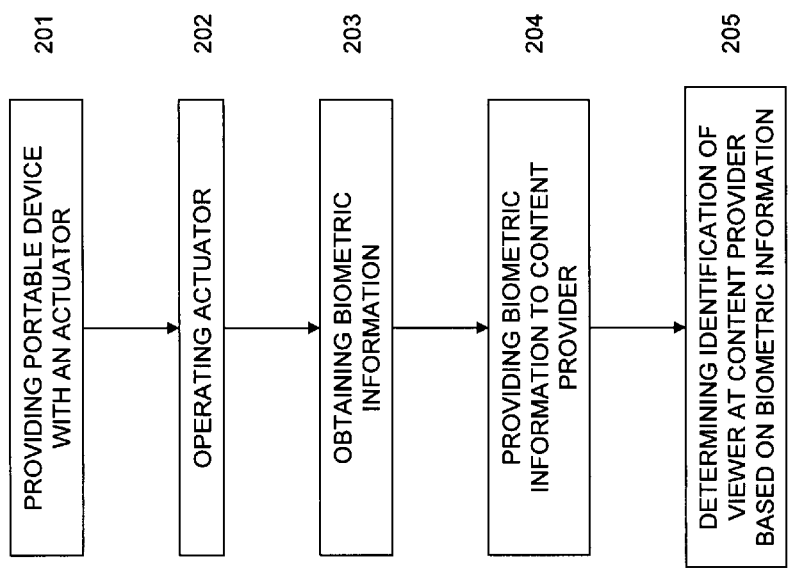
FIG. 2 is a flow diagram for identifying a viewer of a content presentation system according to an embodiment of the disclosure.

With reference now drawn to FIG. 2, a flow diagram is presented of a method for identifying a viewer of a content presentation system according to an embodiment of the disclosure. Blocks 201, 202, 203, and 204 correspond to blocks 101, 102, 103, and 104 of FIG. 1, respectively. At block 205, an identification of said viewer is determined at the content provider where the identification is based on the provided biometric information of the viewer. The determining of the identification of the viewer may include comparing the provided biometric information with a pre-existing database of biometric information. Once the content provider associates the provided biometric information with a set of stored biometric information, the content provider is aware the identity of the viewer and can supply the viewer with information tailored to his/her specific viewing habits/preferences, as will be described in further detail below.

Figure 3:
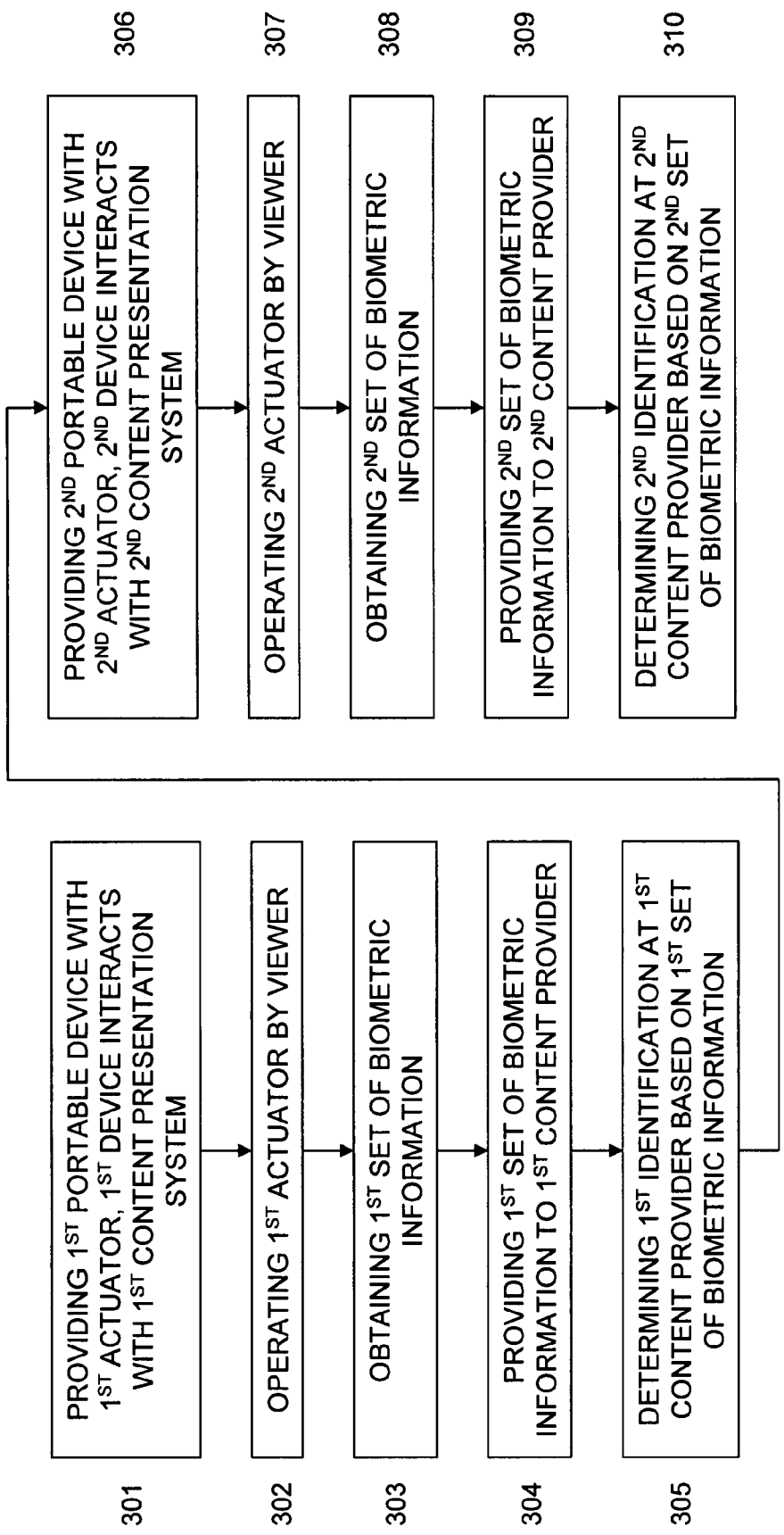
FIG. 3 is a flow diagram for identifying a viewer of a content presentation system according to an embodiment of the disclosure.

Attention is now drawn to FIG. 3 where a flow diagram is presented for identifying a viewer of a content presentation system according to an embodiment of the disclosure. At block 301 a portable device is provided which is capable of interacting with a first content presentation system that is operatively connected to a first content provider. The portable device includes a first actuator which is operable by the viewer for interacting with the first content presentation system via the first device. The first actuator includes first circuitry for obtaining a first set of biometric information from the viewer, as discussed above. It shall be understood by those of skill in the art that a reference to "circuitry" shall include hardware, software, firmware, printed circuits, integrated circuits, any combinations of the foregoing as well as any equivalents thereof as is known in the art. At block 302, the first actuator is operated by the viewer and at block 303 a first set of biometric information is obtained from the viewer via the first actuator as previously described. At block 304, the obtained first set of biometric information is provided to the first content provider where, at block 305, a determination is made at the first content provider of a first identification of the viewer. This determination is based, at least in part, on the provided first set of biometric information.

At block 306, a second portable device is provided to interact with a second content presentation system. The second content presentation system is operatively connected to a second content provider. The second device includes a second actuator which, like the first actuator mentioned in reference to block 301, is operable by the viewer for interacting with, in this case, the second content presentation system via the second device. The second actuator includes second circuitry for obtaining a second set of biometric information from the viewer. At block 307, the viewer operates the second actuator which may occur at a point in time after the viewer's operation of the first actuator associated with the first portable device. Upon operation of the second actuator, a second set of biometric information from the viewer is obtained at block 308. At block 309, the obtained second set of biometric information is provided to the second content provider, and at block 310 a second identification of the viewer based at least in part on the provided second set of biometric information is obtained at the second content provider. In an embodiment, the first and second portable devices may be the same and/or the first and second content providers may be the same.

Figure 4:
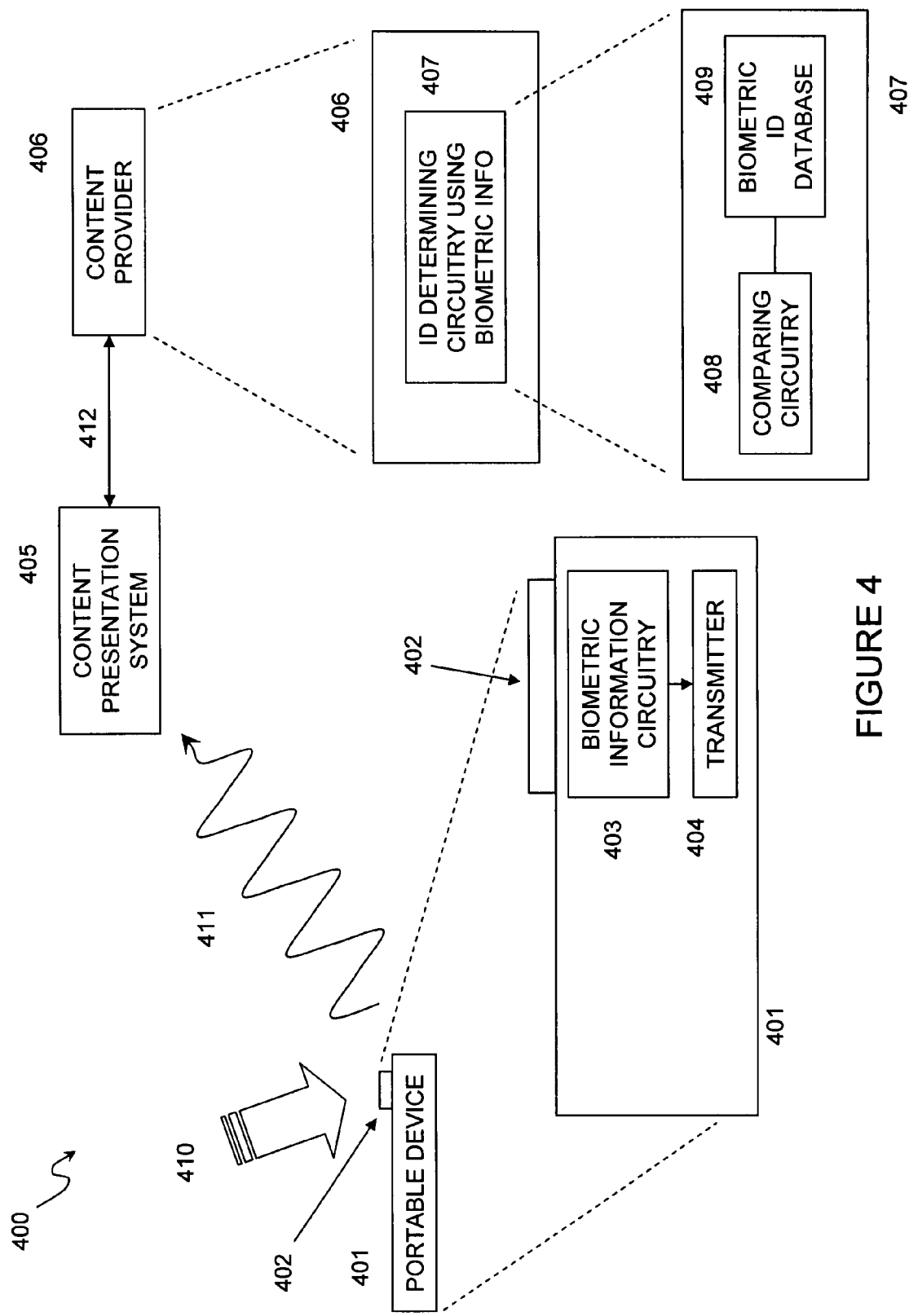
FIG. 4 is a block diagram of a system for identifying a viewer of a content presentation system according to an embodiment of the disclosure.

With attention now directed towards FIG. 4, a block diagram is shown representative of a system for identifying a viewer of a content presentation system according to an embodiment of the disclosure. In an embodiment, the system 400 may include a portable device 401 which can be used for interacting, typically (but not necessarily) wirelessly as indicated at 411, with a content presentation system 405 which is operatively connected to a content provider 406 via a transmission path 412. The transmission path 412 may be wired, wireless, optical, acoustic, or any other typical transmission path. The portable device 401 may include an actuator 402 which is operable 410 by the viewer for interacting with the content presentation system 405 via the portable device. The portable device 401 may include circuitry 403 for obtaining biometric information from the viewer upon operation 410 of the actuator 402 and may further include circuitry 404 for providing the obtained biometric information to the content provider 406, typically via the content presentation system 405 and transmission path 412. As discussed above, the transmission path 412 may also carry signals, such as, but not limited to, television signals between the content presentation system 405 and the content provider 406. As stated above, the content provider 406 may include one or more broadcasters, one or more cable television systems, one or more magnetic storage devices, one or more optical storage devices, one or more electronic storage devices, and similar devices and/or combinations thereof. The content presentation system 405 may comprise a television, a radio, an internet-connected device, a music playing device, a portable entertainment device, a personal digital assistant, a cellular phone/information system, and similar devices and/or combinations thereof.

The content provider 406 may include a determining circuit 407 at the content provider 406 for determining an identification of the viewer based on the provided biometric information. Furthermore, the determining circuit 407 may include circuitry 408 for comparing the provided biometric information with a pre-existing database 409 of biometric information. The database 409 may include biometric information previously gathered from the viewer as well as biometric information for other viewers.

Figure 5:
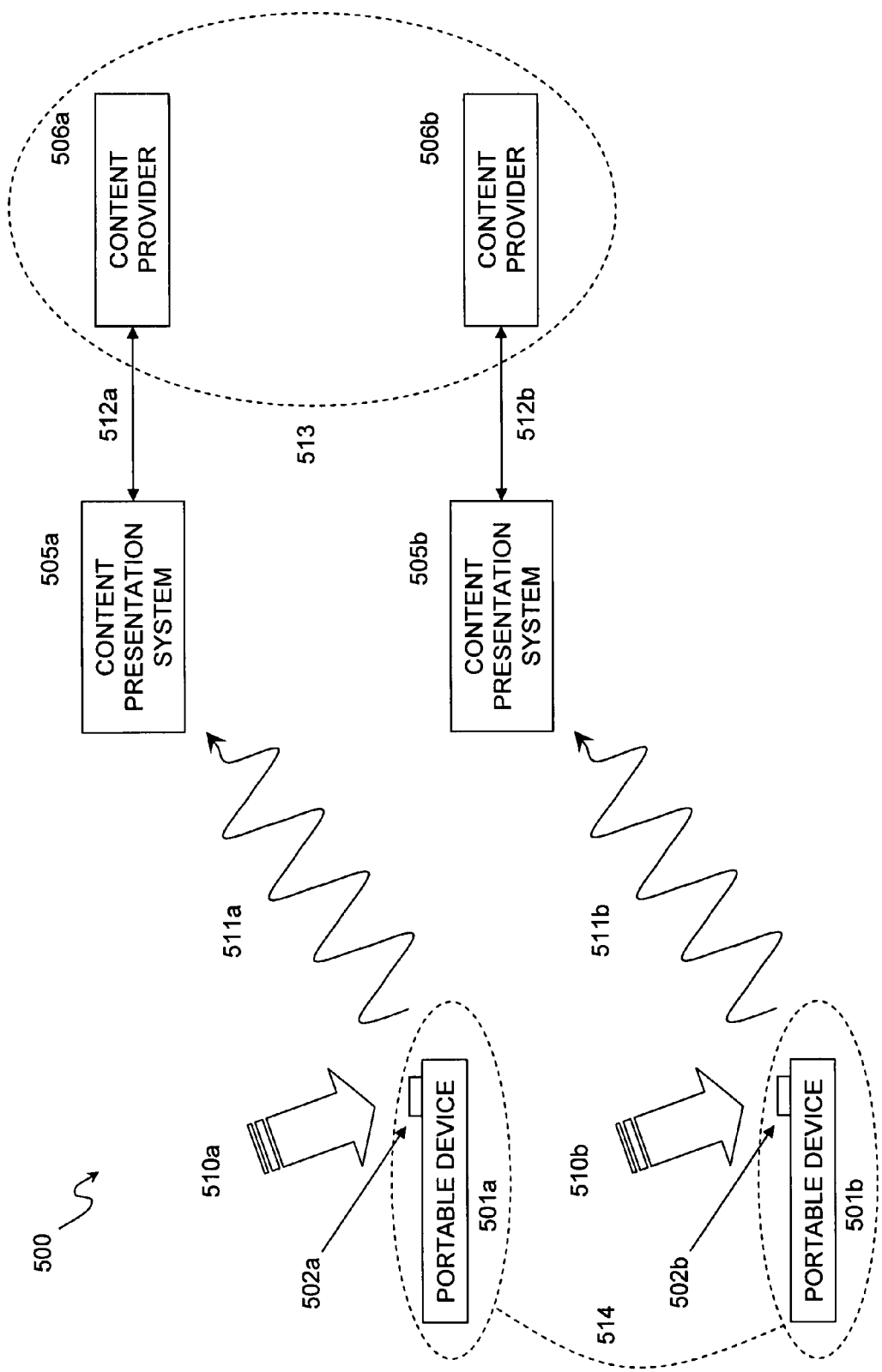
FIG. 5 is a block diagram of a system for identifying a viewer of a content presentation system according to an embodiment of the disclosure.

FIG. 5 is a block diagram of a system for identifying a viewer of a content presentation system according to an embodiment of the disclosure. In an embodiment, the system 500 may include a first portable device 501a, which may be similar to the portable device 401 described above, for interacting by either a wired, wireless, optical, acoustic, etc. path 511a with a first content presentation system 505a, which may be similar to the content presentation system 405 described above, that is operatively connected via transmission path 512a to a first content provider 506a, which may be similar to the content provider 406 described above. The first portable device 501a may include a first actuator 502a which is typically operable 510a by the viewer, as described above, for interacting with the first content presentation system 505a via the first device.

The system 500 may also include a second portable device 501b for interacting via transmission path 511b with a second content presentation system 505b that is operatively connected via transmission path 512b to a second content provider 506b. The second device 501b may include a second actuator 502b which is operable 510b by the viewer for interacting with the second content presentation system 505b via the second device. As may be obvious to one of skill in the art, the following devices may be similar, respectively: portable devices 501a and 501b, actuators 502a and 502b, transmission paths 511a and 511b, content presentation systems 505a and 505b, and content providers 506a and 506b. In other embodiments, portable devices 501a and 501b may be the same device, as indicated at 514, and/or content providers 506a and 506b may be the same, as indicated at 513.

One of skill in the art will recognize that when the portable devices 501a and 501b are the same, a viewer could use, for example, a single remote control device to control both content presentation systems 505a and 505b which may be, for example, a television in one room of the viewer's house and a radio in another room of the viewer's house. As another example, the content presentation system 505a may be a television in the viewer's house and the content presentation system 505b may be a television in a hotel in a different city than the city in which the viewer's house is located. Additionally, when the content providers 506a and 506b are the same, or when information is shared between them, it is recognized that the biometric information and, therefore, the identity and viewing preferences of the viewer can be accessed and put to use regardless of the location of the viewer and/or the content presentation system through which the user is interacting.

Figure 6:
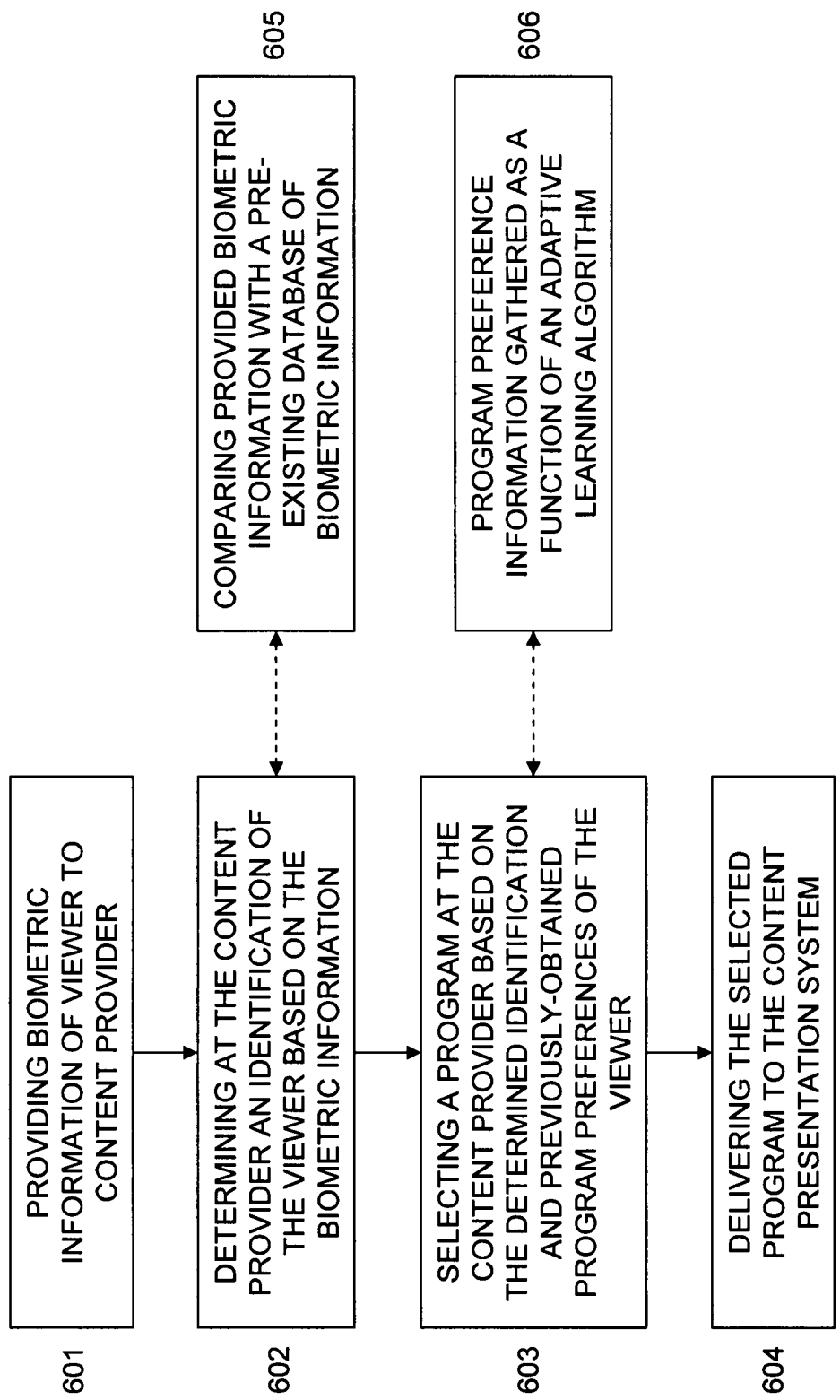
FIG. 6 is a flow diagram for interacting with a viewer of a content presentation system according to an embodiment of the disclosure.

With attention now directed towards FIG. 6, a flow diagram is presented for interacting with a viewer of a content presentation system according to an embodiment of the disclosure. At block 601a content provider is provided with biometric information of the viewer which may be obtained through the use of a portable device, as described above. The portable device may include an actuator which is operable by the viewer for interacting with a content presentation system via the portable device. The actuator may include circuitry for obtaining the biometric information from the viewer, as described above. At block 602, an identification of the viewer based on the provided biometric information may be determined preferably at the content provider and at block 603 the content provider may then select a program based on the determined identification of the viewer and, in an embodiment, on previously-obtained information regarding program preferences of the viewer. In a further embodiment, at block 604 the selected program is delivered to the content presentation system. The program may include a television program, a radio program, a music program, a new program, a sports program, or any other informational content.

The determining of the identification of the viewer at block 602 may include comparing the provided biometric information with a pre-existing database of biometric information, as indicated at block 605. In an embodiment, the information regarding program preferences of the viewer at block 603 may be gathered as a function of an adaptive learning algorithm applied to a viewing pattern of the viewer, as indicated at block 606. The adaptive learning algorithm may be any typical adaptive learning algorithm that is suitable to this task. Typical adaptive learning algorithms will be described below. This information regarding program preferences of the viewer may be gathered without the viewer actively providing data regarding the viewing pattern. In other words, the viewer need not specifically enter program preference information into, for example a computer program. Rather, the normal activity of the viewer for accessing programs (e.g., changing television channels, radio stations, etc.) is captured and processed to obtain the viewer's program preference information. This will be described in more detail below. In an embodiment, the adaptive learning algorithm may operate over a predetermined time interval, and may weigh a recent viewing pattern of the viewer more heavily than an older viewing pattern of the viewer. In a further embodiment, the adaptive learning algorithm may operate over a predetermined time interval that constitutes a sliding window, as is known in the art. For example, the sliding window may comprise a predetermined number of viewing cycles of the viewer, a predetermined number of hours, days, weeks, etc., or any other useful window. In one embodiment, the sliding window may comprise a seven day interval where the seven days includes the current day and the six immediately previous days. In another embodiment, the sliding window may comprise every Tuesday in a one month interval where the one month interval begins on the current day. Additionally, in an embodiment, the adaptive learning algorithm may weigh a recent viewing pattern of the viewer more heavily than an older viewing pattern of the viewer. Alternatively, the adaptive learning algorithm may retain most or all of the viewer's viewing history and more heavily weight the information that is closest in time to the current time.

Figure 7:
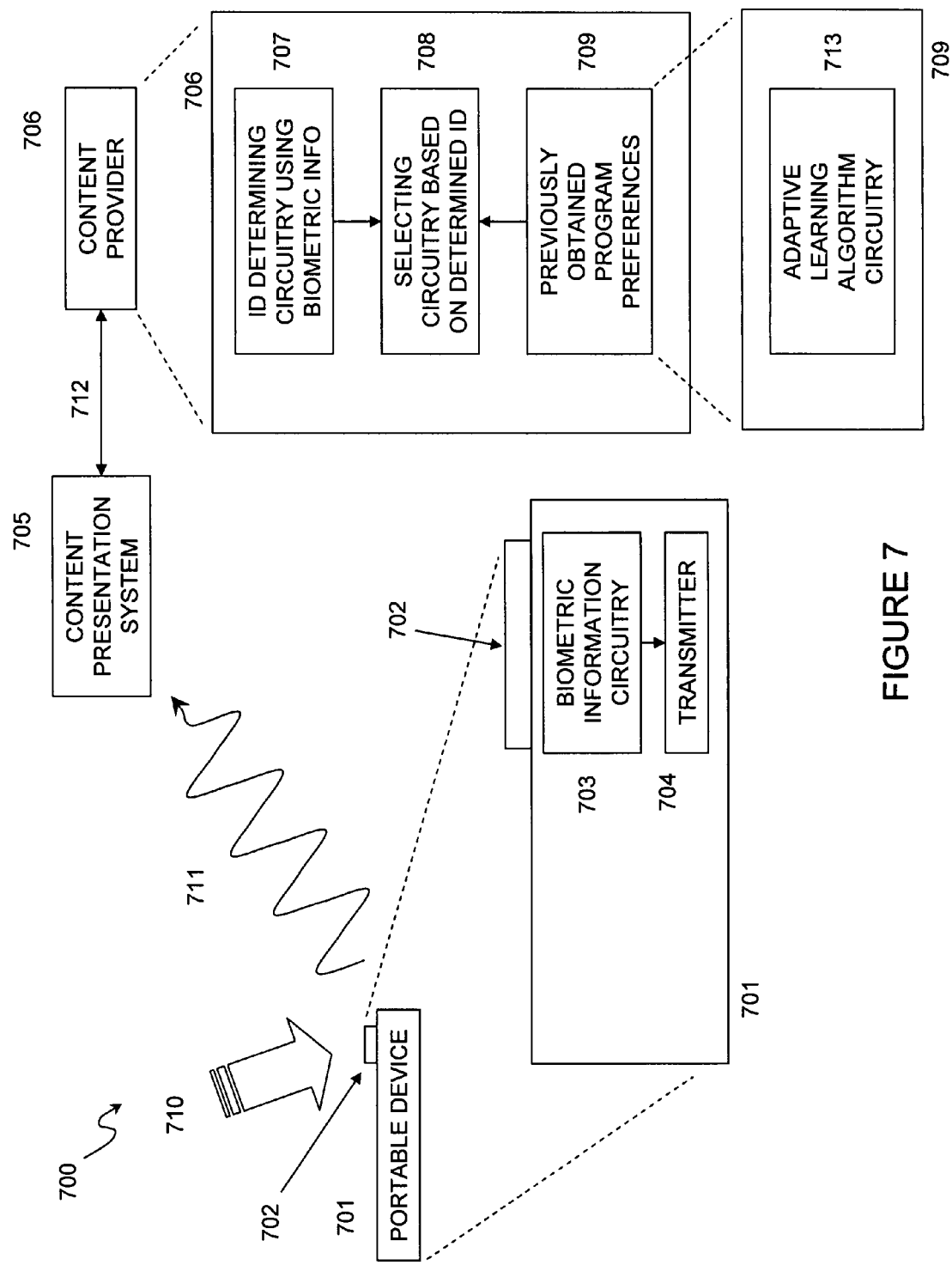
FIG. 7 is a block diagram of a system for interacting with a viewer of a content presentation system according to an embodiment of the disclosure.

At FIG. 7, a block diagram is presented of a system for interacting with a viewer of a content presentation system according to an embodiment of the disclosure. The system 700 may include a content presentation system 705 (previously described) and a portable device 701 (previously described) for interfacing between the viewer and the content presentation system 705 via the transmission path 711 (previously described). The portable device 701 may include an actuator 702 (previously described) which is operable 710 by the viewer for interacting with the content presentation system 705 via the portable device 701. The actuator 702 may include circuitry 703 for obtaining biometric information from the viewer and may further include transmitter 704 for transmitting the obtained biometric information to a content provider 706. The content provider 706 may be operatively connected to the content presentation system 705 via the transmission path 712 (previously described). In an embodiment, the content provider 706 may include circuitry 707 for determining an identification of the viewer based on the provided biometric information, and circuitry 708 for selecting at the content provider a program. The selection of the program may be based on the determined identification of the viewer and on previously-obtained information regarding program preferences of the viewer. In a further embodiment, the content provider 706 may include a transmitter for delivering the selected program to the content presentation system 705. The circuitry 707 for determining the identification of the viewer may include circuitry for comparing the provided biometric information with a pre-existing database of biometric information (as shown in FIG. 4 at 408 and 409).

In another embodiment, the content provider 706 may include circuitry 709 for determining program preferences of the viewer. The circuitry 709 may include circuitry 713 for executing an adaptive learning algorithm for determining program preferences of the viewer as a function of one or more viewing patterns of the viewer. The adaptive learning algorithm typically operates as described above at FIG. 6.

The adaptive learning algorithm can be used advantageously, as further described below, to enhance the viewing experience of the viewer. For example, once the viewer is identified by the content provider, the content provider can transmit to the content presentation system the "most likely favorite" program to present to the viewer. This most likely favorite may be based on any one or more of the following factors: the time of day, the day of the week, the day of the month, past viewing patterns, etc. As stated above, the adaptive learning algorithm preferably gathers viewing information parasitically/passively, i.e., without the need for the viewer to explicitly input data into the system. As the viewer changes channels, for example, the adaptive learning algorithm captures this input and factors it into the determination of the viewer's viewing pattern. Additionally, in an embodiment, the adaptive learning algorithm may reject input where the viewer is merely "channel surfing", which may be determined by, for example, sequential scroll up/down of a number of channels where the dwell time on any one or more of the channels is less than a predetermined amount of time (e.g., 5 seconds). Another advantage to the use of the adaptive learning algorithm is to populate a "preferred channel list" based on the viewer's viewing history/programming preferences for the particular time of day, day of week, etc. This preferred channel list may be utilized to set up, for example, a tailored channel surfing list for the viewer for the particular time of day. Additionally, the adaptive learning algorithm may be used to create a "smart electronic programming guide" which may include, for example, a graphical user interface displayed on a television screen listing the identified viewer's favorite channels based on the viewer's viewing history/programming preferences. Another enhancement possible with the preferred channel list and/or the smart electronic programming guide is the use of picture-in-picture displays on the television for selecting programming which may be based on the viewer's viewing history/programming preferences. As would be obvious to those of skill in the art, many more variations and embodiments beyond the exemplary ones mentioned here are possible based on the innovative methods and systems for gathering viewing information and interacting with a viewer as presented herein. The preferred channel list, the smart electronic programming guide, a smart channel surfing list, and other enhancements possible according to the methods and systems herein described may take advantage of being time-adaptive so that the viewer is presented with information that is tailored to the viewer's viewing habits at the particular time the viewer wishes to viewing programming content.

Regarding the obtaining of viewer biometric information and identification of the viewer based on the biometric information, if, for example, an actuator on a remote control device for a television is commonly used by the viewer during normal interactions with the television (e.g., using the ON/OFF button, a channel changing button, a volume control button, etc.) then the presently-disclosed methods and systems may allow for seamless changing of the "viewer" who is in control. Therefore, when a new viewer is identified, the new viewer's viewing preferences may be accessed so that the new viewer enjoys the benefits of a television that is configured to the new viewer's viewing preferences.

The present system for obtaining a viewer's programming preferences may include a "reset" command to clear current viewing patterns thereby allowing the viewer to begin escape old viewing patterns and begin anew.

Regarding the adaptive learning algorithm, various weighting schemes known in the art may be utilized to tailor the adaptive learning algorithm to a particular user's viewing patterns. As non-limiting examples, the adaptive learning algorithm may include an unweighted finite memory scheme (similar to a finite impulse response), recursive updating with weighting (similar to an infinite impulse response), a combined finite memory and weighting scheme, significance test (e.g., significance weighting, trend detection overrides, etc.), adaptive weighting schemes, and others. Each of the above methods may be used, as appropriate, with a finite window, an infinite window, a sliding window or any combinations thereof.

Figure 8:
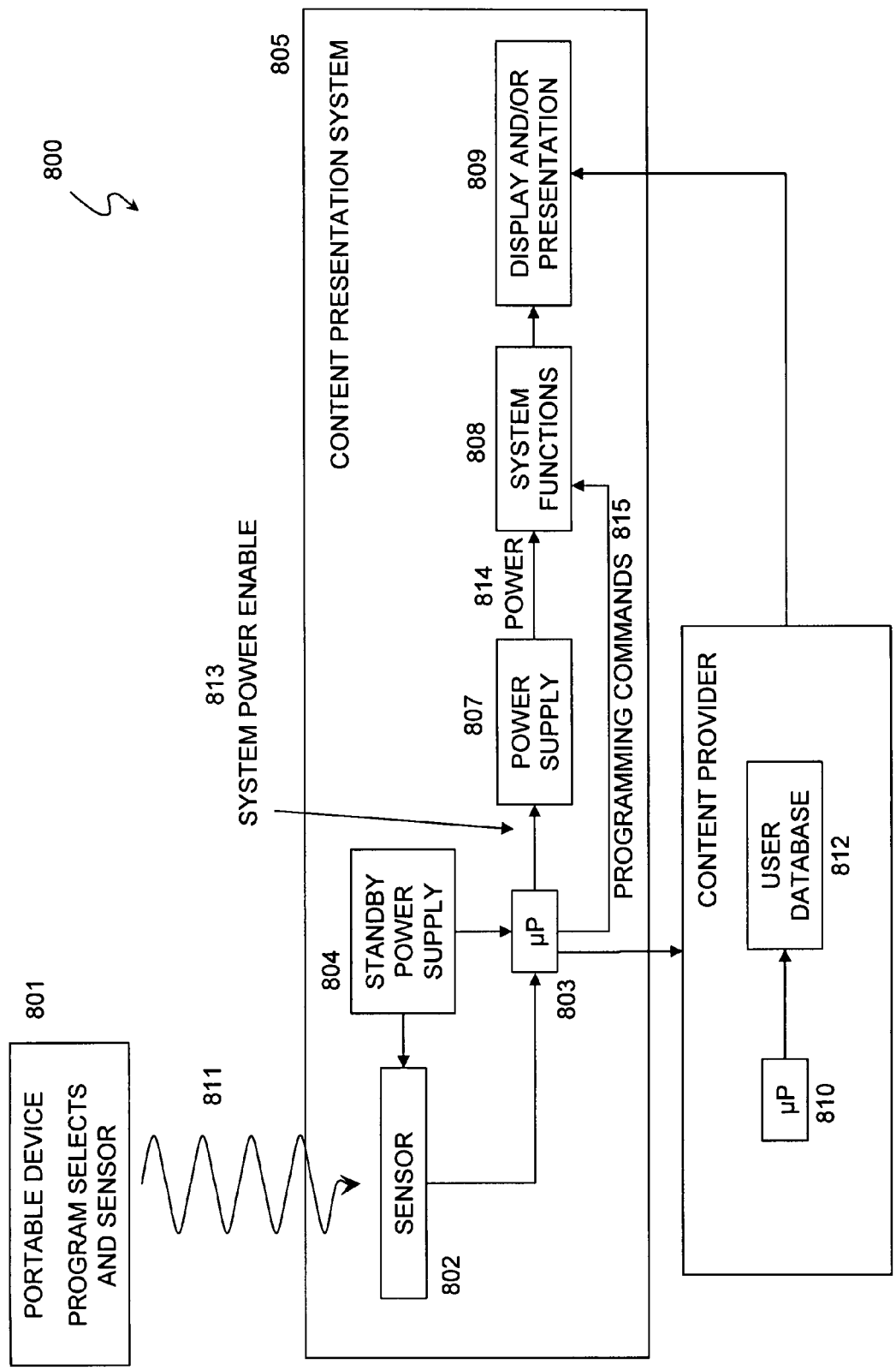
FIG. 8 is a block diagram of a system for identifying a viewer of a content presentation system according to an embodiment of the disclosure.

With reference now to FIG. 8, FIG. 8 shows a block diagram of a system for identifying a viewer of a content presentation system according to an embodiment of the disclosure. A portable device 801 (previously described) is operatively connected via a transmission path 811 (previously described) to a content presentation system 805 which itself is operatively connected to a content provider 806. In this embodiment, a sensor 802 receives a signal (which preferably includes biometric information from a viewer) from the portable device 801 and transfers that signal (or information contained within the signal) to a microprocessor 803. Standby power supply 804 supplies power to the sensor 802 and the microprocessor 803. The microprocessor 803 sends a signal (preferably containing the biometric information from the viewer) to the content provider 806 which includes a microprocessor 810 and a user database 812 which are used to determine an identity of the viewer based on the provided biometric information. Once the viewer is identified, the content provider 806 sends programming content to the content presentation system 805, specifically to the display and/or presentation circuitry 809. The microprocessor 803 also may send a system power enable signal 813 to the power supply module 807, which sends power 814 (typically, but not necessarily, direct current power) to the system functions module 808. Additionally, the microprocessor 803 may send programming commands 815 to the system functions module 808. The system functions module 808 may send a signal to the display and/or presentation module 809 to, for example, energize the presentation module and prepare it for accepting programming content from the content provider 806.

Figure 9:
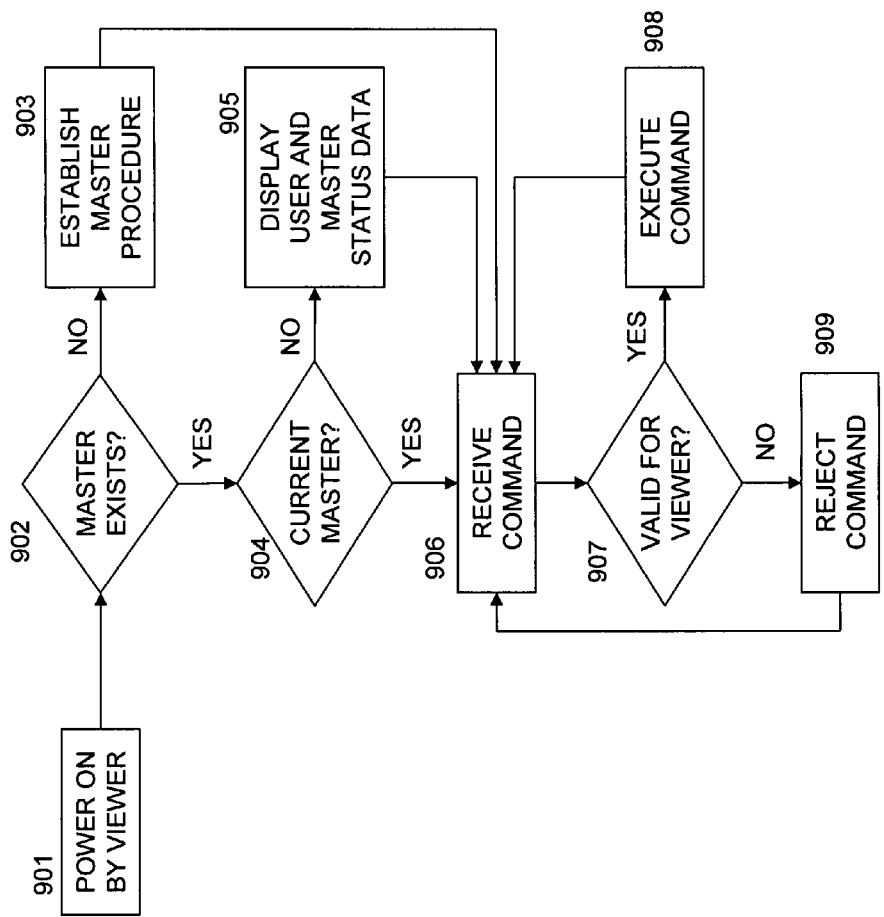
FIG. 9 is a flow diagram for identifying a viewer of a content presentation system according to an embodiment of the disclosure.

FIG. 9 is a flow diagram for identifying a viewer of a content presentation system according to an embodiment of the disclosure. At block 901a viewer powers on a content presentation system by, e.g., depressing a button on a remote control device which captures biometric information from the viewer. At block 902 a determination is made as to whether a master viewer exists. If a master viewer exists, then at block 904 a determination is made as to whether the current viewer is the master viewer. If a master viewer does not exist, then at block 903 a procedure is run, as is known by those of skill in the art, to establish a master viewer. Once the master viewer is established, then at block 906 commands received from the current viewer are received. With attention directed back to block 904, if the current viewer is the master viewer, then at block 906 commands received from the current viewer are received. If at block 904, the current viewer is not the master viewer, then at block 905 the current viewer and master viewer status data may be displayed and the current viewer's commands are received at block 906. At block 907, a determination is made as to whether the received current viewer's commands are valid for the viewer. If the received commands are valid for the current viewer, then the received commands may be executed at block 908 and the system is set to receive additional commands at block 906. If the received commands are not valid for the current user, then the received commands may be rejected at block 909 and the system is set to receive additional commands at block 906.

Figure 10:
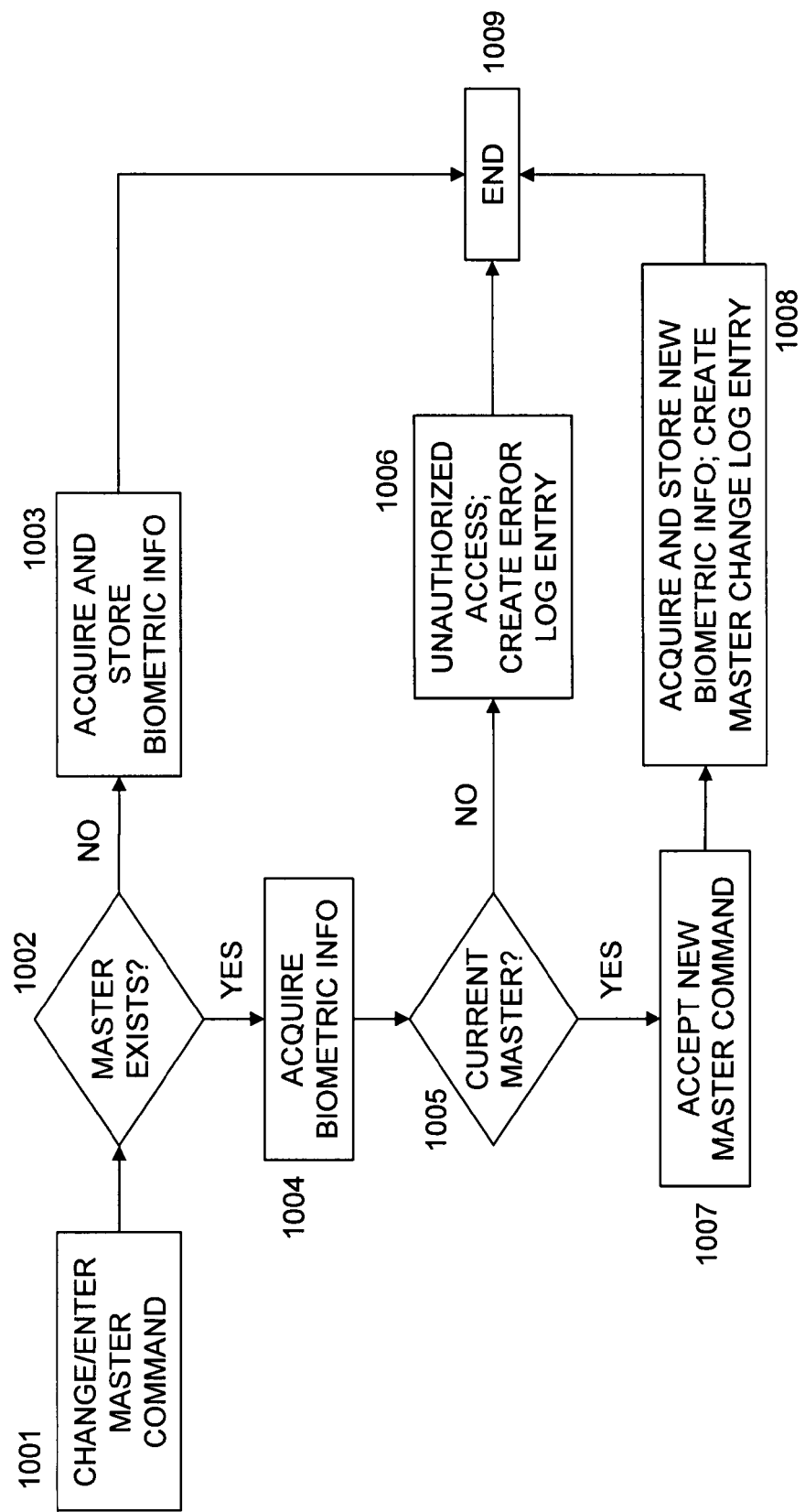
FIG. 10 is a flow diagram for identifying a viewer of a content presentation system according to an embodiment of the disclosure.

FIG. 10 is a flow diagram for identifying a viewer of a content presentation system according to an embodiment of the disclosure. At block 1001, a "change/enter master command" is presented to a content presentation system. At block 1002 a determination is made as to whether a master viewer exists. If a master viewer does not exist, then at block 1003 biometric information of the current viewer is acquired and stored thereby setting up a master viewer. A log entry to that effect may be made. The routine then ends at block 1009. If a master viewer does exist at block 1001, then biometric information of the current viewer is acquired at block 1004. At block 1005, a determination is made as to whether the current viewer is the master viewer. This determination is typically made using the acquired biometric information from block 1004. At block 1005, if the current viewer is not the master viewer, then at block 1006 an unauthorized access condition is met which may result in a display to that effect being displayed by the content presentation system and/or an error log entry may be made. The routine then ends at block 1009. If at block 1005 the determination made is that the current viewer is the master viewer, then at block 1007 the change/enter master command is accepted and at block 1008 biometric information of the current viewer is acquired and stored thereby setting up a new master viewer and a create master change log entry may be made. The routine then ends at block 1009.

Figure 11:
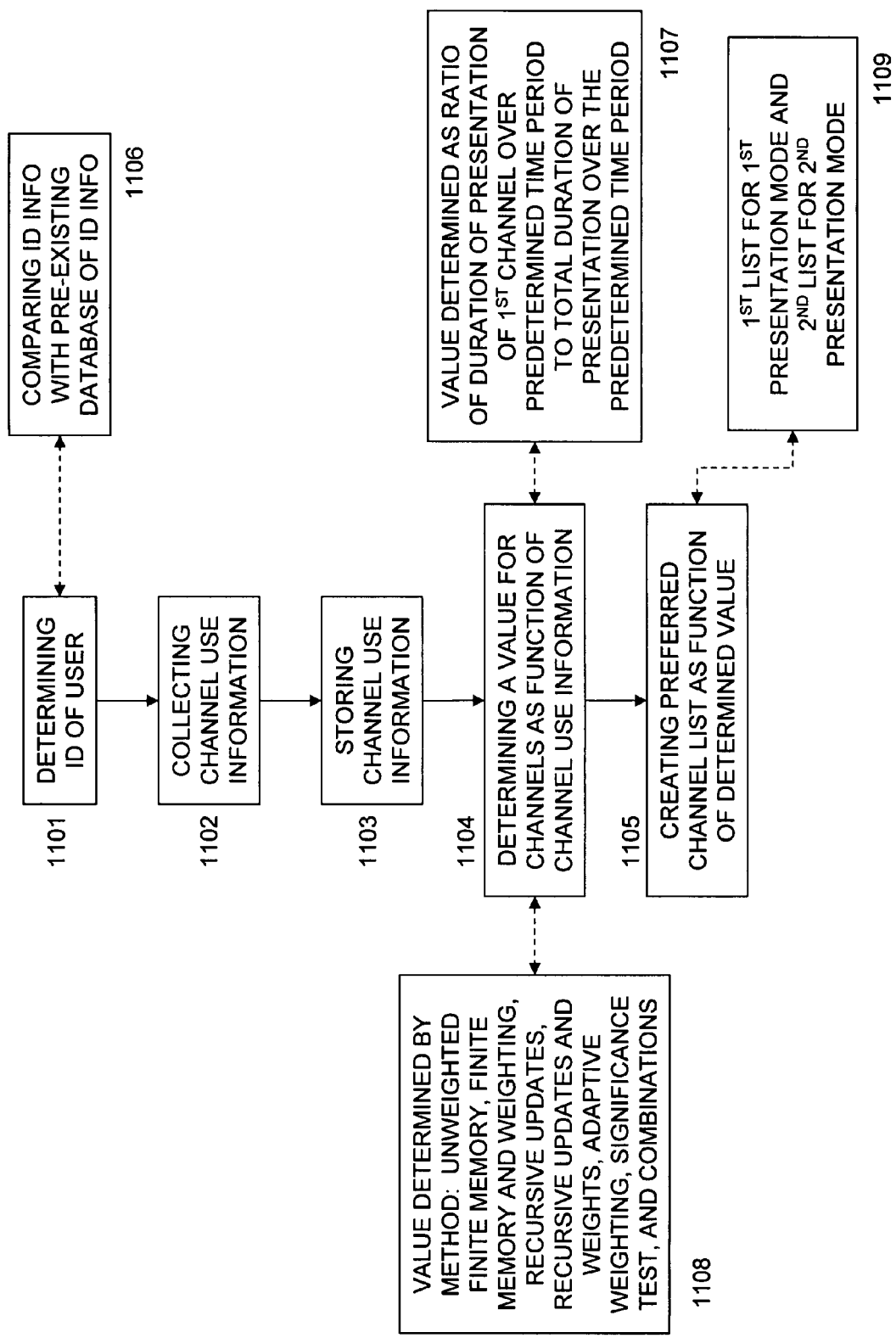
FIG. 11 is a flow diagram for creating a preferred channel list according to an embodiment of the disclosure.

FIG. 11 is a flow diagram for creating a preferred channel list according to an embodiment of the disclosure. At block 1101, an identity of a user/viewer interacting with a content presentation system is determined. At block 1102, channel use information is collected for each of a plurality of channels from the user's interaction with the content presentation system. The channel use information is typically information related to the user's viewing of a stream of information received via a content presentation system. For example, channel use information includes, but is not limited to, a channel number of a channel, a time of initiating a presentation of content associated with the channel to the user; a date of initiating a presentation of content associated with the channel to the user; a duration of a presentation of content associated with the channel to the user; a total duration of a presentation of content associated with each of plural channels to the user, and combinations thereof. At block 1103, the channel use information may be stored, and at block 1104 a value for each of the plural channels as a function of the channel use information may be determined. The "value" will be discussed in further detail below. At block 1105, a preferred channel list may be created for the plural channels as a function of the determined value.

The determination of an identity of the user may be determined by using identification information such as, but not limited to, biometrics, voice activation, fingerprint, user-entered password, use of a unique key on a remote device by which the user interacts with the content presentation system, use of a unique remote device by which the user interacts with the content presentation system, and combinations thereof. At block 1106, the determination of an identity of the user may include comparing identification information gathered from the user with a pre-existing database of identification information.

At block 1107, the determination of a value for a first channel of a plurality of channels may be determined as a ratio of a total duration of a presentation of content associated with the first channel over a predetermined time period to a total duration of a presentation of content associated with each of the plural channels over the predetermined time period. In other words, the value may be the fraction of total "on" time of the content presentation system for a predetermined amount of time in which the content presentation system is tuned to the first channel. In one embodiment, the predetermined time period is approximately one half hour. In another embodiment, the predetermined time period is approximately an hour. In yet another embodiment, the predetermined time period is approximately one day. In other embodiments, the predetermined time period may be less than or equal to one week, or may be more than one week.

The predetermined time period may correspond to a first predetermined time slot and a first value for the first channel may be stored for a first occurrence of the first predetermined time slot. A second value for the first channel may be stored for a second occurrence of the first predetermined time slot. An example of a predetermined time slot may be every Monday between 6:00 and 7:00 PM, local time. Therefore, a first occurrence of the predetermined time slot may be Monday, Jan. 1, 2007 between 6:00 and 7:00 PM while a second occurrence of the predetermined time slot may be Monday, Jan. 8, 2007 between 6:00 and 7:00 PM. The determined value for the first channel may include the aforementioned first and second values.

In an embodiment, the channel use information may not include information for any of the plural channels for which a duration of a presentation of content associated with any of the plural channels is less than a predetermined amount. In this embodiment, time spent "channel surfing" is not factored into the determination of the value for any channel.

At block 1108, the value may be determined at least in part by a method including, but not limited to, an unweighted finite memory method, a finite memory and weighting method, a method using recursive updates; a method using recursive updates and weights, an adaptive weighting method, a significance test, and combinations thereof.

In an embodiment, channels may be listed in a preferred channel list in order of descending value and upon activation of a content presentation system, the channel with the largest value (e.g., the first channel listed in the preferred channel list) may be presented to the user. The preferred channel list need not list every possible channel but may only list those channels for which the value associated with the channel is greater than a predetermined amount. This may allow the preferred channel list to be smaller and somewhat more manageable if it only contains those channels that are viewed more than a predetermined fraction of time that the content presentation system is activated. Of course, as stated above, the preferred channel list may be time-dependent so that the preferred channel list only lists those channels that are sufficiently viewed during a predetermined time period and/or time slot (recurring or otherwise).

The method may further comprise, at block 1109, the creation of a first preferred channel list for a plurality of channels that are presented via a first mode of content delivery by the content presentation system and the creation of a second preferred channel list for the plurality of channels that are presented via a second mode of content delivery by the content presentation system. For example, the first mode of content delivery may be via a main television display and the second mode of content delivery may be via a picture-in-picture display.

Figure 12:
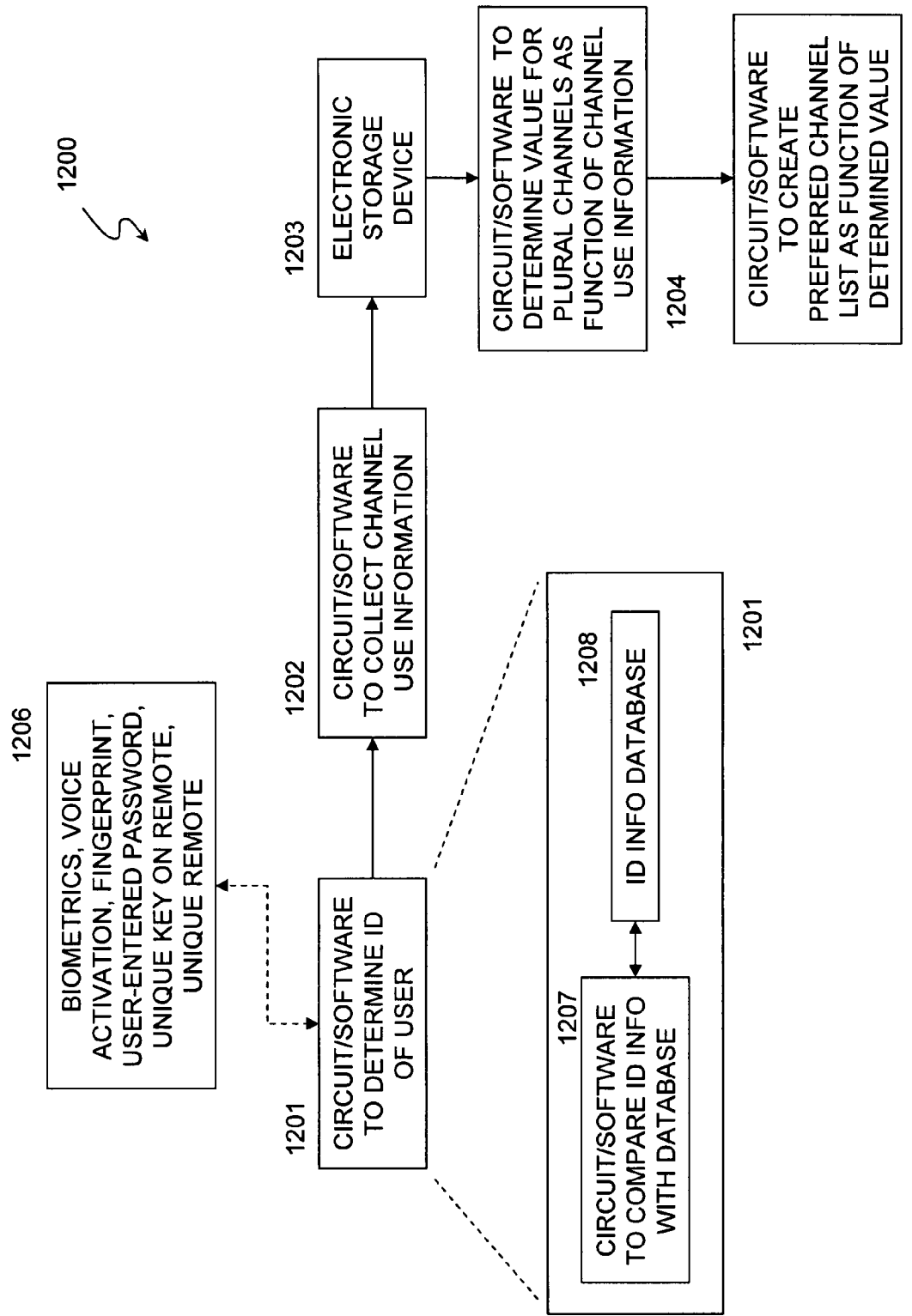
FIG. 12 is a block diagram of a system for creating a preferred channel list according to an embodiment of the disclosure.

FIG. 12 is a block diagram of a system for creating a preferred channel list according to an embodiment of the disclosure as described above. In an embodiment, the system 1200 may be disposed at/within a content provider, a content presentation system, locally at a portable device operated by a user, a combination of two or more of the aforementioned devices, or any other convenient location. The system 1200 may include circuitry 1201 for determining an identity of a user interacting with a content presentation system (not shown here for clarity), circuitry 1202 for collecting channel use information for each of a plurality of channels from the user's interaction with the content presentation system, an electronic storage device 1203 for storing the channel use information; circuitry 1204 for determining a value for each of the plural channels as a function of the channel use information, and circuitry 1205 for creating a preferred channel list for the plural channels as a function of the determined value.

In an embodiment, the circuitry 1201 for determining an identity of the user may include circuitry 1206 for collecting identification information such as biometrics, voice activation, fingerprint, user-entered password, use of a unique key on a remote device by which the user interacts with the content presentation system, use of a unique remote device by which the user interacts with the content presentation system, and combinations thereof as is known in the art. Furthermore, the circuitry 1201 may include circuitry 1207 for comparing the collected identification information with pre-existing identification information stored in a database 1208 of identification information.

Figure 13:
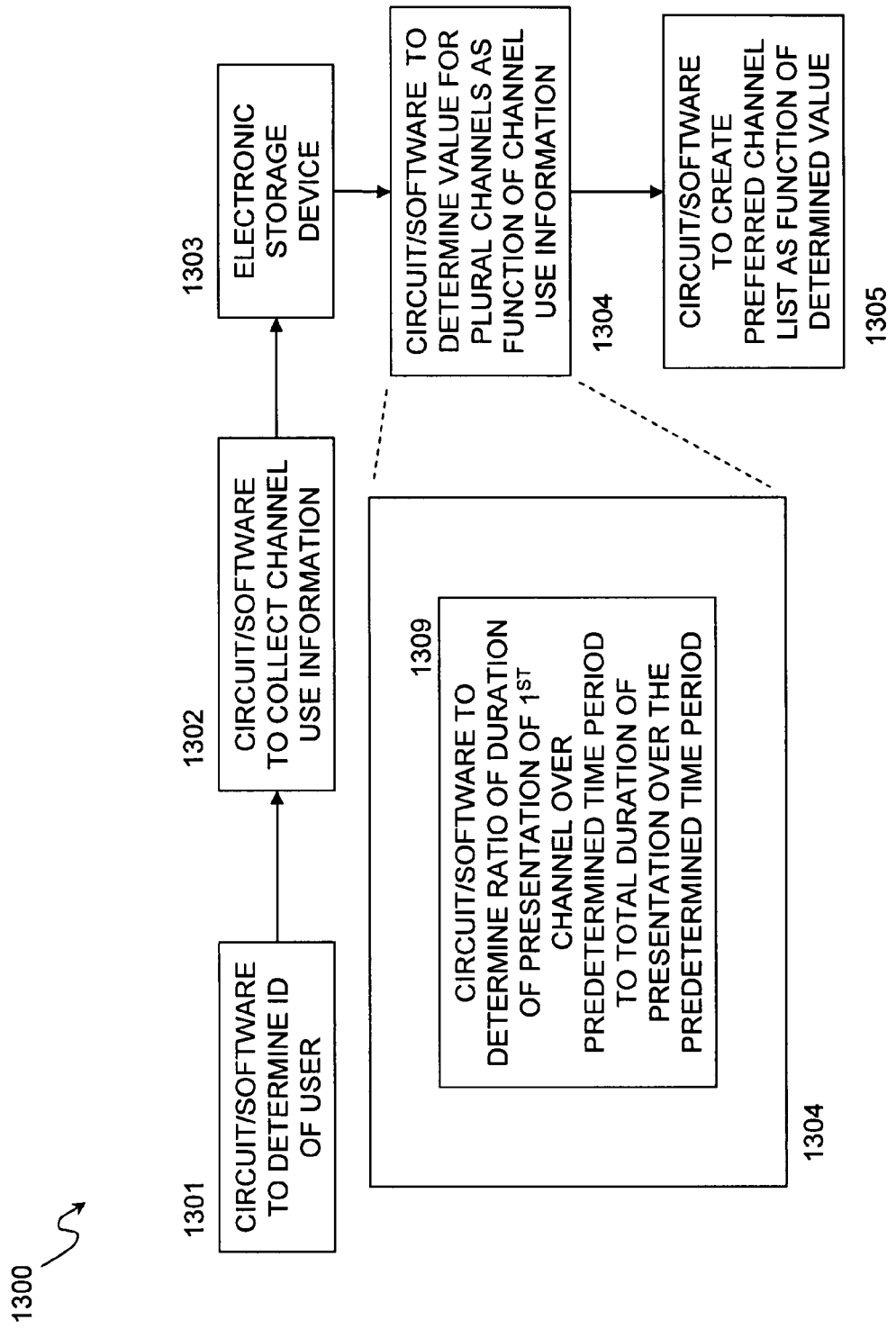
FIG. 13 is a block diagram of a system for creating a preferred channel list according to an embodiment of the disclosure.

FIG. 13 is a block diagram of a system 1300 for creating a preferred channel list according to an embodiment of the disclosure. Blocks 1301, 1302, 1303, 1304, and 1305 may contain circuitry similar to circuitry described above in blocks 1201, 1202, 1203, 1204, and 1205, respectively. The system 1300 may further include circuitry 1309 for determining a ratio of a total duration of a presentation of content associated with a first channel over a predetermined time period to a total duration of a presentation of content associated with each of a plurality channels over the predetermined time period, as discussed above. The predetermined time period may be, but is not limited to, any one of the following: approximately one half hour, approximately an hour, approximately one day, less than or equal to one week, or more than one week.

Figure 14:
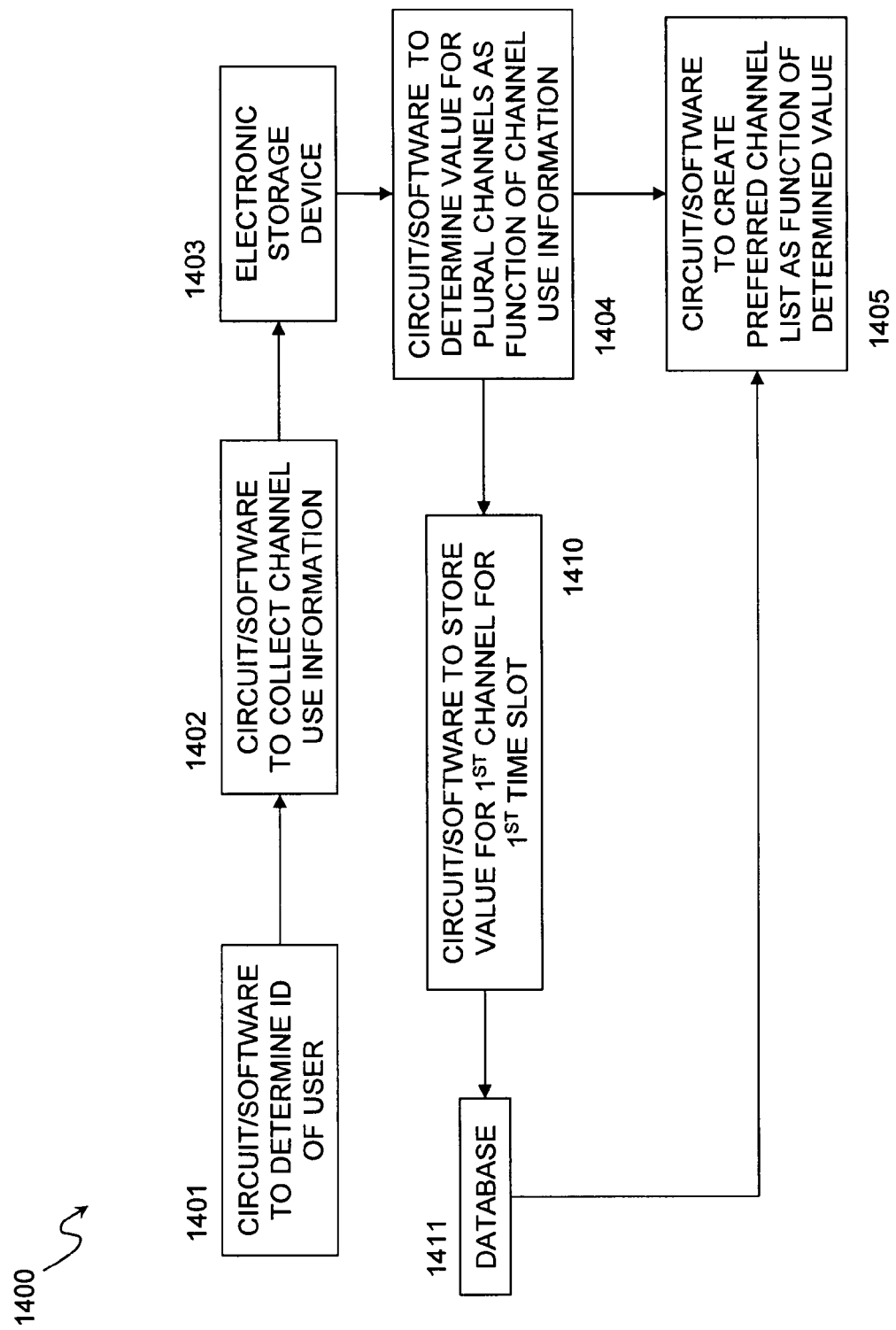
FIG. 14 is a block diagram of a system for creating a preferred channel list according to an embodiment of the disclosure.

FIG. 14 is a block diagram of a system 1400 for creating a preferred channel list according to an embodiment of the disclosure. Blocks 1401, 1402, 1403, 1404, and 1405 may contain circuitry similar to circuitry described above in blocks 1201, 1202, 1203, 1204, and 1205, respectively. The system 1400 may further include circuitry 1410 for storing a first value for a first channel in a first database 1411 for a first occurrence of a first predetermined time slot. Circuitry 1410, or similar other circuitry (not shown for clarity) may also store a second value for the first channel in the first database 1411 for a second occurrence of the first predetermined time slot. In addition, the circuitry 1404 for determining the value for the first channel may operate on both the first and second values.

Figure 15:
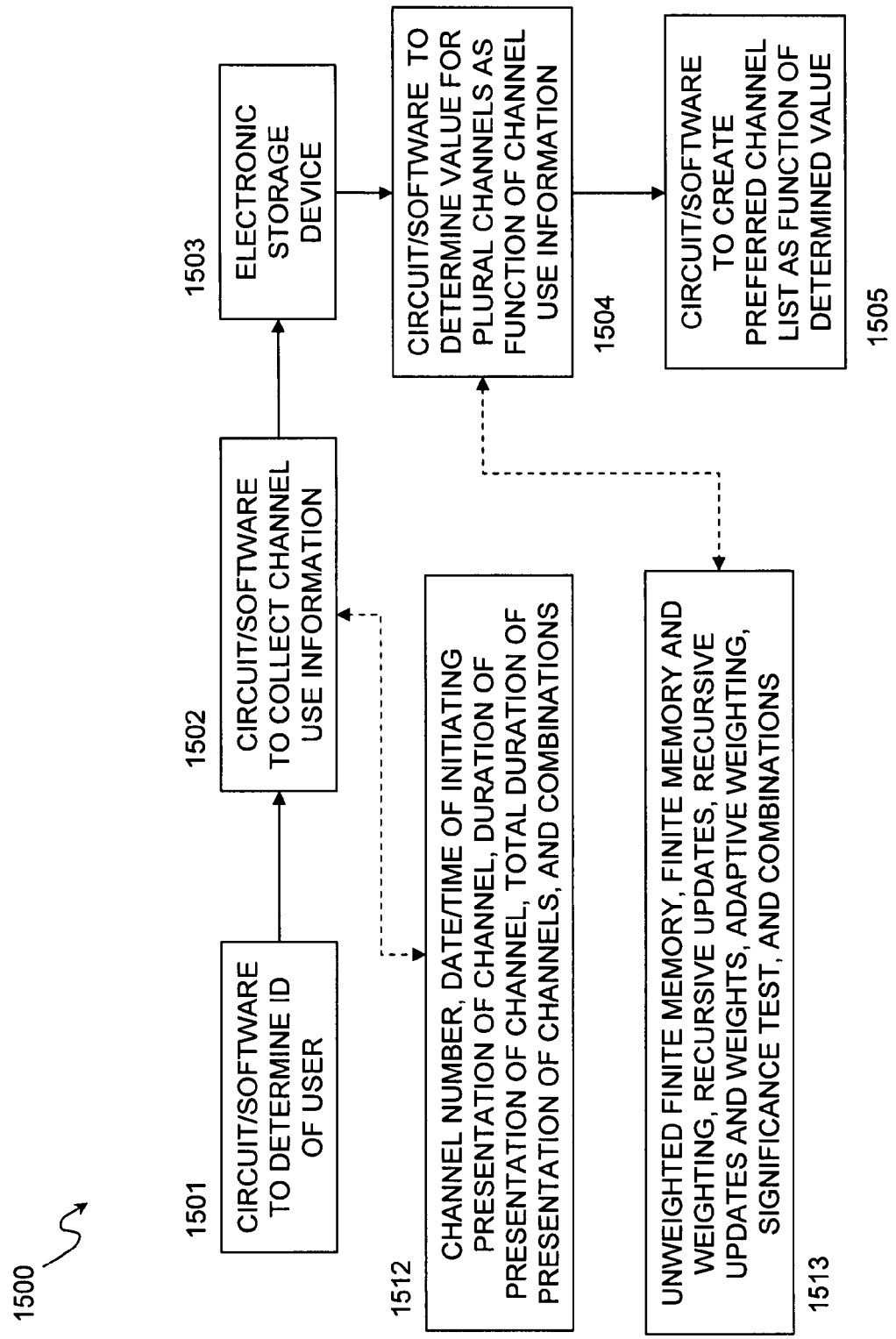
FIG. 15 is a block diagram of a system for creating a preferred channel list according to an embodiment of the disclosure.

FIG. 15 is a block diagram of a system for creating a preferred channel list according to an embodiment of the disclosure. Blocks 1501, 1502, 1503, 1504, and 1505 may contain circuitry similar to circuitry described above in blocks 1201, 1202, 1203, 1204, and 1205, respectively. In the system 1500, the circuitry 1502 for collecting channel use information may include circuitry 1512 for collecting channel use information such as, but not limited to, a channel number of a first one of the plural channels, a time of initiating a presentation of content associated with the first channel to the user; a date of initiating a presentation of content associated with the first channel to the user; a duration of a presentation of content associated with the first channel to the user; a total duration of a presentation of content associated with each of the plural channels to the user, and combinations thereof. In a further embodiment, the circuitry 1502 for collecting channel use information may not collect information for any one or more of a plurality of channels for which a duration of a presentation of content associated with that one or more of the plurality of channels, respectively, is less than a predetermined amount. This is to prevent "channel surfing" from skewing the determination of a value for any one or more channels.

Furthermore, the circuitry 1504 for determining a value may include circuitry 1513 for running an algorithm, as discussed above, such as an unweighted finite memory algorithm, a finite memory and weighting algorithm, an algorithm using recursive updates; an algorithm using recursive updates and weights, an adaptive weighting algorithm, a significance test algorithm, and combinations thereof.

Figure 16:
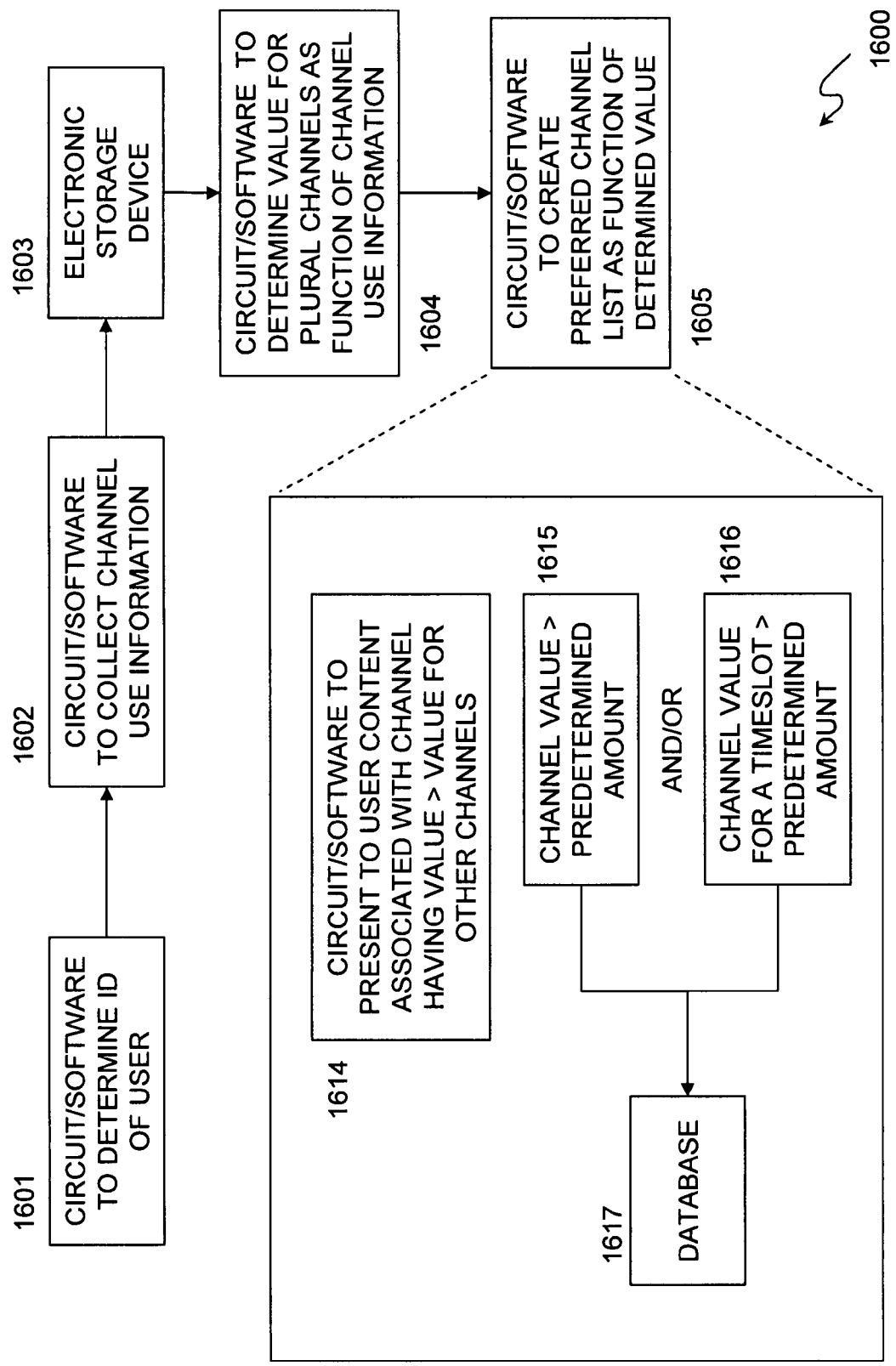
FIG. 16 is a block diagram of a system for creating a preferred channel list according to an embodiment of the disclosure.

FIG. 16 is a block diagram of a system for creating a preferred channel list according to an embodiment of the disclosure. Blocks 1601, 1602, 1603, 1604, and 1605 may contain circuitry similar to circuitry described above in blocks 1201, 1202, 1203, 1204, and 1205, respectively. In the system 1600 the circuitry 1605 for creating a preferred channel list may include circuitry 1614 for presenting to the user, upon activation of the content presentation system (not shown for clarity), content associated with a first channel where the first channel has a value greater than a value for any other of a plurality of channels. Moreover, the circuitry 1605 for creating a preferred channel list may populate a database 1617 with ones of the plural channels where each of the ones have a determined value greater than a predetermined amount as determined by circuitry 1615 and/or where each of the ones have a determined value for a predetermined time slot greater than a predetermined amount, as determined by circuitry 1616.

Figure 17:
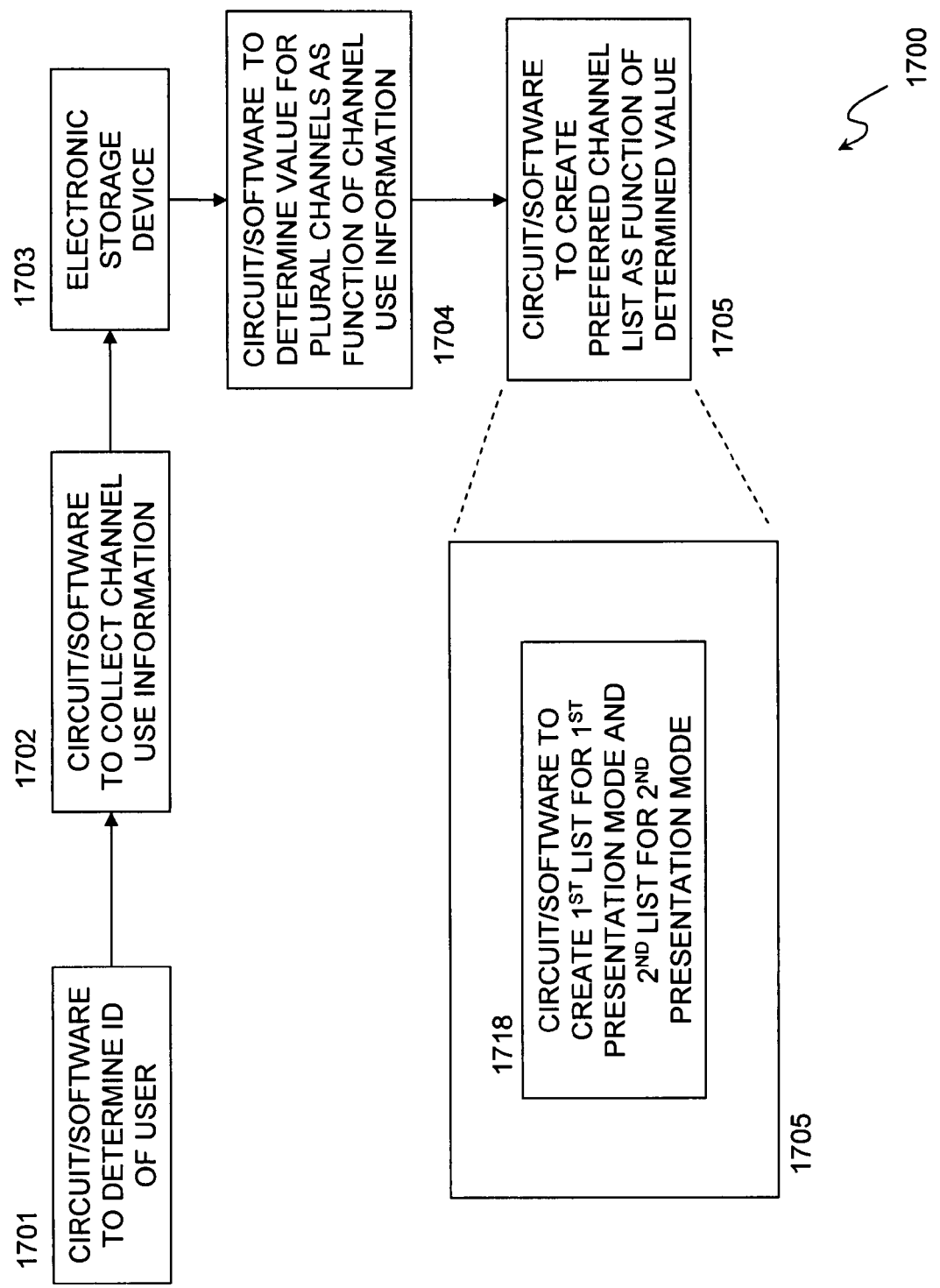
FIG. 17 is a block diagram of a system for creating a preferred channel list according to an embodiment of the disclosure.

FIG. 17 is a block diagram of a system for creating a preferred channel list according to an embodiment of the disclosure. Blocks 1701, 1702, 1703, 1704, and 1705 may contain circuitry similar to circuitry described above in blocks 1201, 1202, 1203, 1204, and 1205, respectively. In the system 1700 the circuitry 1705 for creating a preferred channel list may include circuitry 1718 for creating a first preferred channel list for a plurality of channels for a first mode of content delivery by a content presentation system (not shown for clarity) and for creating a second preferred channel list for the plurality of channels for a second mode of content delivery by the content presentation system. The first mode of content delivery may include conventional circuitry (not shown for clarity) for displaying content via a main television display and the second mode of content delivery may include conventional circuitry (not shown for clarity) for displaying content via a picture-in-picture display.

Figure 18:
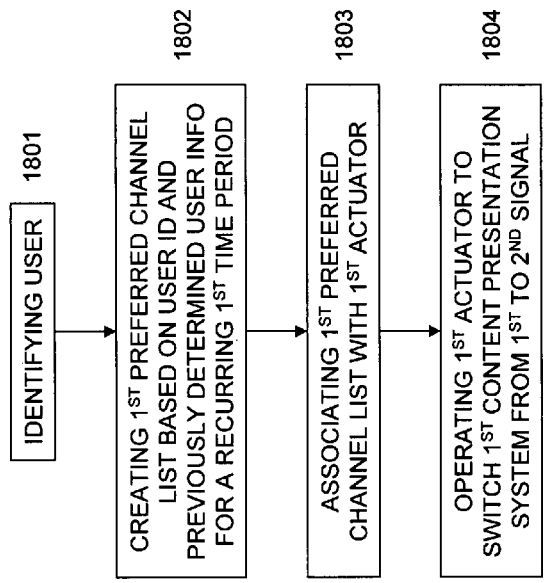
FIG. 18 is a flow diagram for switching signals using a preferred channel list according to an embodiment of the disclosure.

With reference now directed toward FIG. 18, a flow diagram is depicted for switching signals using a preferred channel list according to an embodiment of the disclosure. In an embodiment, a method for switching from a first signal provided by a content provider to a second signal provided by the content provider may include, at block 1801, identifying a user of a first content presentation system that is operatively connected to the content provider, where the content provider provides one or more signals, including the first and second signals, to the first content presentation system. The method may also include, at block 1802, creating a first preferred channel list based on the identity of the user and based on previously determined information for the user wherein the information is determined for a recurring first time period, at block 1803, associating the first preferred channel list with a first actuator operable by the user for interacting with the first content presentation system, as well as at block 1804 operating the first actuator to thereby switch the first content presentation system from presenting the first signal provided by the content provider to presenting the second signal provided by the content provider. The user of the system is typically the operator of the first actuator. Furthermore, the recurring first time period may be, but is not limited to, a time period of one half hour duration, or one hour duration, that occurs at a same time of day for a plurality of days. As an example of one alternative, the recurring first time period may be, but is not limited to, a time period of one half hour duration, or one hour duration, that occurs at a same time of day on the same day of the week for a plurality of weeks.

Figure 19:
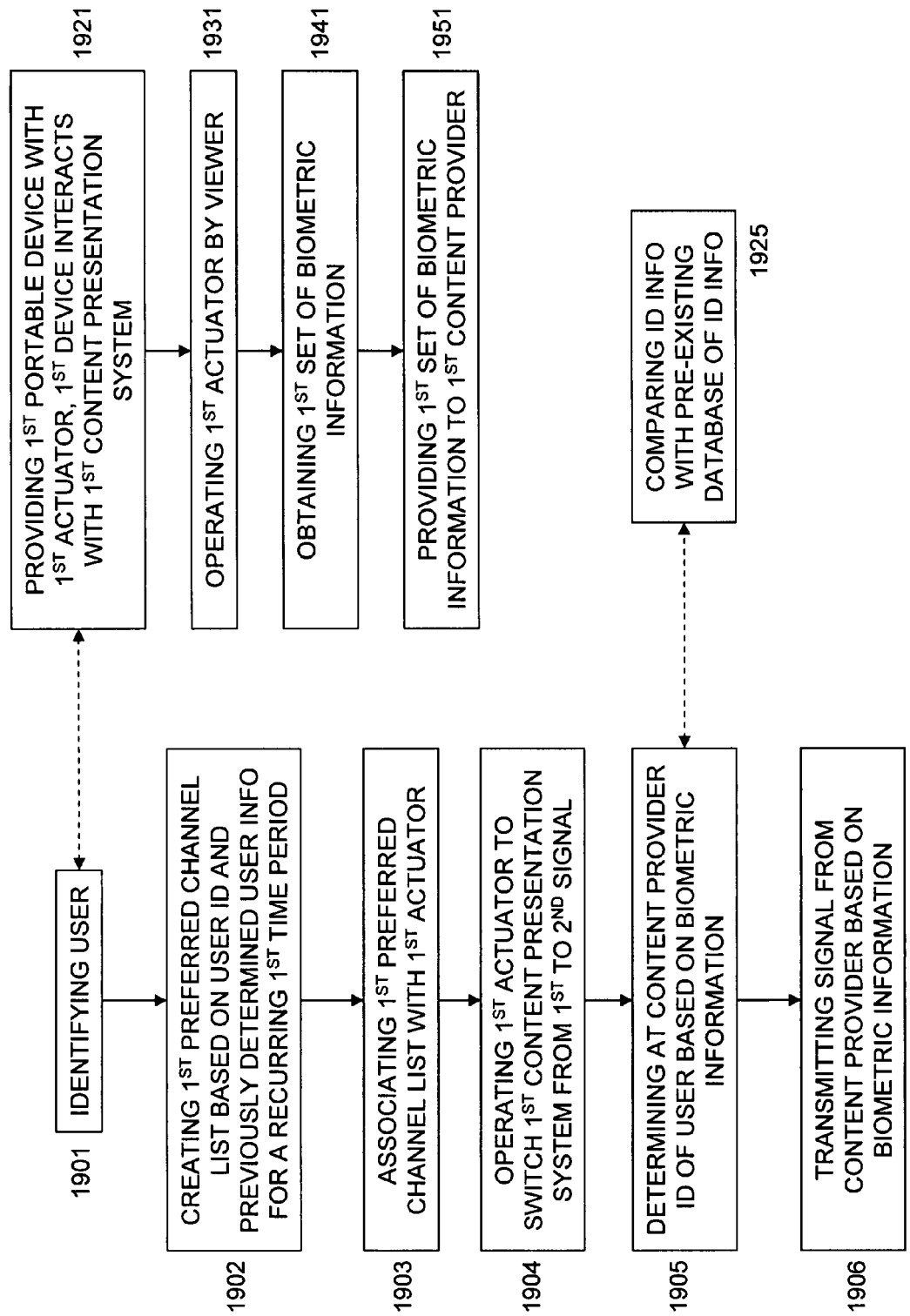
FIG. 19 is a flow diagram for switching signals using a preferred channel list according to an embodiment of the disclosure.

FIG. 19 is a flow diagram for switching signals using a preferred channel list according to an embodiment of the disclosure. Blocks 1901, 1902, 1903, and 1904 are similar to blocks 1801, 1802, 1803, and 1804, respectively. In this embodiment, the method of determining the identity of the user in block 1901 may also include at block 1921 providing a first portable device to interact with the first content presentation system, where the first portable device includes a first actuator which is operable by the user for interacting with a first content presentation system via the first portable device, and where the first actuator obtains biometric information from the user, at block 1931 operating the first actuator by the user, at block 1941 obtaining biometric information from the user via the first actuator, and at block 1951 providing the obtained biometric information to a content provider. Furthermore, the method for switching signals may include at block 1905 determining at the content provider the identification of the user based on the provided biometric information, which may entail, at block 1925, comparing the provided biometric information with a pre-existing database of biometric information. Moreover, the method for switching signals may include at block 1906 transmitting a signal from the content provider based at least in part on the provided biometric information.

Figure 20:
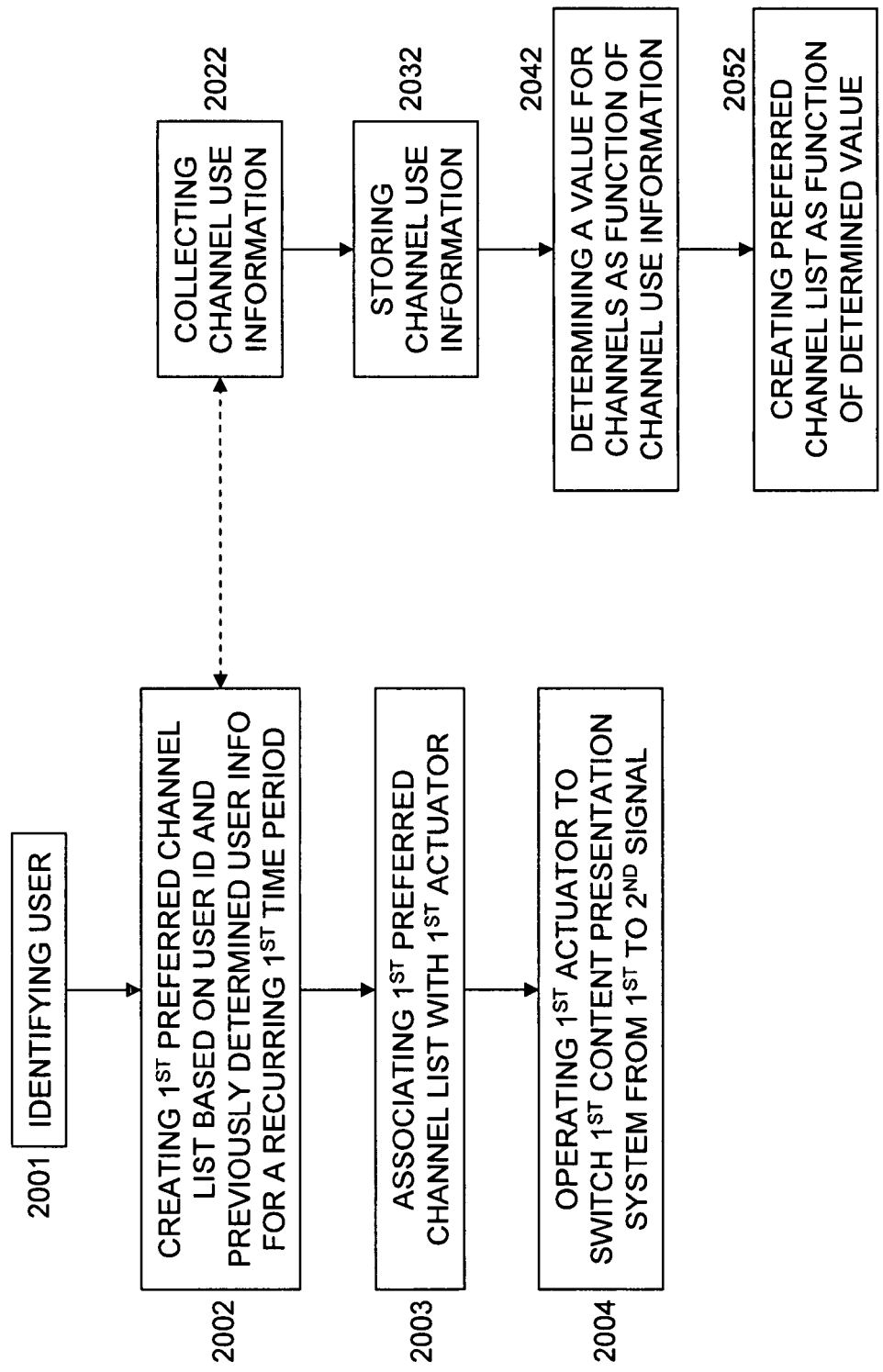
FIG. 20 is a flow diagram for switching signals using a preferred channel list according to an embodiment of the disclosure.

FIG. 20 is a flow diagram for switching signals using a preferred channel list according to an embodiment of the disclosure. Blocks 2001, 2002, 2003, and 2004 are similar to blocks 1801, 1802, 1803, and 1804, respectively. This embodiment of a method for switching signals may include at block 2022 collecting channel use information for each of a plurality of channels from a user's interaction with a first content presentation system, at block 2032 storing the channel use information, at block 2042 determining a value for each of the plural channels as a function of the channel use information, and at block 2052 creating a first preferred channel list for the plural channels as a function of the determined value.

Figure 21:
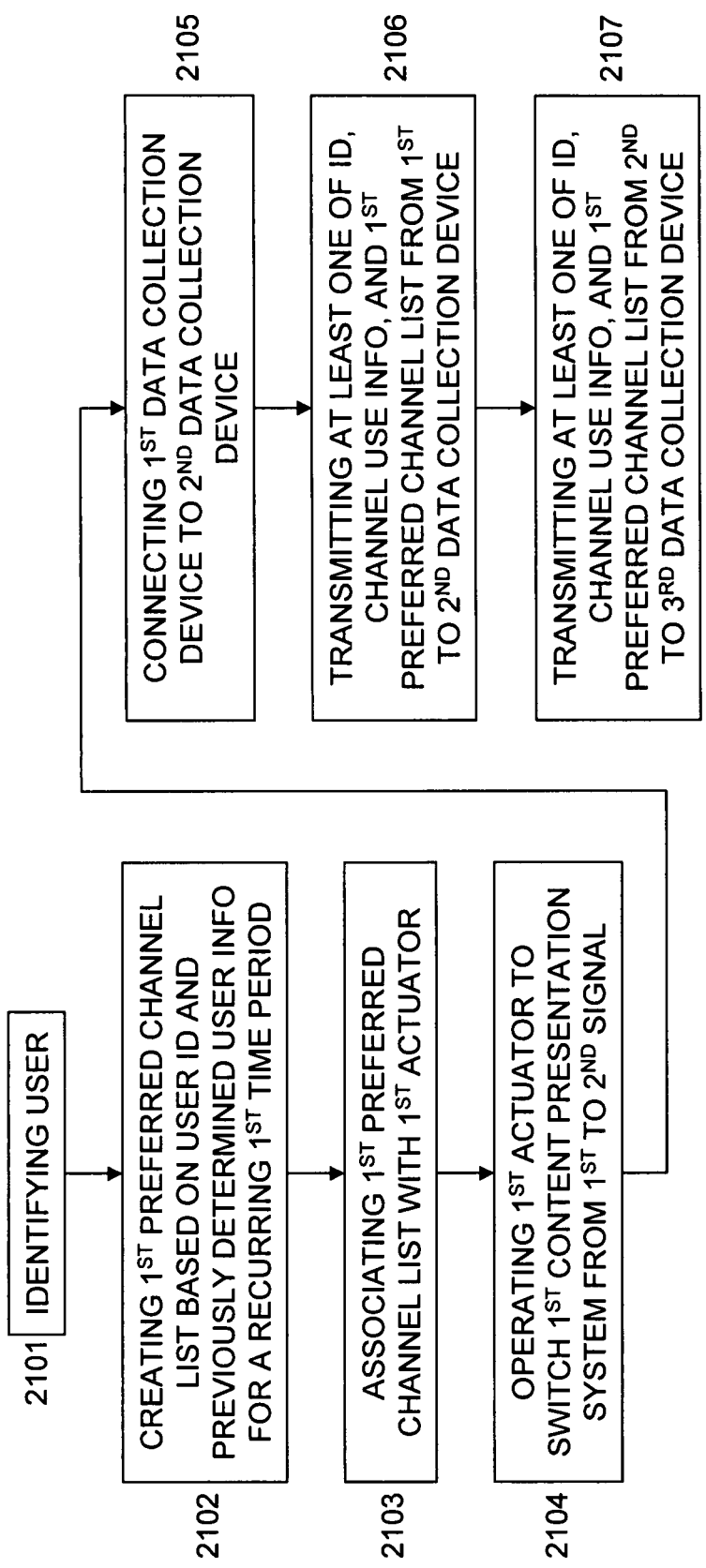
FIG. 21 is a flow diagram for switching signals using a preferred channel list according to an embodiment of the disclosure.

FIG. 21 is a flow diagram for switching signals using a preferred channel list according to an embodiment of the disclosure. Blocks 2101, 2102, 2103, and 2104 are similar to blocks 1801, 1802, 1803, and 1804, respectively. This embodiment further includes at block 2105 operatively connecting a first data collection device to a second data collection device where the first data collection device is operatively connected to a first content presentation system and the second data collection device is operatively connected to a second content presentation system, and where the first and second content presentation systems are each operatively connected to a content provider, at block 2106 transmitting at least one of an identity, channel use information, and a first preferred channel list from the first data collection device to the second data collection device, and at block 2107 transmitting at least one of the identity, the channel use information, and the first preferred channel list from the second data collection device to a third data collection device.

Figure 22:
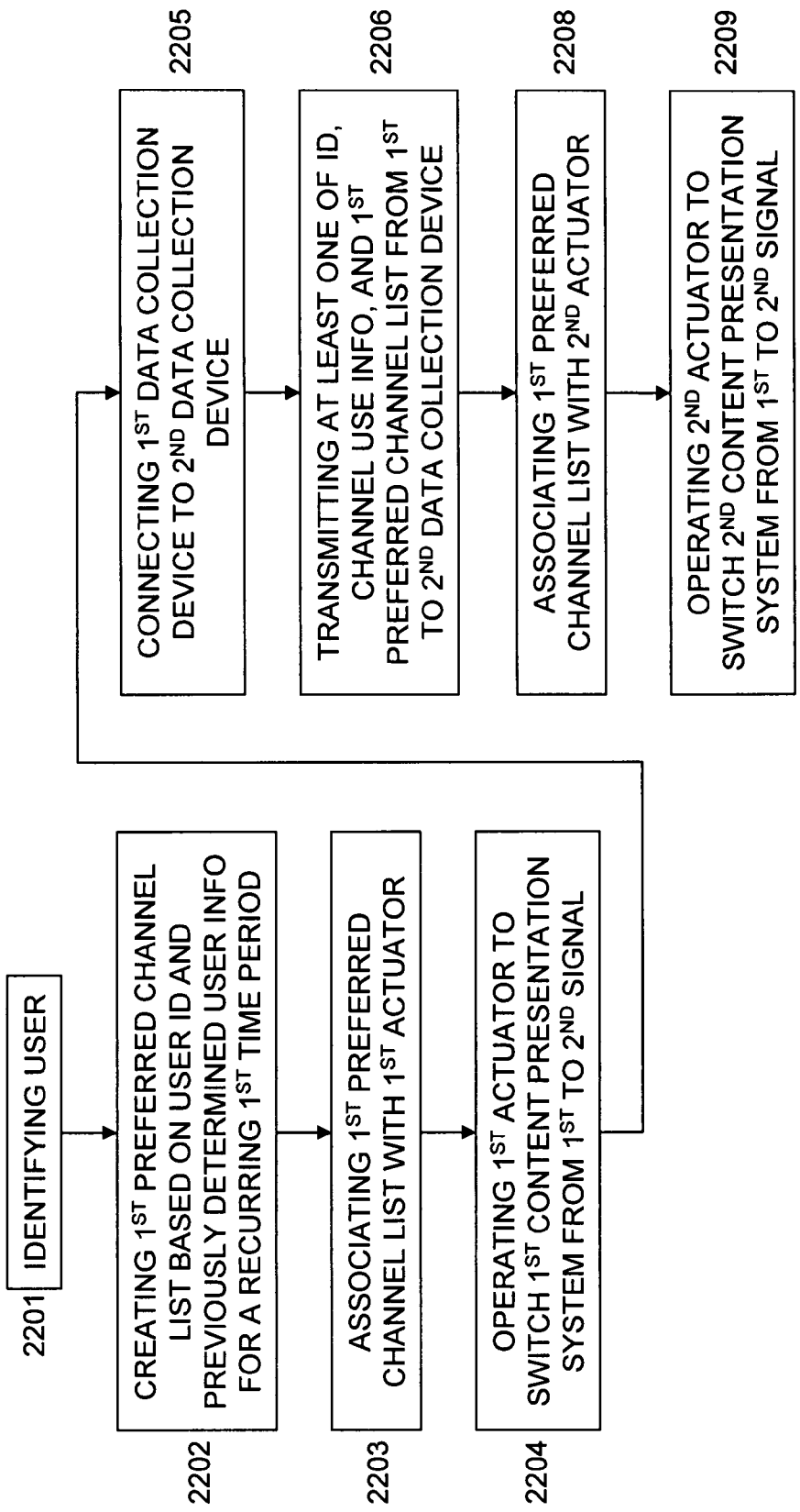
FIG. 22 is a flow diagram for switching signals using a preferred channel list according to an embodiment of the disclosure.

FIG. 22 is a flow diagram for switching signals using a preferred channel list according to an embodiment of the disclosure. Blocks 2201, 2202, 2203, and 2204 are similar to blocks 1801, 1802, 1803, and 1804, respectively. Additionally, blocks 2205 and 2206 are similar to blocks 2105 and 2106, respectively. This embodiment also includes, at block 2208 associating a first preferred channel list with a second actuator operable by the user for interacting with a second content presentation system, and at block 2209 operating the second actuator to thereby switch the second content presentation system from presenting a third signal provided by the content provider to presenting the a fourth signal provided by the content provider. In an embodiment the first and third signals may be the same and/or the second and fourth signals may be the same.

Figure 23:
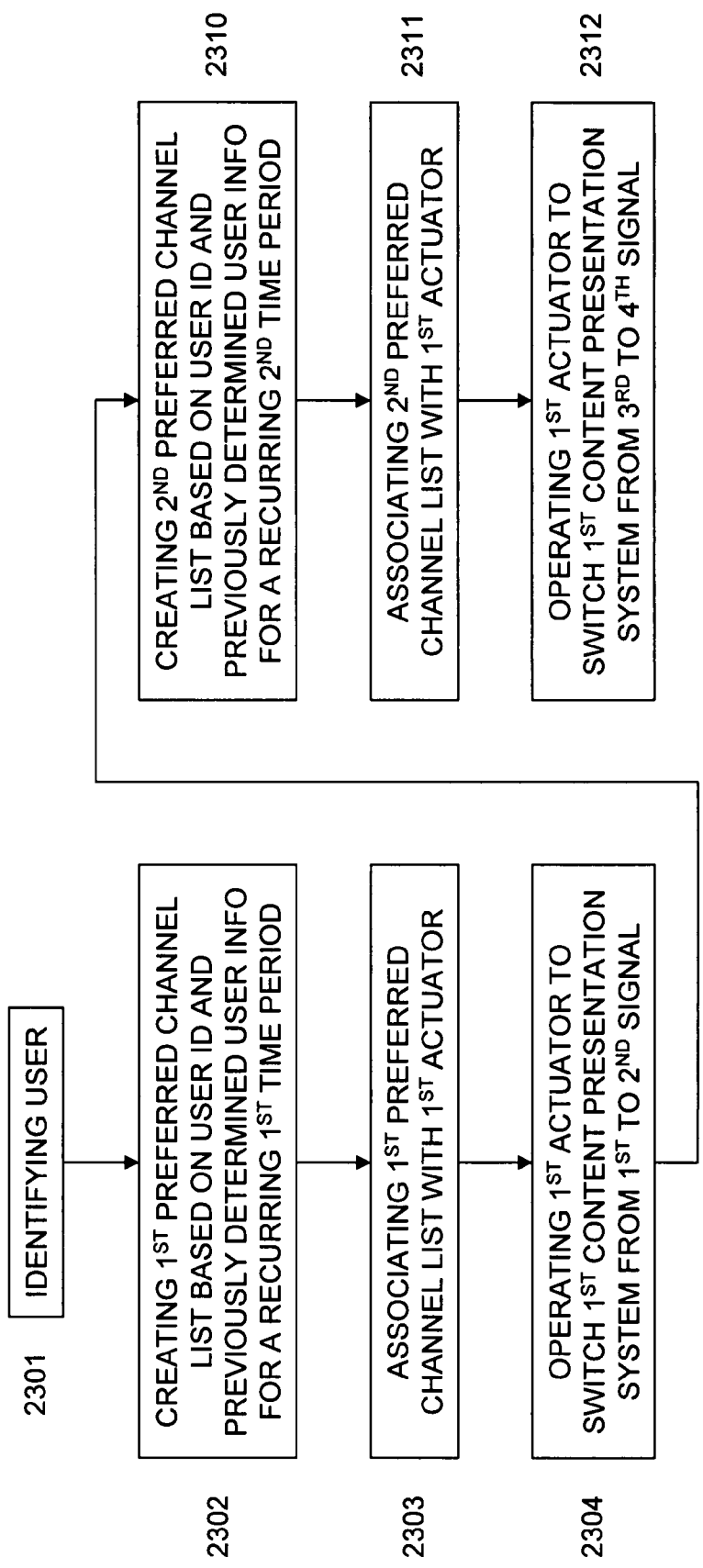
FIG. 23 is a flow diagram for switching signals using a preferred channel list according to an embodiment of the disclosure.

FIG. 23 is a flow diagram for switching signals using a preferred channel list according to an embodiment of the disclosure. Blocks 2301, 2302, 2303, and 2304 are similar to blocks 1801, 1802, 1803, and 1804, respectively. The method depicted in this embodiment may include at block 2310 creating a second preferred channel list based on the identity of the user and based on previously determined information for the user where the information is determined for a recurring second time period, at block 2311 associating the second preferred channel list with the first actuator operable by the user for interacting with the first content presentation system, and at block 2312 operating the first actuator to thereby switch the first content presentation system from presenting a third signal provided by the content provider to presenting a fourth signal provided by the content provider. As with the previous embodiment, the first and third signals may be the same and/or the second and fourth signals may be the same.

Figure 24:
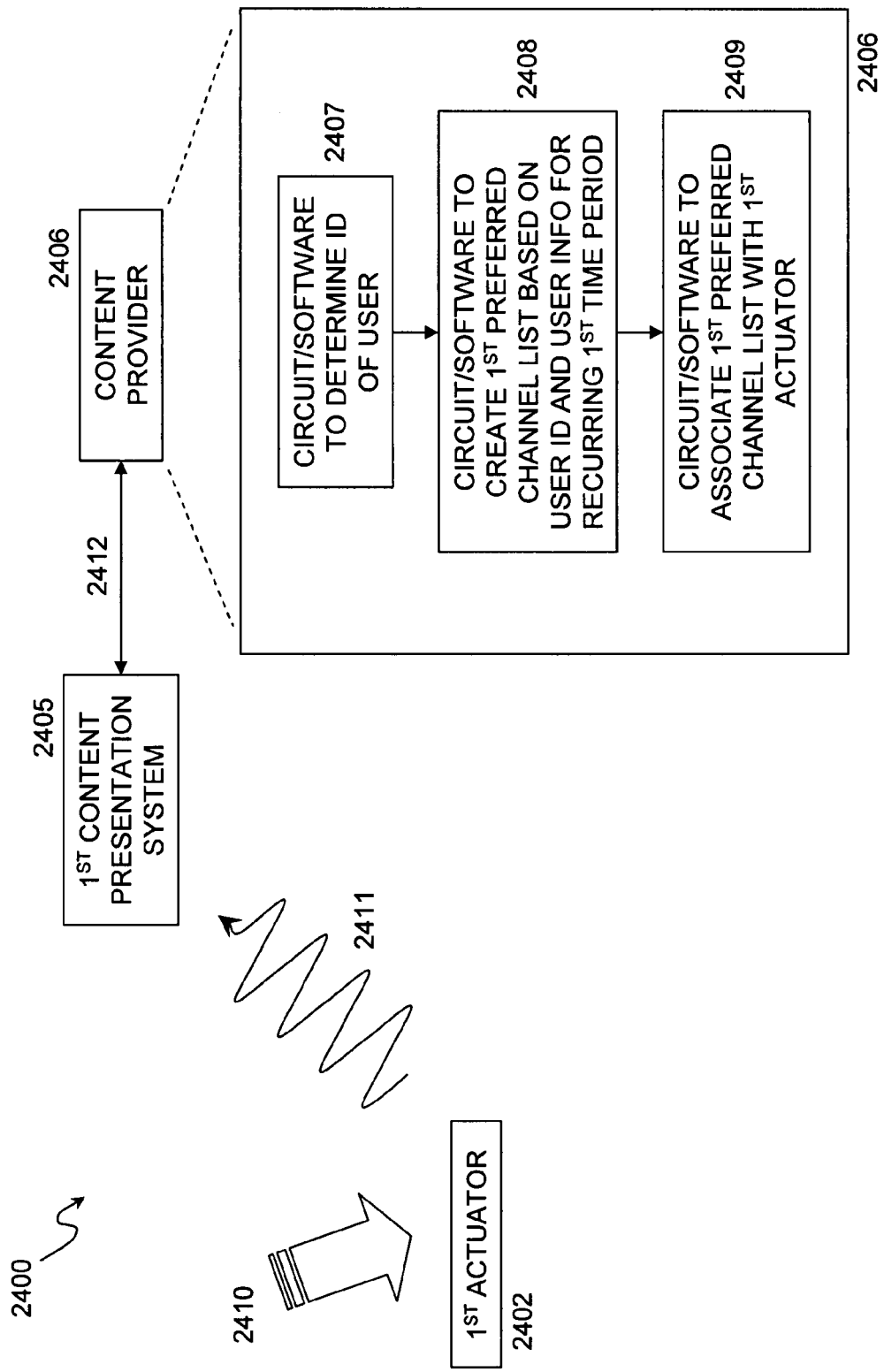
FIG. 24 is a block diagram of a system for switching signals using a preferred channel list according to an embodiment of the disclosure.

With attention now drawn to FIG. 24, a block diagram of a system 2400 for switching signals using a preferred channel list according to an embodiment of the disclosure is depicted. The system 2400 may preferably include a first actuator 2402 operable 2410 by a user for interacting via the transmission path 2411 with a first content presentation system 2405. The actuator 2402 and its operation 2410 may be the same as previously described. The system 2400 may be used for switching from a first signal provided by a content provider 2406 to a second signal provided by the content provider 2406 and may additionally include the first content presentation system 2405 operatively connected to the content provider 2406 via the transmission path 2512 where the content provider 2406 may provide one or more signals to the first content presentation system 2405 via transmission path 2512. The content provider 2406 may include circuitry 2407 for determining an identity of a user of the first content presentation system, circuitry 2408 for creating a first preferred channel list which may be based on the identity of the user and/or may be based on previously determined information for the user, where the information is determined for a recurring first time period, and circuitry 2409 for associating the first preferred channel list with the first actuator where the operation of the first actuator switches the first content presentation system from presenting the first signal provided by the content provider to presenting the second signal provided by the content provider. The recurring first time period may be, but is not limited to, a time period of one half hour duration, or one hour duration, that occurs at a same time of day for a plurality of days. As an example of one alternative, the recurring first time period may be, but is not limited to, a time period of one half hour duration, or one hour duration, that occurs at a same time of day on the same day of the week for a plurality of weeks.

Figure 25:
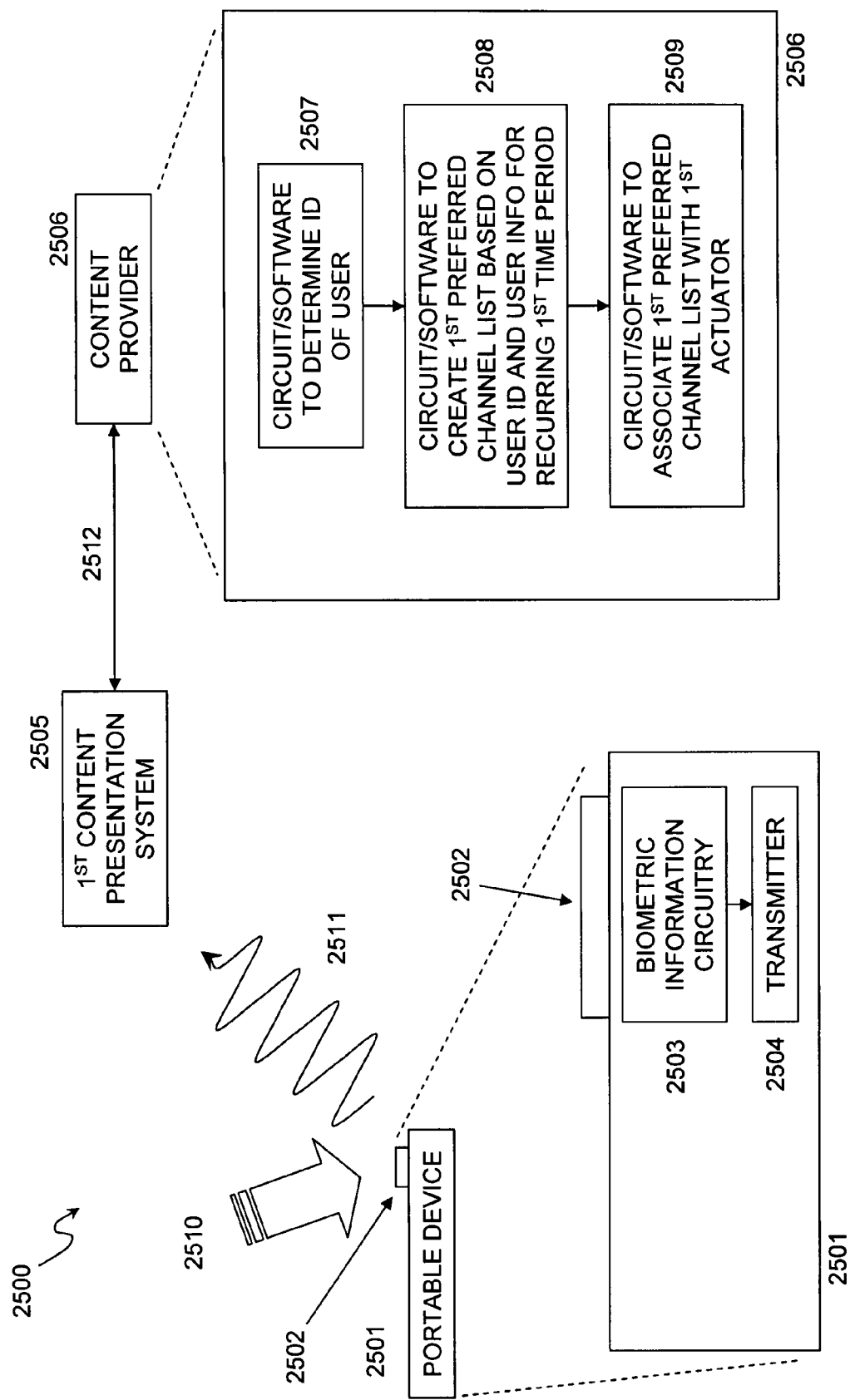
FIG. 25 is a block diagram of a system for switching signals using a preferred channel list according to an embodiment of the disclosure.

FIG. 25 is a block diagram of a system 2500 for switching signals using a preferred channel list according to an embodiment of the disclosure. Blocks 2505, 2506, 2507, 2508, and 2509 may contain circuitry similar to circuitry described above in blocks 2405, 2406, 2407, 2408, and 2409, respectively. Furthermore, the transmission paths 2511 and 2512 may be similar to the transmission paths 2411 and 2412, respectively. Additionally, the actuator 2502 may be similar to the actuator 2402 and operation 2510 of the actuator 2502 may be similar to operation 2410 of the actuator 2402. The circuitry for determining the identity of the user may include a first portable device 2501 which may include the first actuator 2502 which, as described above, may be operable 2510 by the user for interacting with the first content presentation system 2505. The first actuator 2502 may obtain biometric information from the user, which may be obtained via circuitry 2503 and circuitry 2504 may provide the obtained biometric information to the content provider 2506 via the transmission paths 2511 and 2512.

Figure 26:
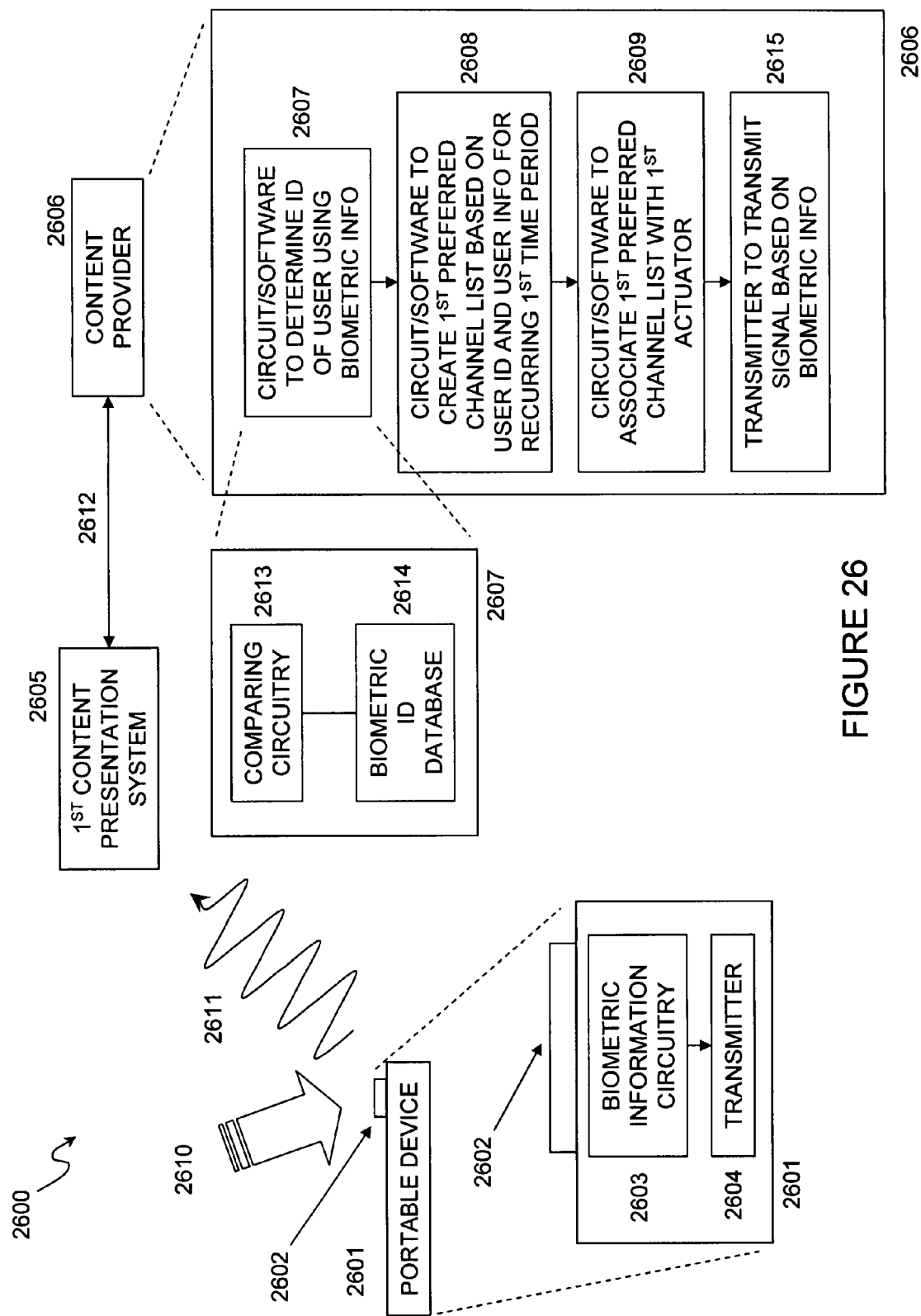
FIG. 26 is a block diagram of a system for switching signals using a preferred channel list according to an embodiment of the disclosure.

Turning now to FIG. 26, a block diagram of a system 2600 for switching signals using a preferred channel list according to an embodiment of the disclosure is depicted. Blocks 2601, 2603, 2604, 2605, 2606, 2608, and 2609 may contain circuitry similar to circuitry described above in blocks 2501, 2503, 2504, 2505, 2506, 2508, and 2809, respectively. Furthermore, the transmission paths 2611 and 2612 may be similar to the transmission paths 2511 and 2512, respectively. Additionally, the actuator 2602 may be similar to the actuator 2502 and operation 2610 of the actuator 2602 may be similar to operation 2510 of the actuator 2502. In the embodiment depicted the circuitry 2607 may determine at the content provider the identification of the user based on the provided biometric information. The circuitry 2607 may include circuitry 2613 for comparing the provided biometric information with a pre-existing database 2614 of biometric information. The biometric information may be as described above. Additionally, the content provider 2606 may include a transmitter 2615 for transmitting a signal from the content provider based at least in part on the provided biometric information.

Figure 27:
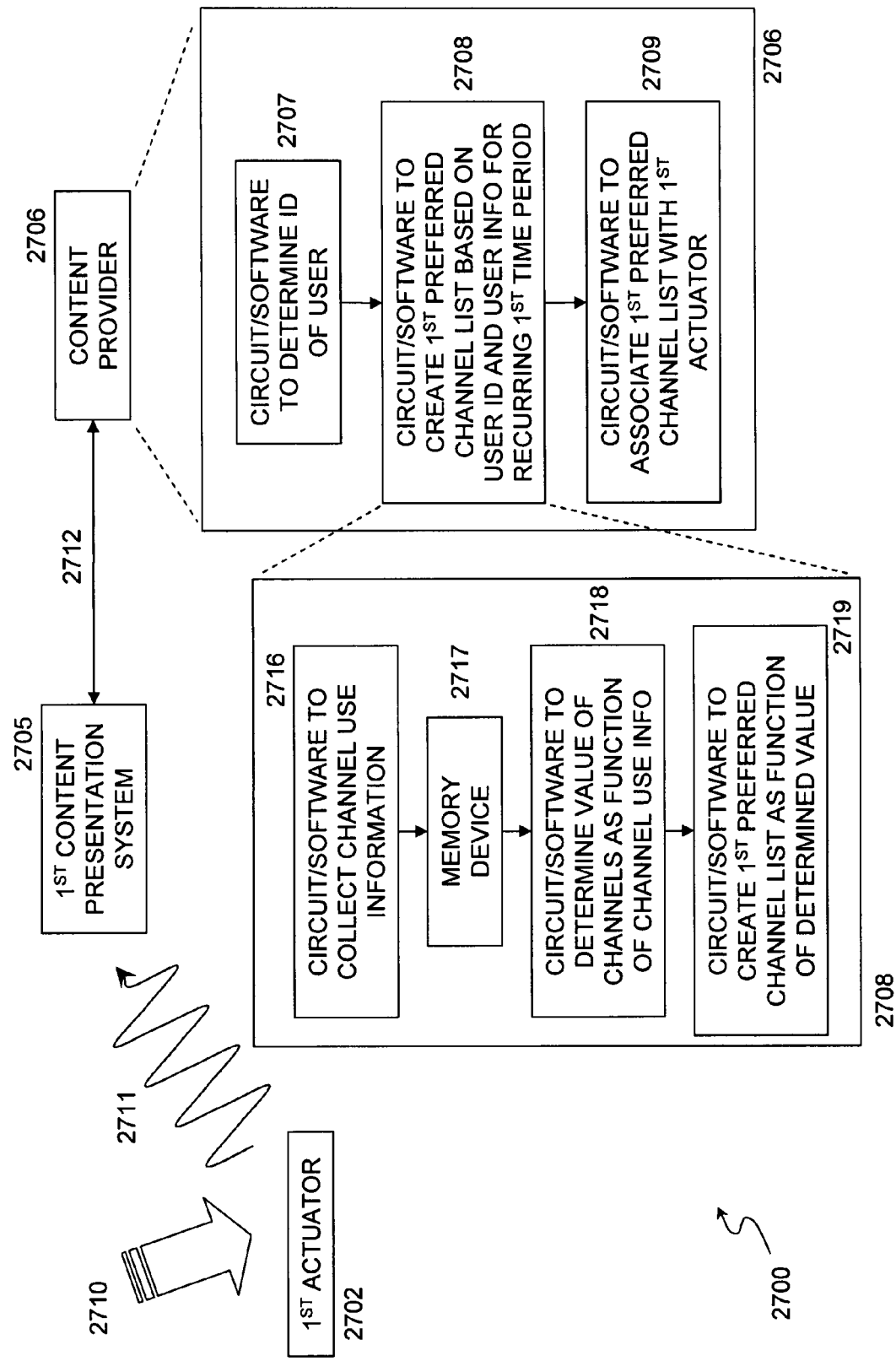
FIG. 27 is a block diagram of a system for switching signals using a preferred channel list according to an embodiment of the disclosure.

FIG. 27 is a block diagram of a system 2700 for switching signals using a preferred channel list according to an embodiment of the disclosure. Blocks 2705, 2706, 2707, 2708, and 2709 may contain circuitry similar to circuitry described above in blocks 2505, 2506, 2507, 2508, and 2509, respectively. Furthermore, the transmission paths 2711 and 2712 may be similar to the transmission paths 2511 and 2512, respectively. Additionally, the actuator 2702 may be similar to the actuator 2502 and operation 2710 of the actuator 2702 may be similar to operation 2510 of the actuator 2502. In the embodiment shown in FIG. 27, the circuitry 2708 for creating the first preferred channel list may include circuitry 2716 for collecting channel use information for each of a plurality of channels from the user's interaction with the first content presentation system, a memory device 2717 for storing the channel use information, circuitry 2718 for determining a value for each of a plurality of channels as a function of the channel use information, and circuitry 2719 for creating the first preferred channel list for the plurality of channels as a function of the determined value.

Figure 28:
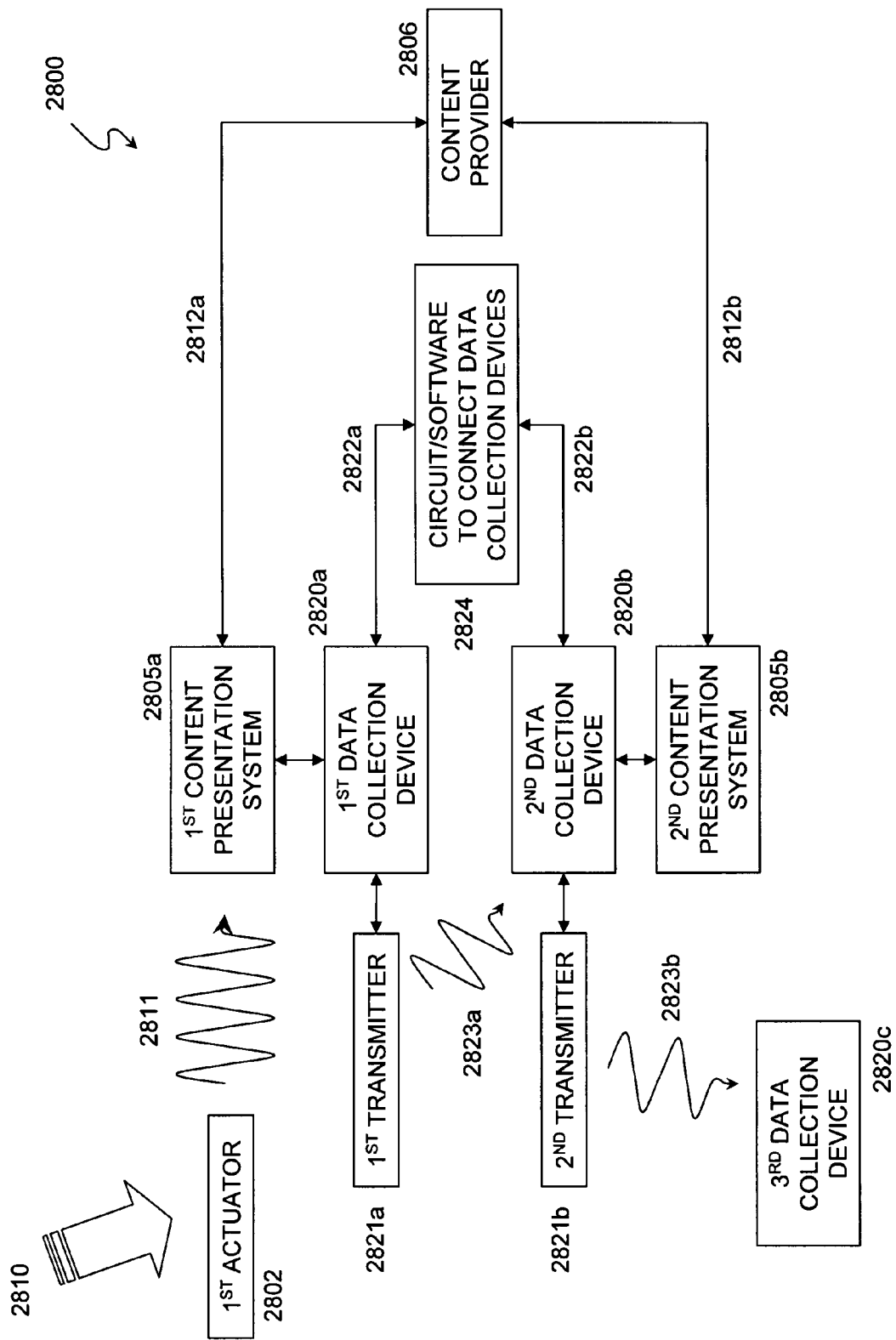
FIG. 28 is a block diagram of a system for switching signals using a preferred channel list according to an embodiment of the disclosure.

FIG. 28 is a block diagram of a system 2800 for switching signals using a preferred channel list according to an embodiment of the disclosure. Blocks 2805a and 2805b may each contain circuitry similar to circuitry described above in blocks 2505, and block 2806 may contain circuitry similar to circuitry described above in block 2506. Furthermore, the transmission path 2811 may be similar to the transmission path 2511, while the transmission paths 2812a and 2812b may each be similar to the transmission path 2512. Additionally, the actuator 2802 may be similar to the actuator 2502 and operation 2810 of the actuator 2802 may be similar to operation 2510 of the actuator 2502. The system 2800 may include circuitry 2824 for operatively connecting a first data collection device 2820a to a second data collection device 2820b, via the transmission paths 2822a and 2822b, and where the first data collection device 2820a is operatively connected to the first content presentation system 2805a and the second data collection device 2820b is operatively connected to a second content presentation system 2805b. Alternatively, first content presentation system 2805a and first data collection device 2820a may be an integral unit. Additionally, second content presentation system 2805b and second data collection device 2820b may be an integral unit. The first and second data collection devices may collect data such as, but not limited to, an identity of a user, channel use information for the user, and a first preferred channel list for the user. The interconnection of the first and second data collection devices, such as the circuitry 2824, allows for one-way or two-way transmission of at least one of the identity, the channel use information, and the first preferred channel list from/to the first data collection device to/from the second data collection device. Each of the first and second content presentation systems (2805a and b, respectively) may be operatively connected to the content provider 2806. In addition, an optional first transmitter 2821a may transmit via the transmission path 2823a at least one of the identity, the channel use information, and the first preferred channel list from the first data collection device to the second data collection device. The connection circuitry 2824 and the first transmitter 2821a may be the same. In a further embodiment, the system 2800 may include a second transmitter 2821b for transmitting via the transmission path 2823b at least one of the identity, the channel use information, and the first preferred channel list from the second data collection device 2820b to a third data collection device 2820c.

Figure 29:
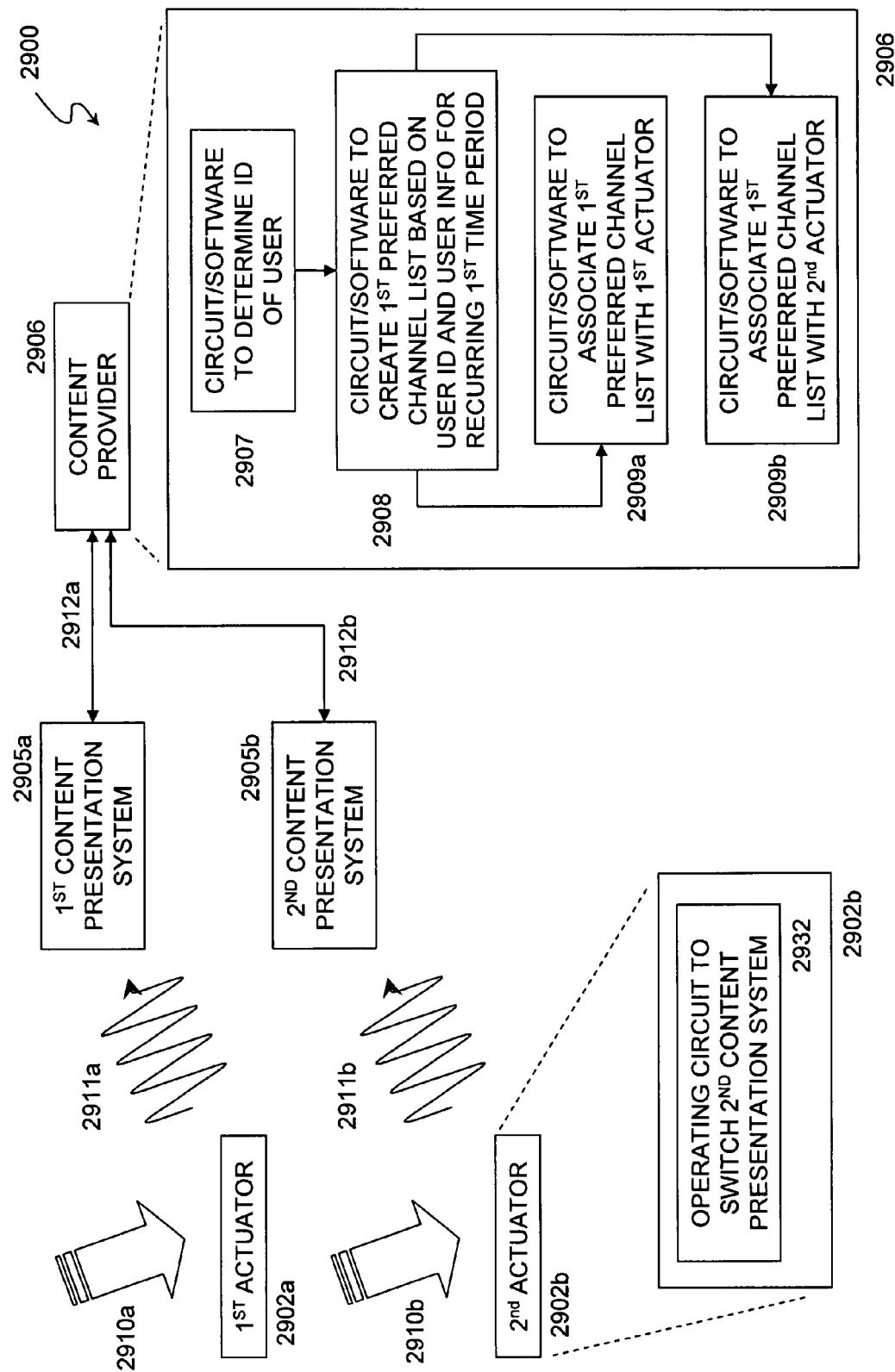
FIG. 29 is a block diagram of a system for switching signals using a preferred channel list according to an embodiment of the disclosure.

FIG. 29 is a block diagram of a system 2900 for switching signals using a preferred channel list according to an embodiment of the disclosure. Blocks 2905a and 2905b may each contain circuitry similar to circuitry described above in blocks 2505, and block 2906 may contain circuitry similar to circuitry described above in block 2506. Furthermore, the transmission paths 2911a and 2911b may be similar to the transmission path 2511, while the transmission paths 2912a and 2912b may each be similar to the transmission path 2512. Additionally, the first actuator 2902a and the second actuator 2902b may each be similar to the actuator 2502 and operation 2910a of the first actuator 2902a and operation 2910b of the second actuator 2902b may each be similar to operation 2510 of the actuator 2502. Moreover, blocks 2907 and 2908 may contain circuitry similar to circuitry described above in blocks 2507 and 2508, respectively. Also, block 2909a may contain circuitry similar to circuitry described above in blocks 2509. The content provider 2906 may include circuitry 2909b for associating the first preferred channel list with the second actuator 2902b operable 2910b by the user for interacting with the second content presentation system 2905b via the transmission path 2911b. The actuator 2902b may further include circuitry 2932 for switching the second content presentation system 2905b from presenting a third signal provided by the content provider 2906 to presenting a fourth signal provided by the content provider 2906. In particular embodiments, the first and the third signals may be the same and/or the second and the fourth signals may be the same.

Figure 30:
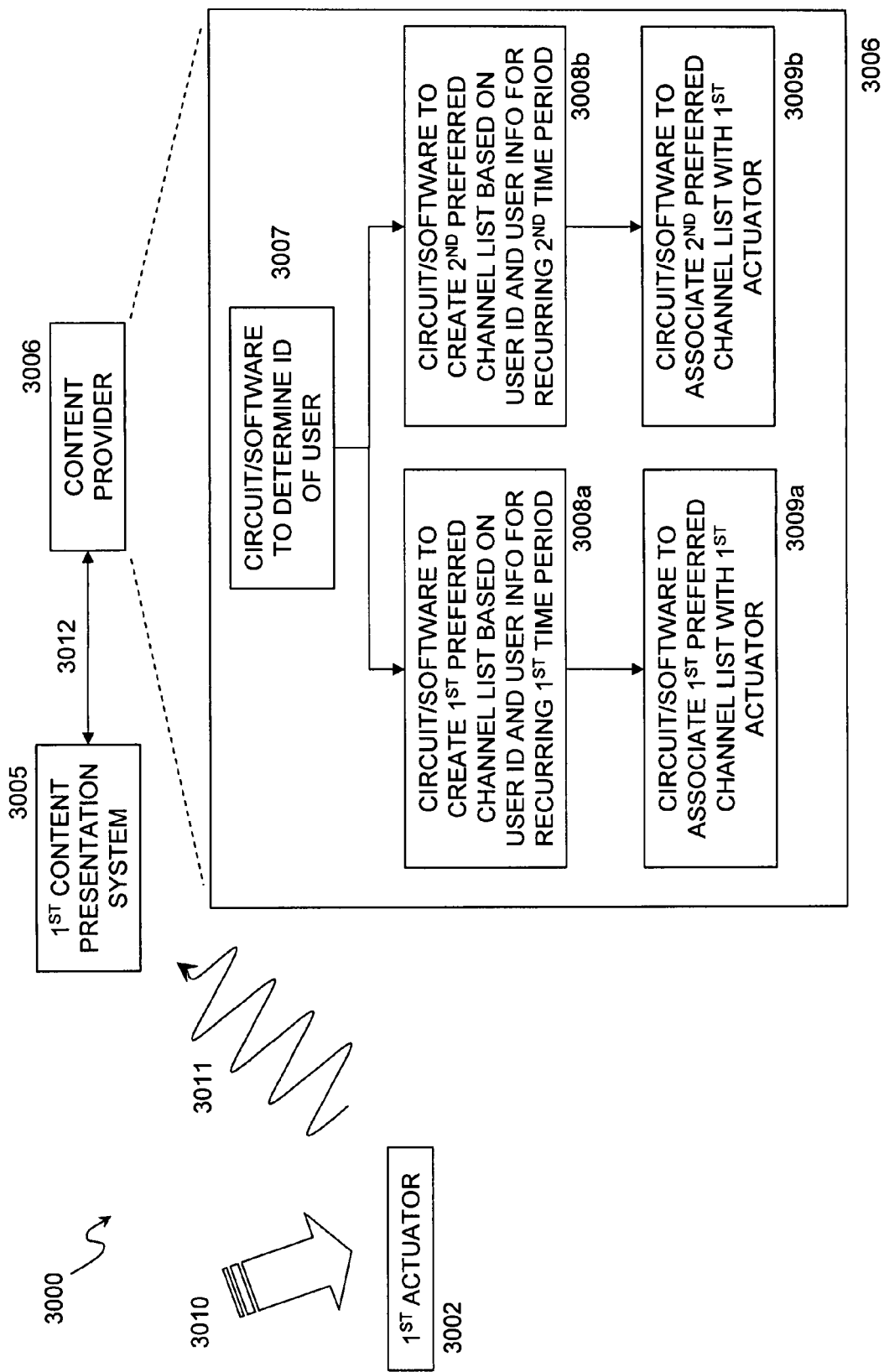
FIG. 30 is a block diagram of a system for switching signals using a preferred channel list according to an embodiment of the disclosure.

FIG. 30 is a block diagram of a system 3000 for switching signals using a preferred channel list according to an embodiment of the disclosure. Blocks 3005 and 3006 may contain circuitry similar to circuitry described above in blocks 2505 and 2506, respectively. Blocks 3007, 3008a, and 3009a may contain circuitry similar to circuitry described above in blocks 2507, 2508, and 2509, respectively. Furthermore, the transmission paths 3011 and 3012 may be similar to the transmission paths 2511 and 2512, respectively. The first actuator 3002 may be similar to the actuator 2502 and operation 3010 of the first actuator 3002 may be similar to operation 2510 of the actuator 2502. This embodiment may include at the content provider 3006 circuitry 3008b for creating a second preferred channel list based on the identity of the user and based on previously determined information for the user where the information is determined for a recurring second time period, and circuitry 3009b for associating the second preferred channel list with the first actuator operable by the user for interacting with the first content presentation system, where operating the first actuator switches the first content presentation system from presenting a third signal provided by the content provider to presenting a fourth signal provided by the content provider. The first and second recurring time periods are as described above. In additional embodiments, the first and the third signals may be the same and/or the second and the fourth signals may be the same.

Figure 31:
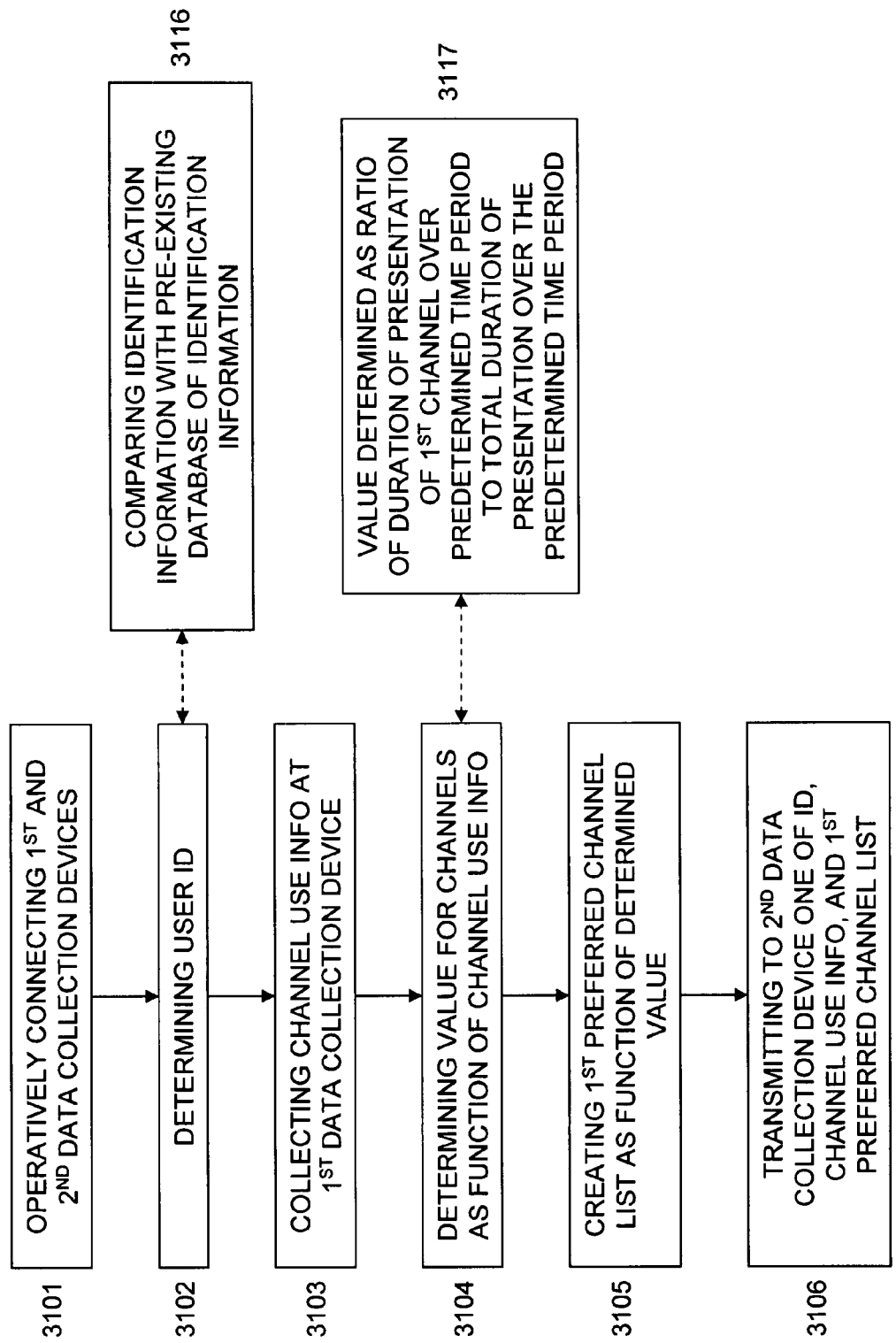
FIG. 31 is a flow diagram for sharing user information according to an embodiment of the disclosure.

With attention now directed towards FIG. 31, a flow diagram is depicted for sharing user information according to an embodiment of the disclosure. The method includes operatively connecting a first data collection device to a second data collection device at block 3101. The data collection devices may be as described above and may be, for example, a modified television set-top box, where the set-top box is commonly used when interacting with a cable or satellite television broadcaster. The first data collection device is operatively connected to a first content presentation system and the second data collection device is operatively connected to a second content presentation system. The first and second content presentation systems are each operatively connected to a content provider. The content presentation system and the content provider may be as respectively described above. At block 3102, an identity of a user interacting with the first content presentation system may be determined. This may be accomplished according to one of the techniques discussed above, for example through the use of identification information such as biometrics, voice activation, fingerprint, user-entered password, use of a unique key on a remote device by which the user interacts with the first content presentation system, use of a unique remote device by which the user interacts with the first content presentation system, and combinations thereof. Additionally, at block 3116 determining the identity of the user may include comparing the identification information with a pre-existing database of identification information. At block 3103, channel use information may be collected at the first data collection device for each of a plurality of channels from the user's interaction with the first content presentation system, as previously described. At block 3104, at the first data collection device, a value for each of the plural channels as a function of the channel use information may be determined, for example as indicated at block 3117, by determining a ratio of a total duration of a presentation of content associated with the first channel over a predetermined time period to a total duration of a presentation of content associated with each of the plural channels over the predetermined time period. The channel use information may include information such as a channel number of a first one of a plurality of channels transmitted by the content provider, a time of initiating a presentation of content associated with the first channel to the user; a date of initiating a presentation of content associated with the first channel to the user; a duration of a presentation of content associated with the first channel to the user; a total duration of a presentation of content associated with each of the plural channels to the user, and combinations thereof. At block 3105 a preferred channel list may be created at the first data collection device for the plural channels as a function of the determined value, as previously described. At block 3106, information such as the identity of the user, the channel use information, and the preferred channel list may be transmitted from the first data collection device to the second data collection device.

In an embodiment, the first and second data collection devices may be connected via a wireless link, such as a multiple access link. The wireless link may also carry information from the content provider. Alternatively, the first and second data collection devices may be connected via a wired link. Moreover, the wires in the wired link may also be power supply wires.

In another embodiment, at least one of the identity of the user, the channel use information, and the preferred channel list is automatically updated based on the user's interaction with the first content presentation system.

Figure 32:
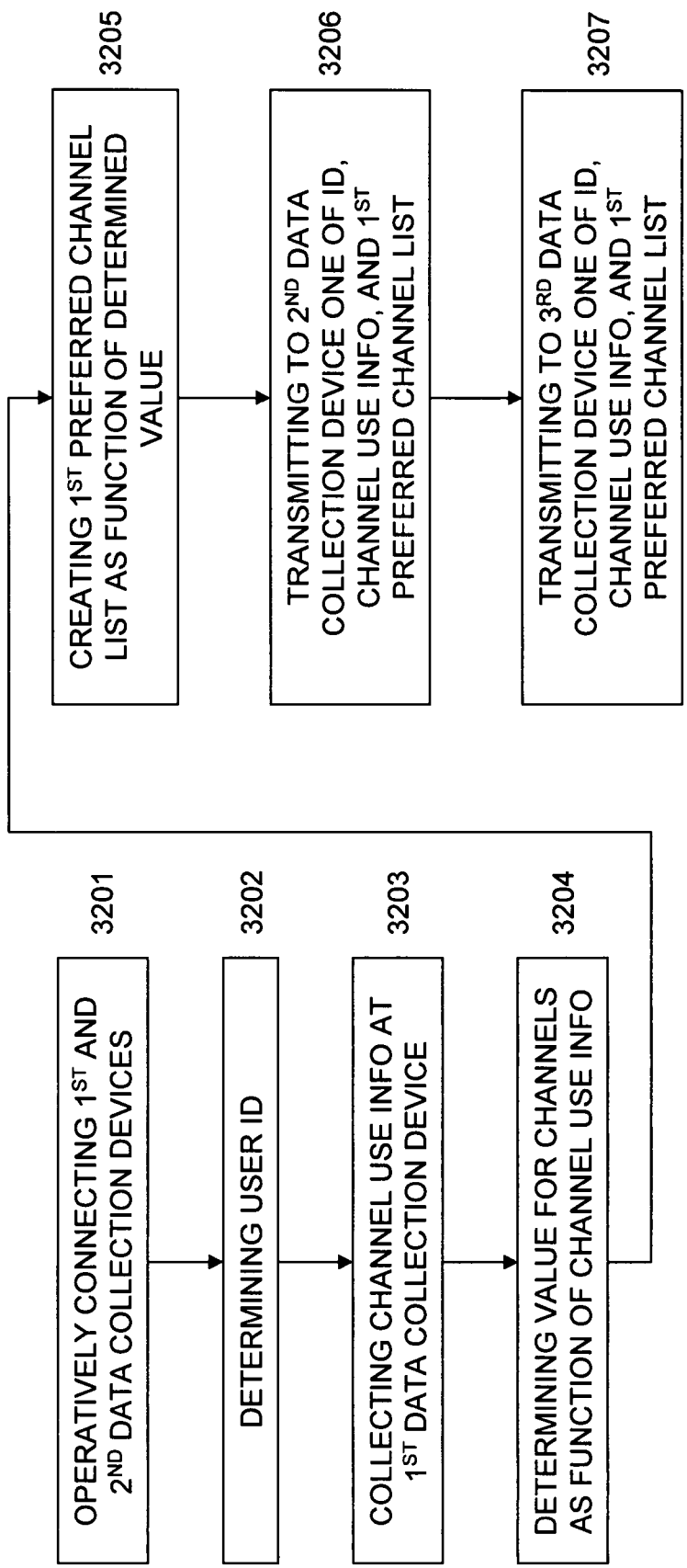
FIG. 32 is a flow diagram for sharing user information according to an embodiment of the disclosure.

FIG. 32 is a flow diagram for sharing user information according to an embodiment of the disclosure, where blocks 3201, 3202, 3203, 3204, 3205, and 3206 are similar to blocks 3101, 3102, 3103, 3104, 3105, and 3106, respectively. This embodiment includes, at block 3207, transmitting at least one of the identity, the channel use information, and the preferred channel list from the second data collection device to a third data collection device.

Figure 33:
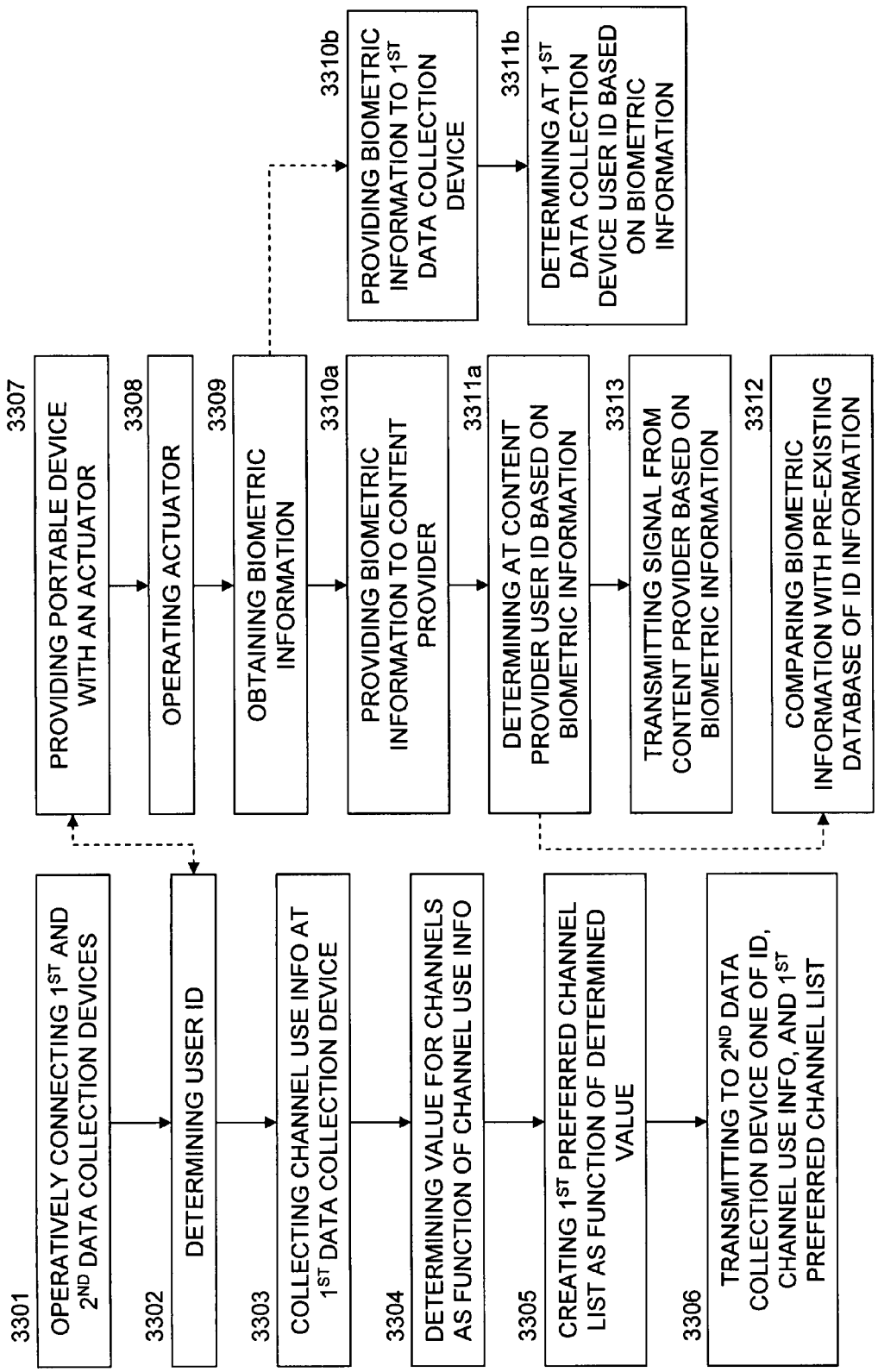
FIG. 33 is a flow diagram for sharing user information according to an embodiment of the disclosure.

FIG. 33 is a flow diagram for sharing user information according to an embodiment of the disclosure where blocks 3301, 3302, 3303, 3304, 3305, and 3306 are similar to blocks 3101, 3102, 3103, 3104, 3105, and 3106, respectively. The determining of the identity of the user at block 3302 may include, at block 3307 providing a first portable device to interact with the first content presentation system, where the first portable device includes an actuator which is operable by the user for interacting with the first content presentation system via the first portable device, and where the actuator obtains biometric information from the user, at block 3308 operation of the actuator by the user, and at block 3309 obtaining biometric information from the user via the actuator.

In a further embodiment, at block 3310*a* providing the obtained biometric information to the content provider, at block 3311*a* the identification of the user may be determined at the content provider based on the provided biometric information. The determining of the identification of the user may include, at block 3312, comparing the provided biometric information with a pre-existing database of biometric information.

In one alternative embodiment, at block 3310*b* providing the obtained biometric information to the first data collection device, and at block 3311*b* the identification of the user may be determined at the first data collection device based on the provided biometric information, using any method herein described.

In yet another embodiment, a signal may be transmitted from the content provider based on the provided biometric information, as indicated at block 3313, such as a signal containing entertainment programming or any other type of programming. As stated above, one of the advantages of determining the user's identity at a central location, such as the content provider, a network operation center, a content presentation system, a data collection device, or similar place that may serve as a nexus for accessing programming content, is that the user's identification information, preferences, and other useful information may be accessed through a variety of means rather than having access restricted to use a single remote control device, for example.

Figure 34:
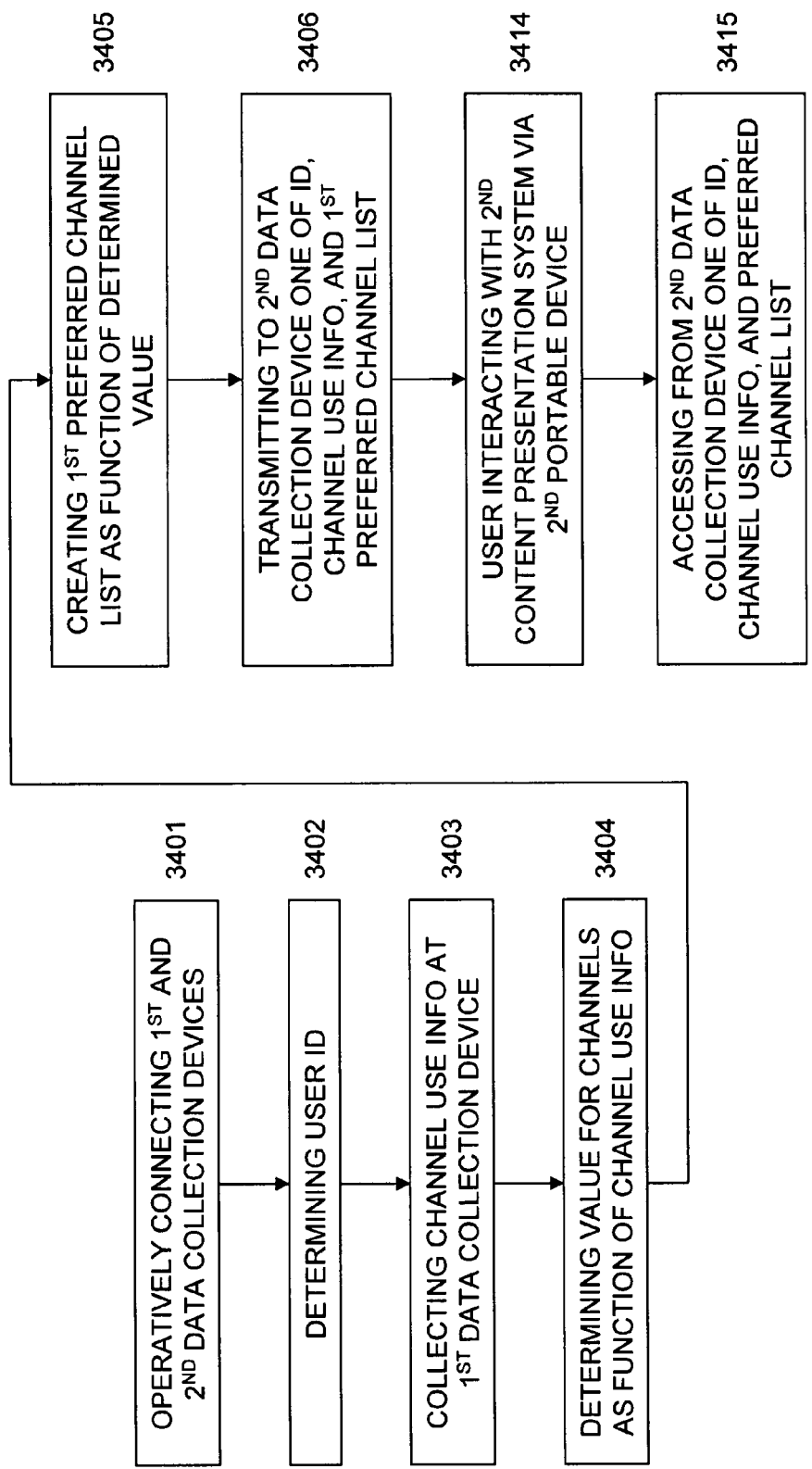
FIG. 34 is a flow diagram for sharing user information according to an embodiment of the disclosure.

FIG. 34 is a flow diagram for sharing user information according to an embodiment of the disclosure where blocks 3401, 3402, 3403, 3404, 3405, and 3406 are similar to blocks 3101, 3102, 3103, 3104, 3105, and 3106, respectively. In this embodiment, the user may interact with the second content presentation system via a second portable device, as indicated at block 3414, and at least one of the identity, the channel use information, and the preferred channel list may be accessed from the second data collection device, as indicated at block 3415.

Figure 35:
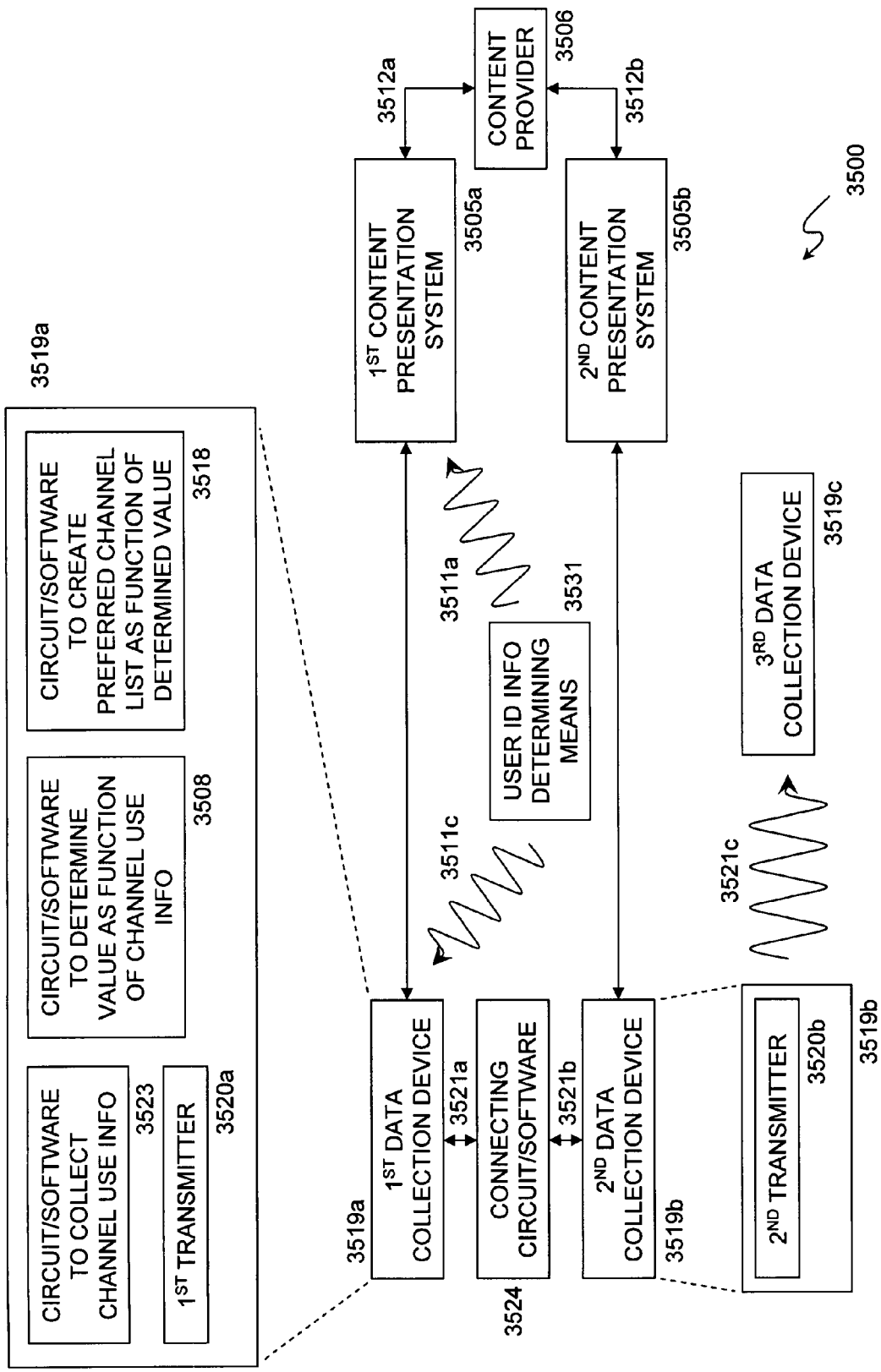
FIG. 35 is a block diagram of a system for sharing user information according to an embodiment of the disclosure.

FIG. 35 is a block diagram of a system 3500 for sharing user information according to an embodiment of the disclosure. The system 3500 may include circuitry 3524 for connecting a first data collection device 3519a to a second data collection device 3519b via the transmission paths 3521a and 3521b, respectively. The first data collection device 3519a may be operatively connected to a first content presentation system 3505a and the second data collection device 3519b may be operatively connected to a second content presentation system 3505b. The first and second content presentation systems (3505a and 3505b, respectively) may each be operatively connected to a content provider 3506 via the transmission paths 3512a and 3512b, respectively. The system 3500 may include means 3531 for determining identification information of a user interacting with the system 3500 through one or both of transmission paths 3511a and/or 3511c. The first data collection device 3519a may include circuitry 3523 for collecting channel use information at the first data collection device 3519a for each of a plurality of channels from the user's interaction with the system 3500, circuitry 3508 for determining at the first data collection device 3519a a value for each of the plural channels as a function of the channel use information, circuitry 3518 for creating a preferred channel list at the first data collection device 3519a for the plural channels as a function of the determined value, and a first transmitter 3520a for transmitting at least one of the identity, the channel use information, and the preferred channel list from the first data collection device 3519a to the second data collection device 3519b. This transmission may be via the circuitry 3524 for connecting the first data collection device 3519a to the second data collection device 3519b, or alternatively, the transmission may use a separate transmission path, such as a separate wired or wireless path. In an embodiment, the system 3500 may further include a second transmitter 3520b for transmitting at least one of the identity, the channel use information, and the preferred channel list from the second data collection device 3519b to a third data collection device 3519c via wired or wireless transmission path 3521c. As discussed above, one or more of the data collection devices (3519a, b, c) may be a modified television set-top box. The content presentation systems (3505a, b) may each be one or more of a television, a radio, an internet-connected device, a music playing device, a portable entertainment device, a personal digital assistant, a cellular phone/information system, and combinations thereof.

The user identifying means 3531 may determine the user's identification using identification information such as biometrics, voice activation, fingerprint, user-entered password, use of a unique key on a remote device by which the user interacts with the first content presentation system, use of a unique remote device by which the user interacts with the first content presentation system, and combinations thereof.

In an embodiment, at least one of the identity, the channel use information, and the preferred channel list is automatically updated based on the user's interaction with the first content presentation system 3505a. The channel use information may include information such as a channel number of a first one of a plurality of channels transmitted by the content provider, a time of initiating a presentation of content associated with the first channel to the user; a date of initiating a presentation of content associated with the first channel to the user; a duration of a presentation of content associated with the first channel to the user; a total duration of a presentation of content associated with each of the plural channels to the user, and combinations thereof. Furthermore, circuitry 3508 may determine the value for the first channel as a ratio of a total duration of a presentation of content associated with the first channel over a predetermined time period to a total duration of a presentation of content associated with each of the plural channels over the predetermined time period.

In another embodiment, the first and second data collection devices 3521a and 3521b, respectively, may be connected via a wireless link, such as a multiple access link. The wireless link may also carry information from the content provider 3506. Alternatively, the first and second data collection devices, 3521a and 3521b, respectively, may be connected via a wired link. Moreover, the wires in the wired link may also be power supply wires.

Figure 36:
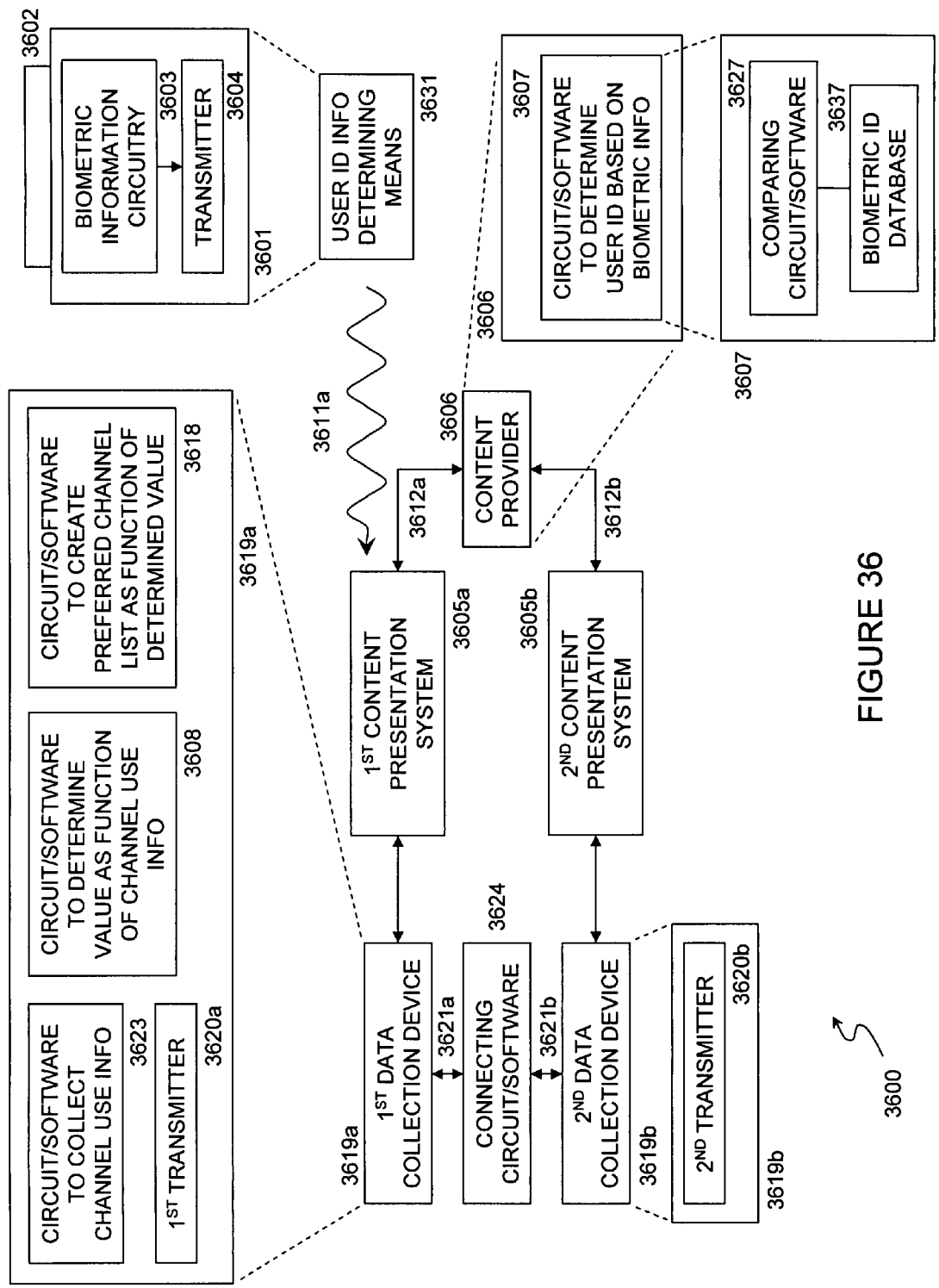
FIG. 36 is a block diagram of a system for sharing user information according to an embodiment of the disclosure.

FIG. 36 is a block diagram of a system 3600 for sharing user information according to an embodiment of the disclosure. In system 3600, blocks 3605a, 3605b, 3606, 3619a, 3619b, 3624, 3631, 3623, 3620a, 3620b, 3608, and 3618 may contain circuitry similar to circuitry described above in blocks 3505a, 3505b, 3506, 3519a, 3519b, 3524, 3531, 3523, 3520a, 3620b, 3508, and 3518, respectively. Furthermore, the transmission paths 3611a, 3612a, 3612b, 3621a, and 3621b may be similar to the transmission paths 3511a, 3512a, 3512b, 3521a, and 3521b, respectively. In system 3600, the means 3631 for determining of the identity of the user may include a first portable device 3601 capable of interacting with the first content presentation system 3605a via the transmission path 3611a (preferably, but not necessarily, a wireless transmission path), where the first portable device 3601 includes an actuator 3602 which is operable by the user for interacting with the first content presentation system 3605a via the first portable device 3601, and circuitry 3603 for obtaining biometric information from the user upon operation of the actuator 3602, all as previously described above.

A further embodiment may include circuitry 3604 for providing the obtained biometric information to the content provider 3606. The content provider 3606 may include circuitry 3607 for determining at the content provider the identification of the user based on the provided biometric information. Moreover, the circuitry 3607 for determining the identification of the user may include circuitry 3627 for comparing the provided biometric information with a pre-existing database 3637 of biometric information.

Figure 37:
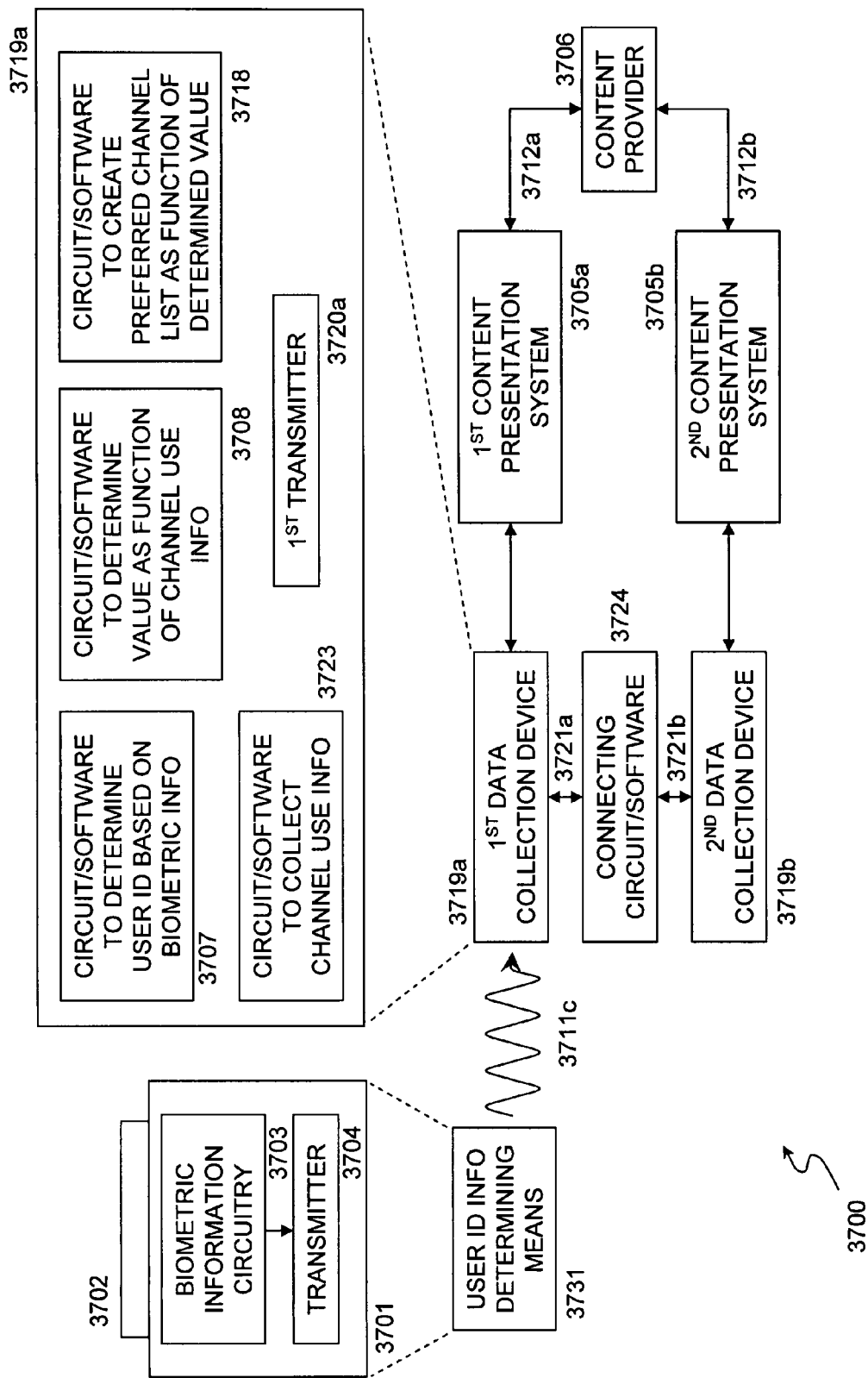
FIG. 37 is a block diagram of a system for sharing user information according to an embodiment of the disclosure.

FIG. 37 is a block diagram of a system 3700 for sharing user information according to an embodiment of the disclosure. In system 3700, blocks 3705a, 3705b, 3706, 3719a, 3719b, 3724, 3731, 3723, 3720a, 3708, and 3718 may contain circuitry similar to circuitry described above in blocks 3505a, 3505b, 3506, 3519a, 3519b, 3524, 3531, 3523, 3520a, 3620b, 3508, and 3518, respectively. Block 3707 may contain circuitry similar to circuitry described above in block 3607. Furthermore, the transmission paths 3711c, 3712a, 3712b, 3721a, and 3721b may be similar to the transmission paths 3511c, 3512a, 3512b, 3521a, and 3521b, respectively. In the system 3700, the means 3731 for determining the identification information of the user may include a first portable device 3701 capable of interacting with the first data collection device 3719a via the transmission path 3711c (preferably, but not necessarily, a wireless transmission path), wherein the first portable device 3701 includes an actuator 3702 which is operable by the user for interacting with the first data collection device 3719a via the first portable device 3701. The first portable device 3701 may include circuitry 3703 for obtaining biometric information from the user upon operation of the actuator 3702, a transmitter 3704 for transmitting the obtained biometric information to the first data collection device 3719a, and circuitry 3707 for determining at the first data collection device 3719a the identification of the user based on the provided biometric information.

Figure 38:
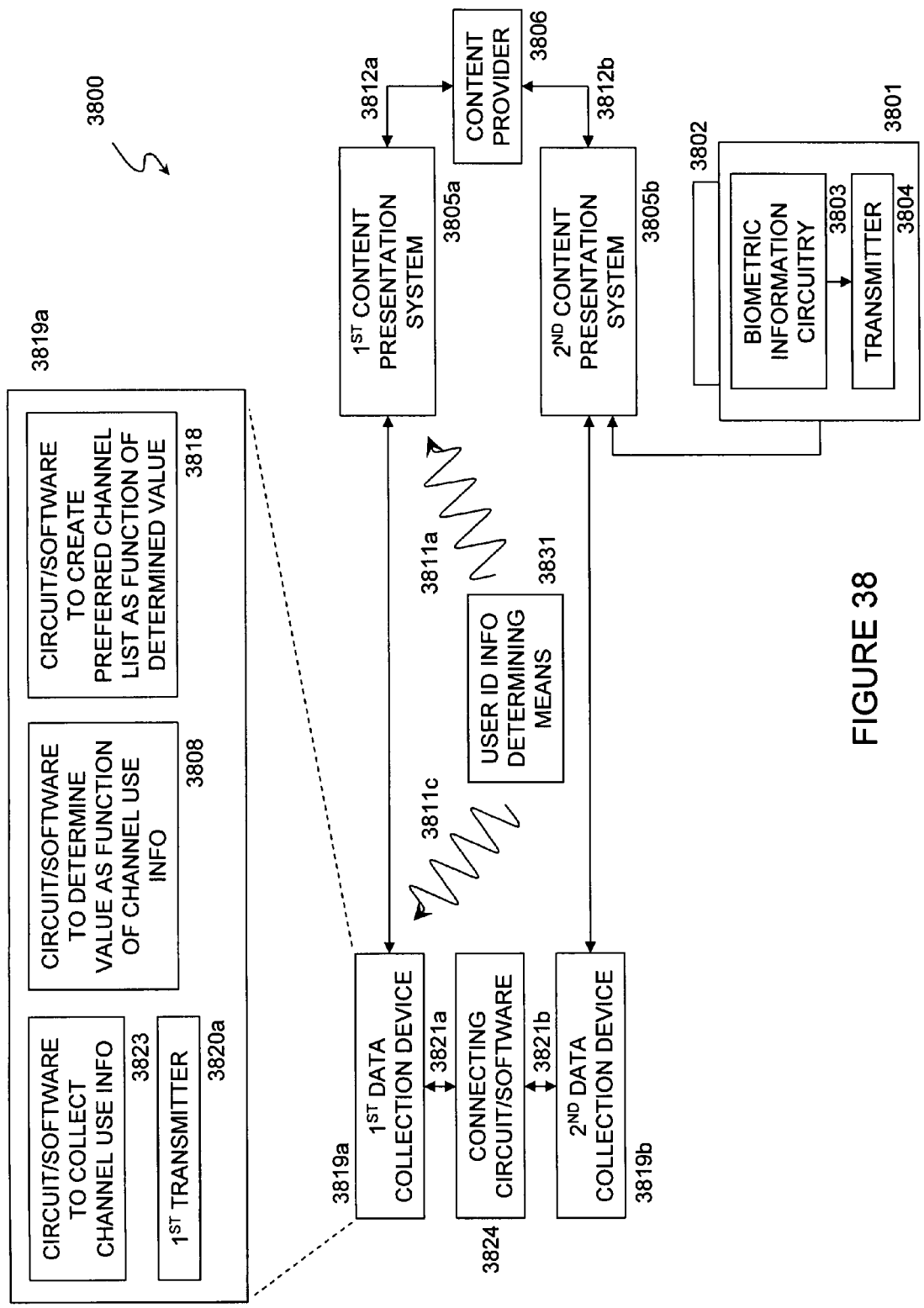
FIG. 38 is a block diagram of a system for sharing user information according to an embodiment of the disclosure.

FIG. 38 is a block diagram of a system 3800 for sharing user information according to an embodiment of the disclosure. In system 3800, blocks 3805a, 3805b, 3806, 3819a, 3819b, 3824, 3831, 3823, 3820a, 3808, and 3818 may contain circuitry similar to circuitry described above in blocks 3505a, 3505b, 3506, 3519a, 3519b, 3524, 3531, 3523, 3520a, 3620b, 3508, and 3518, respectively. Furthermore, the transmission paths 3811a, 3811c, 3812a, 3812b, 3821a, and 3821b may be similar to the transmission paths 3511a, 3511c, 3512a, 3512b, 3521a, and 3521b, respectively. The system 3800 may include a second portable device 3801 capable of interacting with the second content presentation system 3805b, wherein the user can access at least one of the identity, the channel use information, and the preferred channel list from the second data collection device. The second portable device 3801 may include circuitry 3803 for obtaining biometric information from the user upon operation of the actuator 3802, and a transmitter 3804 for transmitting the obtained biometric information.

Figure 39:
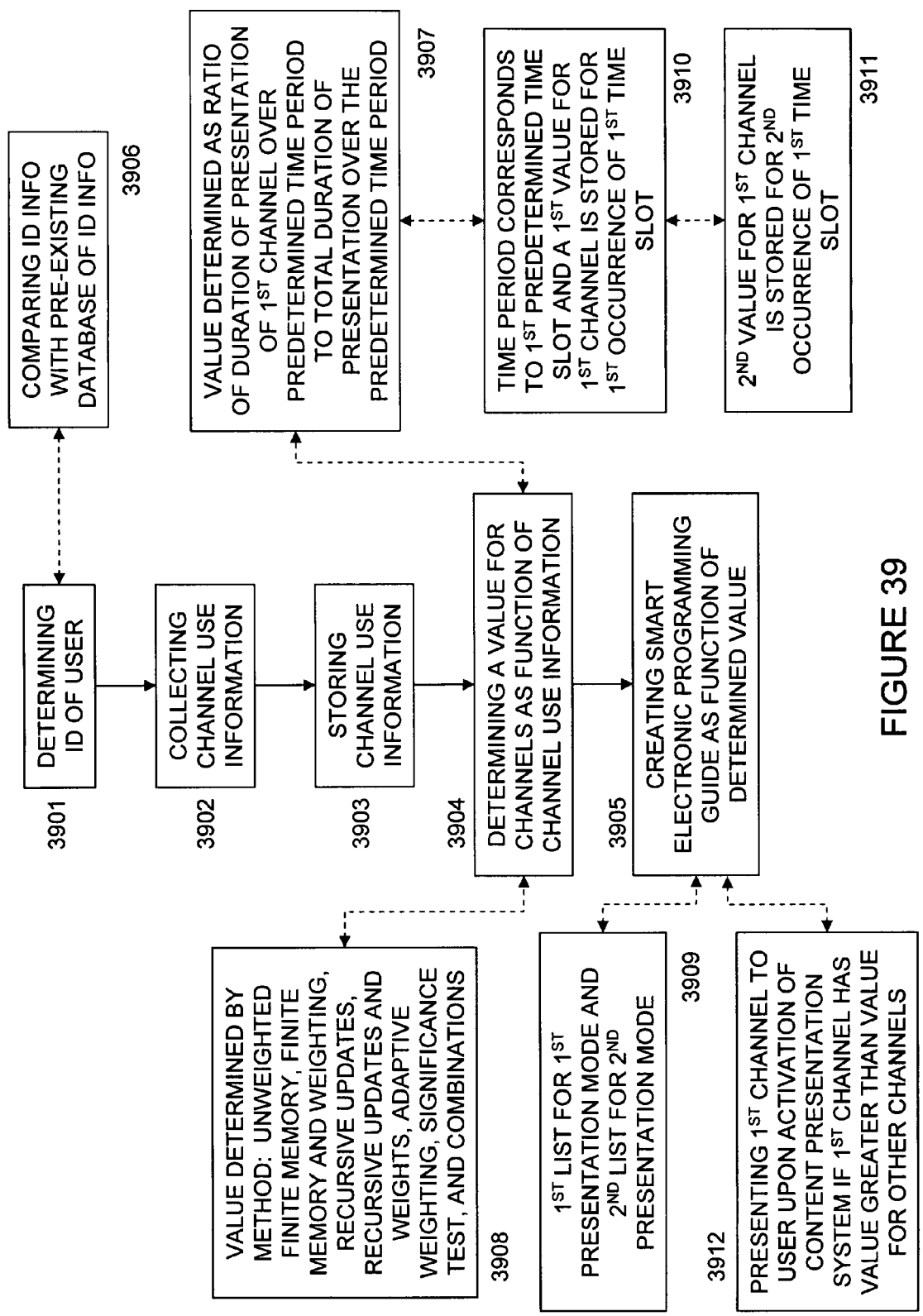
FIG. 39 is a flow diagram for creating a smart electronic programming guide according to an embodiment of the disclosure.

Now directing attention to FIG. 39, a flow diagram is shown for creating a smart electronic programming guide according to an embodiment of the disclosure. The method may include at block 3901 determining an identity of a user interacting with a content presentation system, at block 3902 collecting channel use information for each of a plurality of channels from the user's interaction with the content presentation system, at block 3903 storing the channel use information, at block 3904 determining a value for each of the plural channels as a function of the channel use information, and at block 3905 creating a smart electronic programming guide for the plural channels as a function of the determined value.

The identification of the user may be determined using identification information such as biometrics, voice activation, fingerprint, user-entered password, use of a unique key on a remote device by which the user interacts with the content presentation system, use of a unique remote device by which the user interacts with the content presentation system, and combinations thereof. At block 3901, the identity of a user may be determined at block 3906 by comparing the identification information with a pre-existing database of identification information.

In one embodiment, the determination of the value for a first channel of the plurality of channels at block 3904 may be determined at block 3907 as a ratio of a total duration of a presentation of content associated with the first channel over a predetermined time period to a total duration of a presentation of content associated with each of the plural channels over the predetermined time period. As previously stated, the predetermined time period may be approximately one half hour, approximately one hour, approximately one day, less than or equal to one week, or more than one week. Optionally, the predetermined time period may correspond to a first predetermined time slot and a first value for the first channel is stored for a first occurrence of the first predetermined time slot as indicated at block 3910. Also, a second value for the first channel may be stored for a second occurrence of the first predetermined time slot as indicated at block 3911. The determined value for the first channel in block 3904 may include the first and second values from blocks 3910 and 3911.

At block 3902, the channel use information may include, but is not limited to, a channel number of a first one of the plural channels, a time of initiating a presentation of content associated with the first channel to the user; a date of initiating a presentation of content associated with the first channel to the user; a duration of a presentation of content associated with the first channel to the user; a total duration of a presentation of content associated with each of the plural channels to the user, and combinations thereof. In an alternative embodiment, the channel use information may not include information for any of the plural channels for which a duration of a presentation of content associated with any of the plural channels is less than a predetermined amount, so as to minimize the effect of "channel surfing" on the determination of channel values in block 3904, where the channel values may be determined as a ratio of a total duration of a presentation of content associated with the first channel over a predetermined time period to a total duration of a presentation of content associated with each of the plural channels over the predetermined time period, where the predetermined time period may be as described above.

In another embodiment, the determination of channel values at block 3904 may include a determination based on an unweighted finite memory method, a finite memory and weighting method, a method using recursive updates; a method using recursive updates and weights, an adaptive weighting method, a significance test, and combinations thereof, as indicated at block 3908.

At block 3912, the smart electronic programming guide created at block 3905 may include a first channel which has a value greater than a value for any other of the plural channels, as determined at block 3904. Upon activation of the content presentation system, the first channel may be presented to the user.

In yet another embodiment, the smart electronic programming guide may only include ones of the plural channels that have a determined value greater than a predetermined amount and/or the smart electronic programming guide may only include ones of the plural channels that have a determined value for a predetermined time slot greater than a predetermined amount.

In still another embodiment, the method may include, at block 3909, creating a first smart electronic programming guide for the plural channels for a first mode of content delivery by the content presentation system and creating a second smart electronic programming guide for the plural channels for a second mode of content delivery by the content presentation system. As stated above, the content presentation system may include a television, a radio, an internet-connected device, a music playing device, a portable entertainment device, a personal digital assistant, a cellular phone/information system, and combinations thereof. In an example of the first and second modes of content delivery, the content presentation system may be a television and the first mode of content delivery may be via a main television display and the second mode of content delivery may be via a picture-in-picture display.

In a further embodiment, the smart electronic programming guide created at block 3905 may include a first section listing a first channel of the plurality of channels based on the determined value from block 3904, and a second section listing a second channel of the plurality of channels wherein the second channel is related to the first channel, where the relationship between the first and second channels may be based, for example, on a type of program associated with the first channel (e.g., sports, news, weather, etc.).

Figure 40:
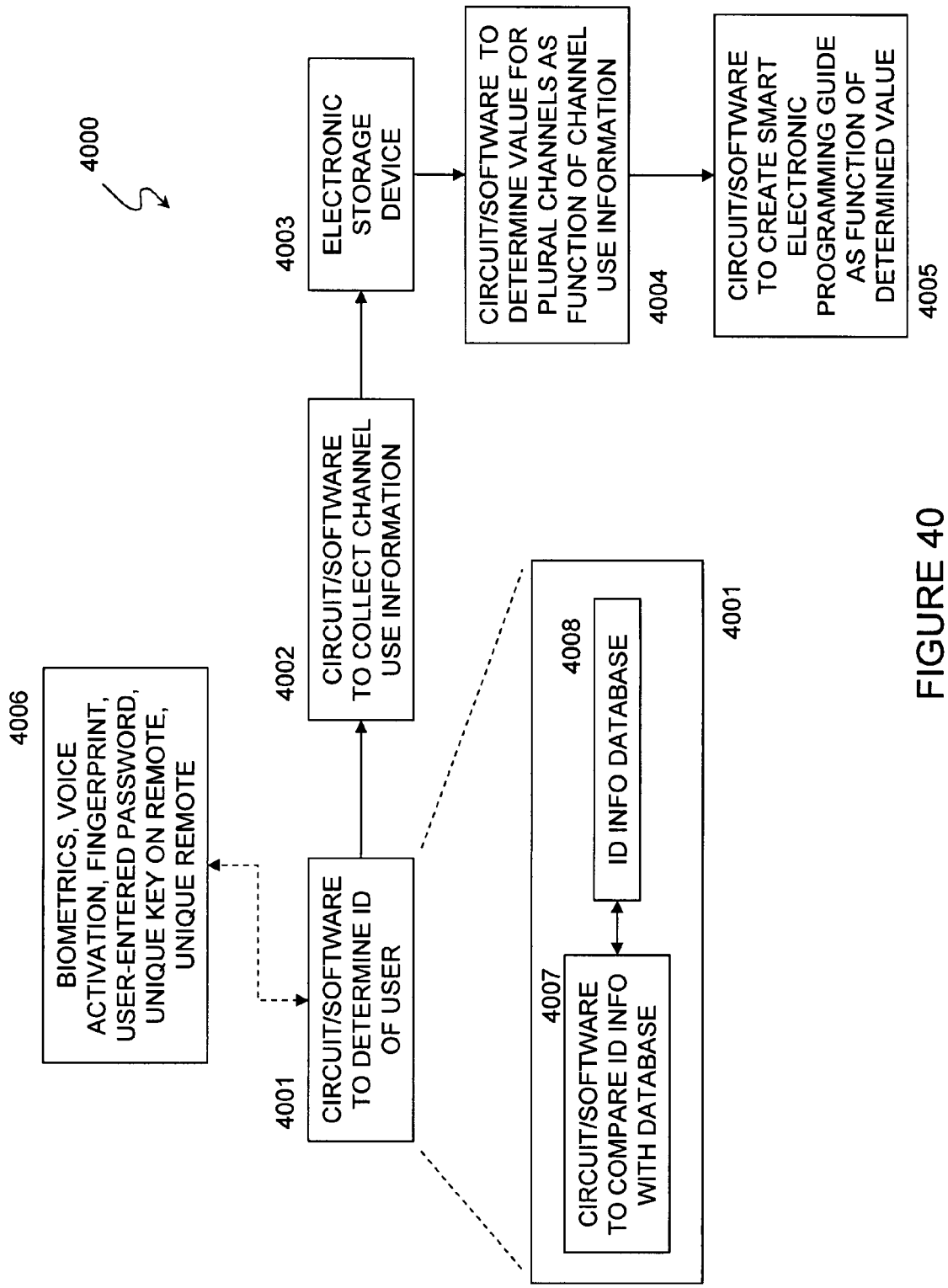
FIG. 40 is a block diagram of a system for creating a smart electronic programming guide according to an embodiment of the disclosure.

FIG. 40 is a block diagram of a system 4000 for creating a smart electronic programming guide according to an embodiment of the disclosure. In an embodiment, the system 4000 may be disposed at/within a content provider, a content presentation system, locally at a portable device operated by a user, a combination of two or more of the aforementioned devices, or any other convenient location. The system 4000 may include circuitry 4001 for determining an identity of a user interacting with a content presentation system, circuitry 4002 for collecting channel use information for each of a plurality of channels from the user's interaction with the content presentation system, an electronic storage device 4003 for storing the channel use information, circuitry 4004 for determining a value for each of the plural channels as a function of the channel use information, and circuitry 4005 for creating a smart electronic programming guide for the plural channels as a function of the determined value.

The circuitry 4001 for determining an identity of the user may include circuitry 4006 for collecting identification information via biometrics, voice activation, fingerprint, user-entered password, use of a unique key on a remote device by which the user interacts with the content presentation system, use of a unique remote device by which the user interacts with the content presentation system, and combinations thereof. Furthermore, the circuitry 4001 for determining an identity of the user may include circuitry 4007 for comparing the identification information with a pre-existing identification information stored in a database 4008 of identification information.

Figure 41:
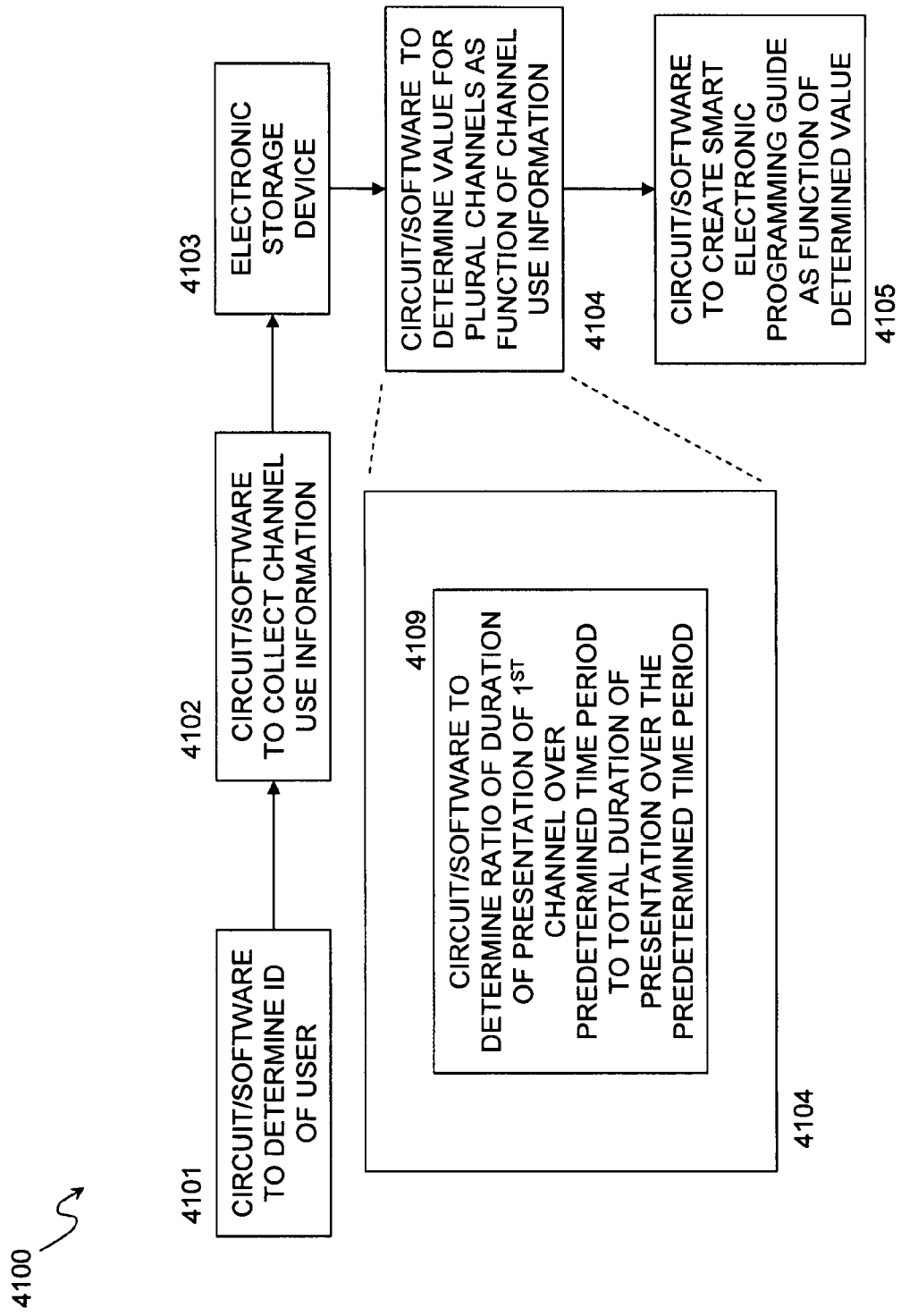
FIG. 41 is a block diagram of a system for creating a smart electronic programming guide according to an embodiment of the disclosure.

FIG. 41 is a block diagram of a system 4100 for creating a smart electronic programming guide according to an embodiment of the disclosure. Blocks 4101, 4102, 4103, 4104, and 4105 may contain circuitry similar to circuitry described above in blocks 4001, 4002, 4003, 4004, and 4005, respectively. The circuitry 4104 for determining the value for a first channel of the plurality of channels may include circuitry 4109 for determining a ratio of a total duration of a presentation of content associated with the first channel over a predetermined time period to a total duration of a presentation of content associated with each of the plural channels over the predetermined time period, where the predetermined time period may be approximately one half hour, approximately one hour, approximately one day, less than or equal to one week, more than one week, or as elsewhere described herein.

Figure 42:
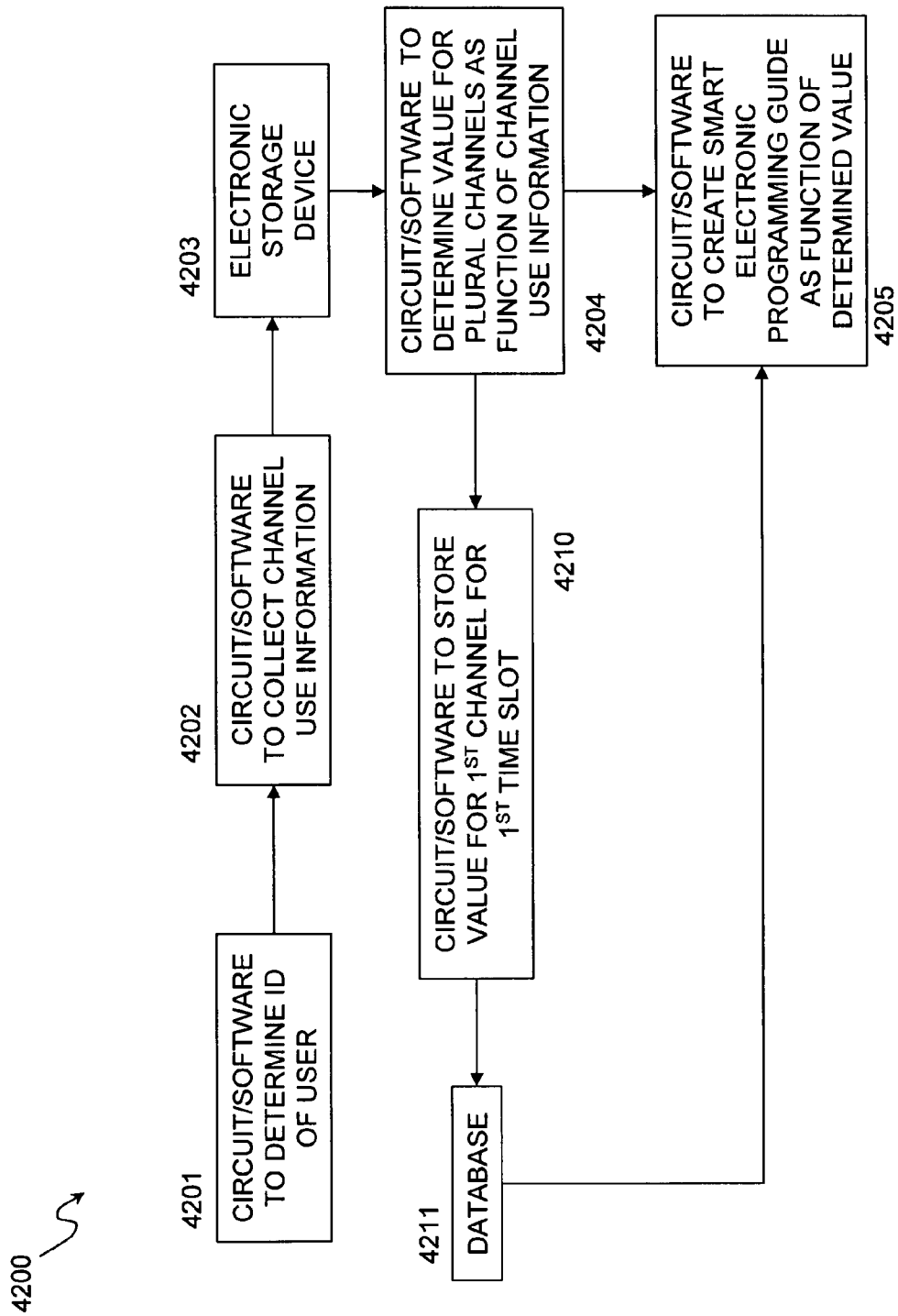
FIG. 42 is a block diagram of a system for creating a smart electronic programming guide according to an embodiment of the disclosure.

FIG. 42 is a block diagram of a system 4200 for creating a smart electronic programming guide according to an embodiment of the disclosure. Blocks 4201, 4202, 4203, 4204, and 4205 may contain circuitry similar to circuitry described above in blocks 4001, 4002, 4003, 4004, and 4005, respectively. The system 4200 may further include circuitry 4210 for storing a first value for a first channel in a first database 4211 for a first occurrence of a first predetermined time slot. Circuitry 4210, or similar other circuitry (not shown for clarity) may also store a second value for the first channel in the first database 4211 for a second occurrence of the first predetermined time slot. In addition, the circuitry 4204 for determining the value for the first channel may operate on both the first and second values.

Figure 43:
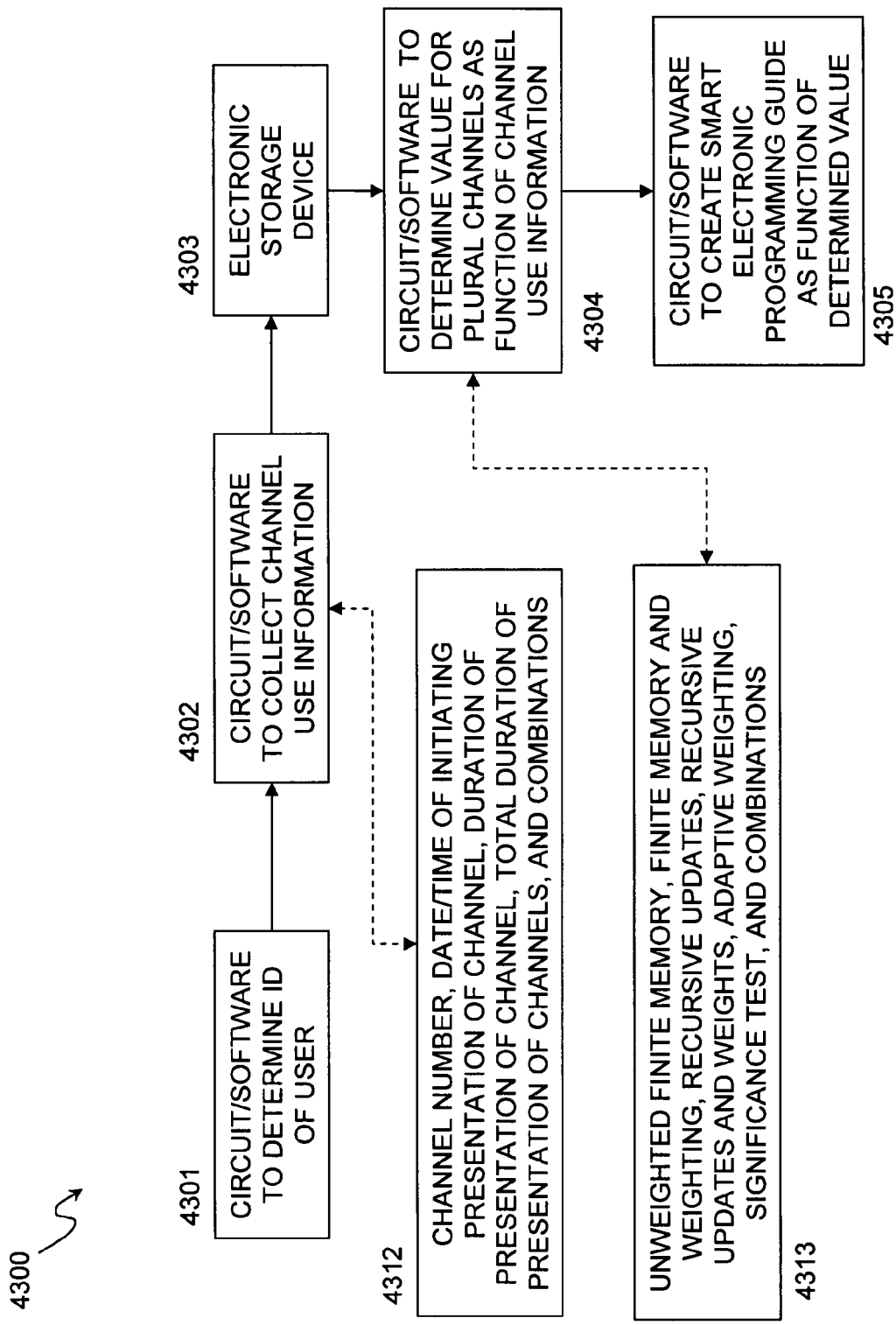
FIG. 43 is a block diagram of a system for creating a smart electronic programming guide according to an embodiment of the disclosure.

FIG. 43 is a block diagram of a system 4300 for creating a smart electronic programming guide according to an embodiment of the disclosure. Blocks 4301, 4302, 4303, 4304, and 4305 may contain circuitry similar to circuitry described above in blocks 4001, 4002, 4003, 4004, and 4005, respectively. In the system 4300, the circuitry 4302 for collecting channel use information may include circuitry 4312 for collecting channel use information such as, but not limited to, a channel number of a first one of the plural channels, a time of initiating a presentation of content associated with the first channel to the user; a date of initiating a presentation of content associated with the first channel to the user; a duration of a presentation of content associated with the first channel to the user; a total duration of a presentation of content associated with each of the plural channels to the user, and combinations thereof. In a further embodiment, the circuitry 4302 for collecting channel use information may not collect information for any one or more of a plurality of channels for which a duration of a presentation of content associated with that one or more of the plurality of channels, respectively, is less than a predetermined amount. This is to prevent "channel surfing" from skewing the determination of a value for any one or more channels.

Furthermore, the circuitry 4304 for determining a value may include circuitry 4313 for running an algorithm, as discussed above, such as an unweighted finite memory algorithm, a finite memory and weighting algorithm, an algorithm using recursive updates; an algorithm using recursive updates and weights, an adaptive weighting algorithm, a significance test algorithm, and combinations thereof.

Figure 44:
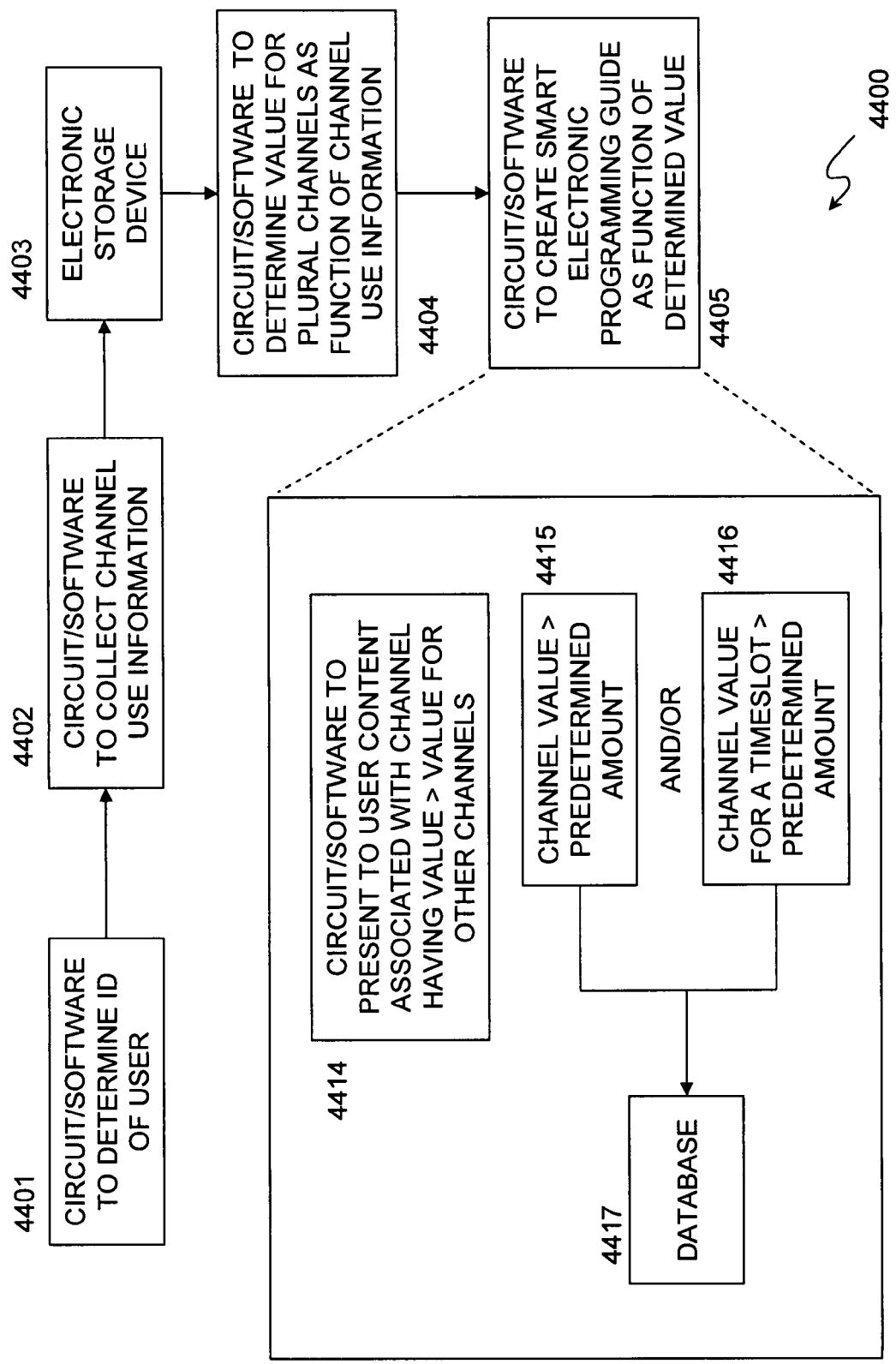
FIG. 44 is a block diagram of a system for creating a smart electronic programming guide according to an embodiment of the disclosure.

FIG. 44 is a block diagram of a system 4400 for creating a smart electronic programming guide according to an embodiment of the disclosure. Blocks 4401, 4402, 4403, 4404, and 4405 may contain circuitry similar to circuitry described above in blocks 4001, 4002, 4003, 4004, and 4005, respectively. In the system 4400 the circuitry 4405 for creating a preferred channel list may include circuitry 4414 for presenting to the user, upon activation of the content presentation system (not shown for clarity), content associated with a first channel where the first channel has a value greater than a value for any other of a plurality of channels. Moreover, the circuitry 4405 for creating a preferred channel list may populate a database 4417 with ones of the plural channels where each of the ones have a determined value greater than a predetermined amount as determined by circuitry 4415 and/or where each of the ones have a determined value for a predetermined time slot greater than a predetermined amount, as determined by circuitry 4416.

Figure 45:
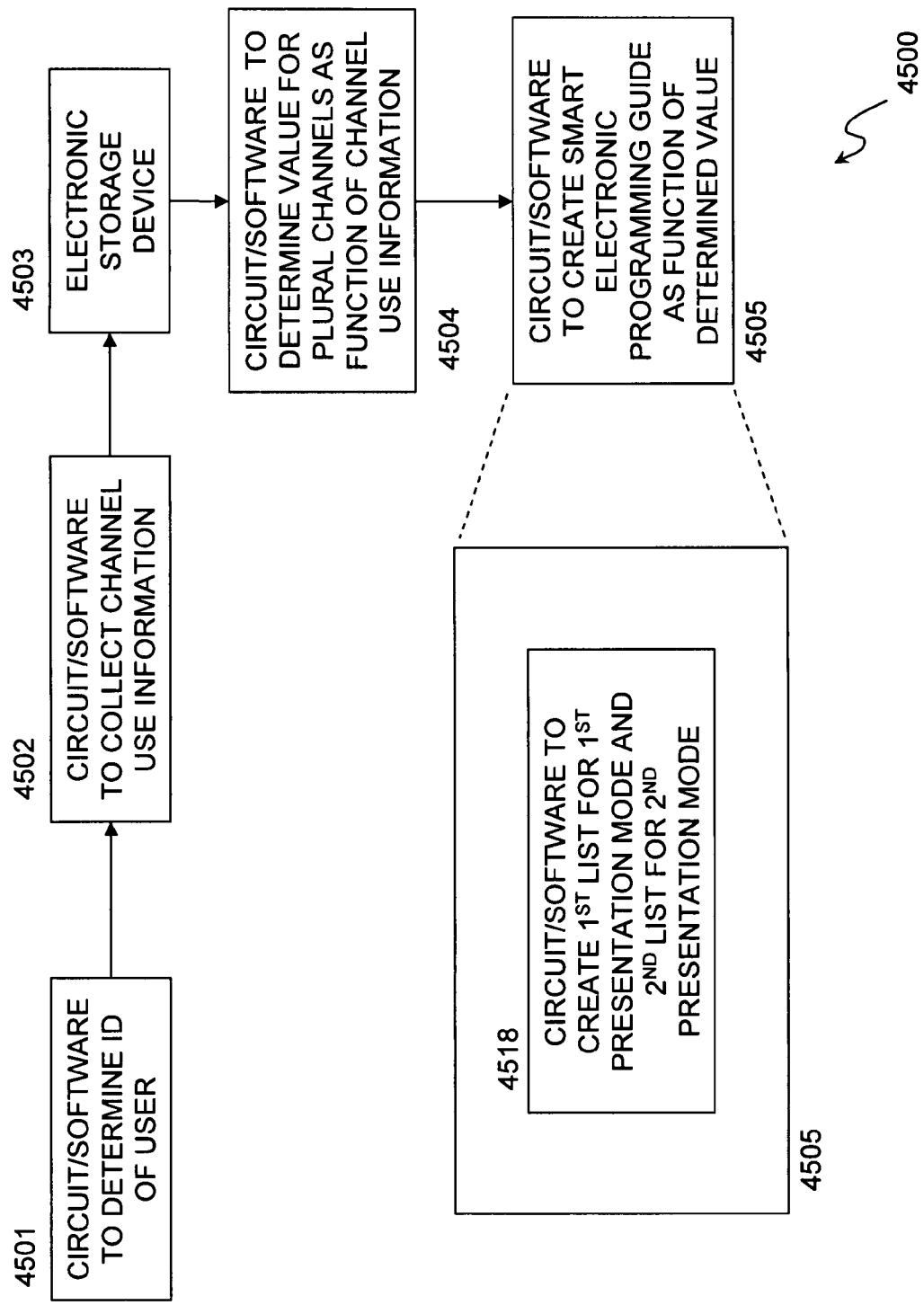
FIG. 45 is a block diagram of a system for creating a smart electronic programming guide according to an embodiment of the disclosure.

FIG. 45 is a block diagram of a system 4500 for creating a smart electronic programming guide according to an embodiment of the disclosure. Blocks 4501, 4502, 4503, 4504, and 4505 may contain circuitry similar to circuitry described above in blocks 4001, 4002, 4003, 4004, and 4005, respectively. In the system 4500 the circuitry 4505 for creating a preferred channel list may include circuitry 4518 for creating a first preferred channel list for a plurality of channels for a first mode of content delivery by a content presentation system (not shown for clarity) and for creating a second preferred channel list for the plurality of channels for a second mode of content delivery by the content presentation system. The first mode of content delivery may include conventional circuitry (not shown for clarity) for displaying content via a main television display and the second mode of content delivery may include conventional circuitry (not shown for clarity) for displaying content via a picture-in-picture display.

Figure 46:
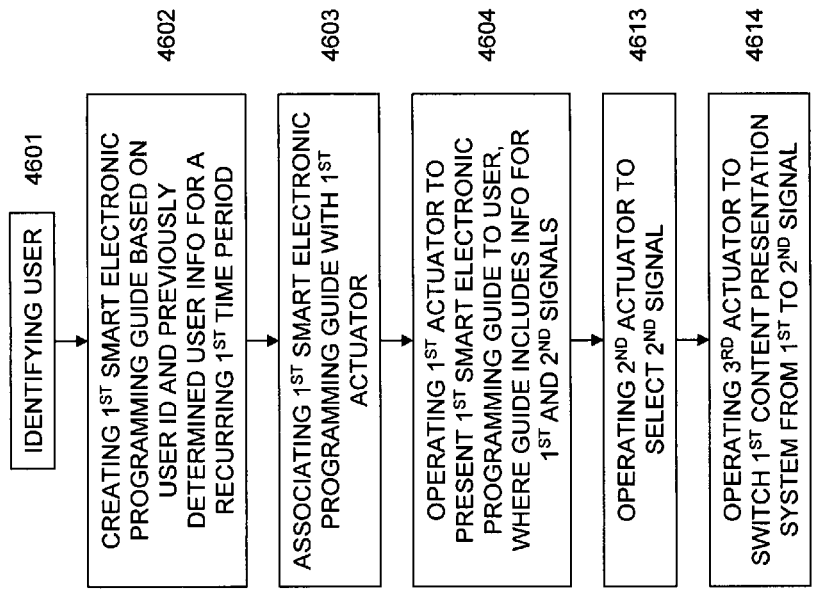
FIG. 46 is a flow diagram for switching signals using a smart electronic programming guide according to an embodiment of the disclosure.

FIG. 46 is a flow diagram for switching signals using a smart electronic programming guide according to an embodiment of the disclosure. The depicted embodiment is for a method for switching from a first signal provided by a content provider to a second signal provided by the content provider. At block 4601, a user of a first content presentation system is identified where the first content presentation system is operatively connected to the content provider and where the content provider provides one or more signals, including the first and second signals, to the first content presentation system. At block 4602, a first smart electronic programming guide is created (as previously discussed) where the first smart electronic programming guide may be based on the identity of the user and/or on previously determined information for the user where the information may be determined for a recurring first time period. At block 4603, the first smart electronic programming guide is associated with a first actuator operable by the user for interacting with the first content presentation system. At block 4604, the first actuator is operated by the user to thereby present the first smart electronic programming guide to the user, where the first smart electronic programming guide includes programming information for the first and second signals. At block 4613, a second actuator may be operated to select the second signal (e.g., selecting the second signal on the first smart electronic programming guide), and at block 4614 a third actuator may be operated to thereby switch the first content presentation system from presenting the first signal provided by the content provider to presenting the second signal provided by the content provider. In one embodiment, any two or more of the first, second, or third actuators may be the same.

In one embodiment, the recurring first time period may be, for example, a time period of one half hour duration or one hour duration, and, optionally, the recurring first time period may occur at a same time of day for a plurality of days and/or may occur at a same time of day on the same day of the week for a plurality of weeks.

Figure 47:
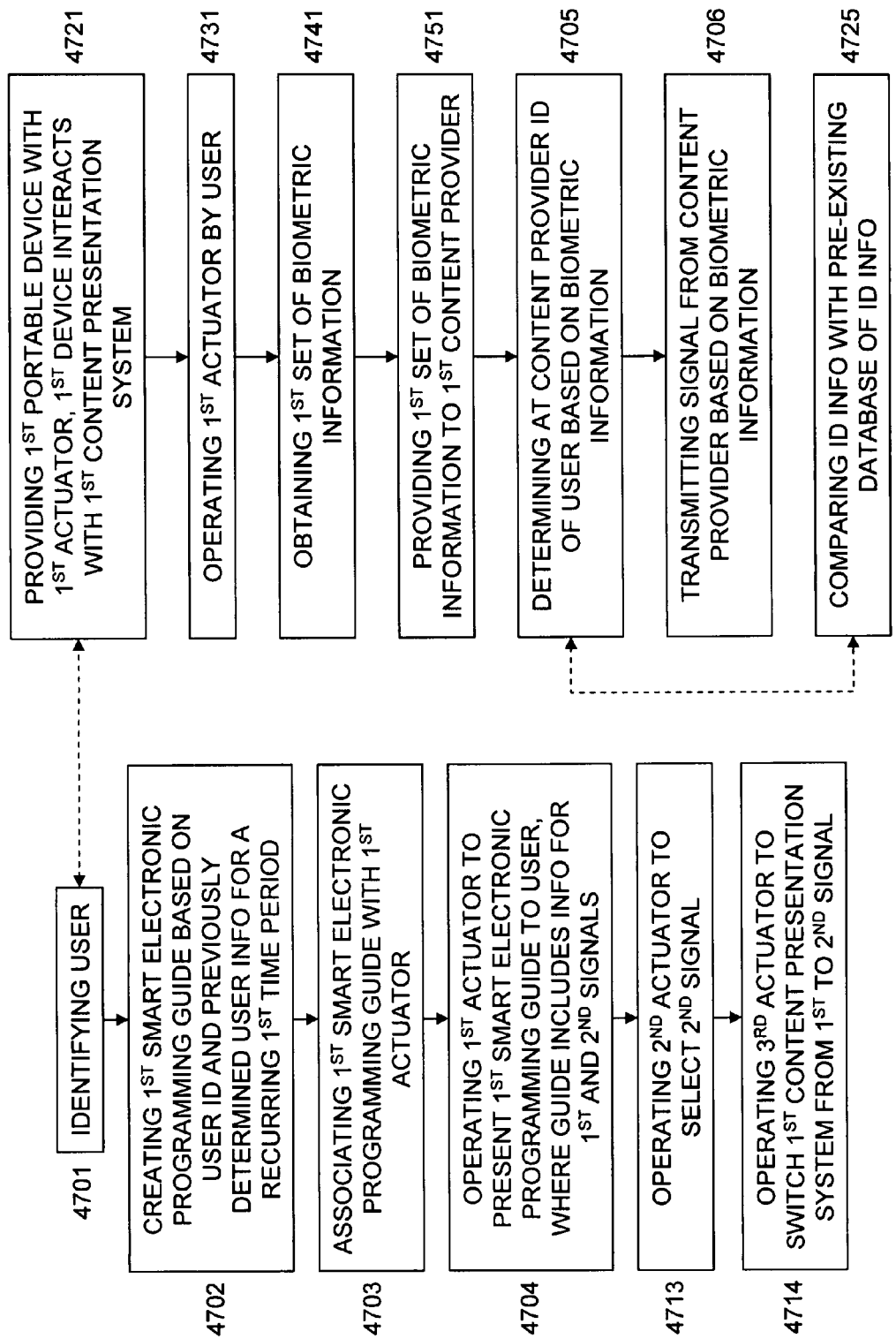
FIG. 47 is a flow diagram for switching signals using a smart electronic programming guide according to an embodiment of the disclosure.

FIG. 47 is a flow diagram for switching signals using a smart electronic programming guide according to an embodiment of the disclosure where blocks 4701, 4702, 4703, 4704, 4713, and 4714 are similar to blocks 4601, 4602, 4603, 4604, 4613, and 4614, respectively. The determining of the identity of the user at block 4701 may include at block 4721 providing a first portable device to interact with the first content presentation system, where the first portable device includes the first actuator which is operable by the user for interacting with the first content presentation system via the first portable device, and where the first actuator obtains biometric information from the user, at block 4731 operating the first actuator by the user, at block 4741 obtaining biometric information from the user via the first actuator, and at block 4751 providing the obtained biometric information to the content provider.

In a further embodiment, at block 4705 an identification of the user is determined at the content provider based on the provided biometric information. This determination may include, at block 4725, comparing the provided biometric information with a pre-existing database of biometric information. In still a further embodiment, at block 4706 a signal may be transmitted from the content provider based at least on the provided biometric information.

Figure 48:
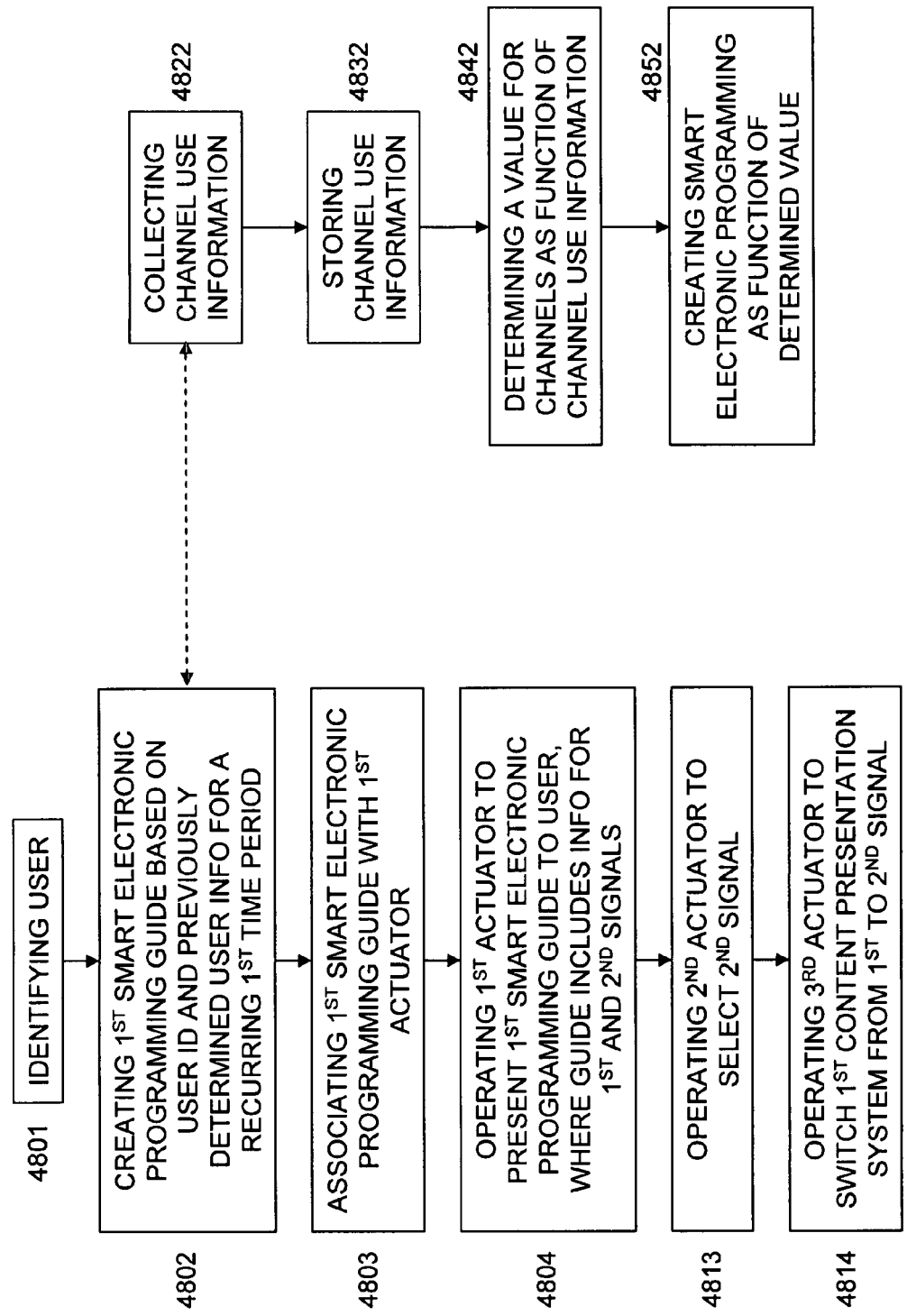
FIG. 48 is a flow diagram for switching signals using a smart electronic programming guide according to an embodiment of the disclosure.

FIG. 48 is a flow diagram for switching signals using a smart electronic programming guide according to an embodiment of the disclosure where blocks 4801, 4802, 4803, 4804, 4813, and 4814 are similar to blocks 4601, 4602, 4603, 4604, 4613, and 4614, respectively. The creating of the first smart electronic programming guide at block 4802 may include at block 4822 collecting channel use information for each of a plurality of channels from the user's interaction with the first content presentation system, at block 4832 optionally storing the channel use information, at block 4842 determining a value for each of the plural channels as a function of the channel use information, and at block 4852 creating the first smart electronic programming guide for the plural channels as a function of the determined value.

Figure 49:
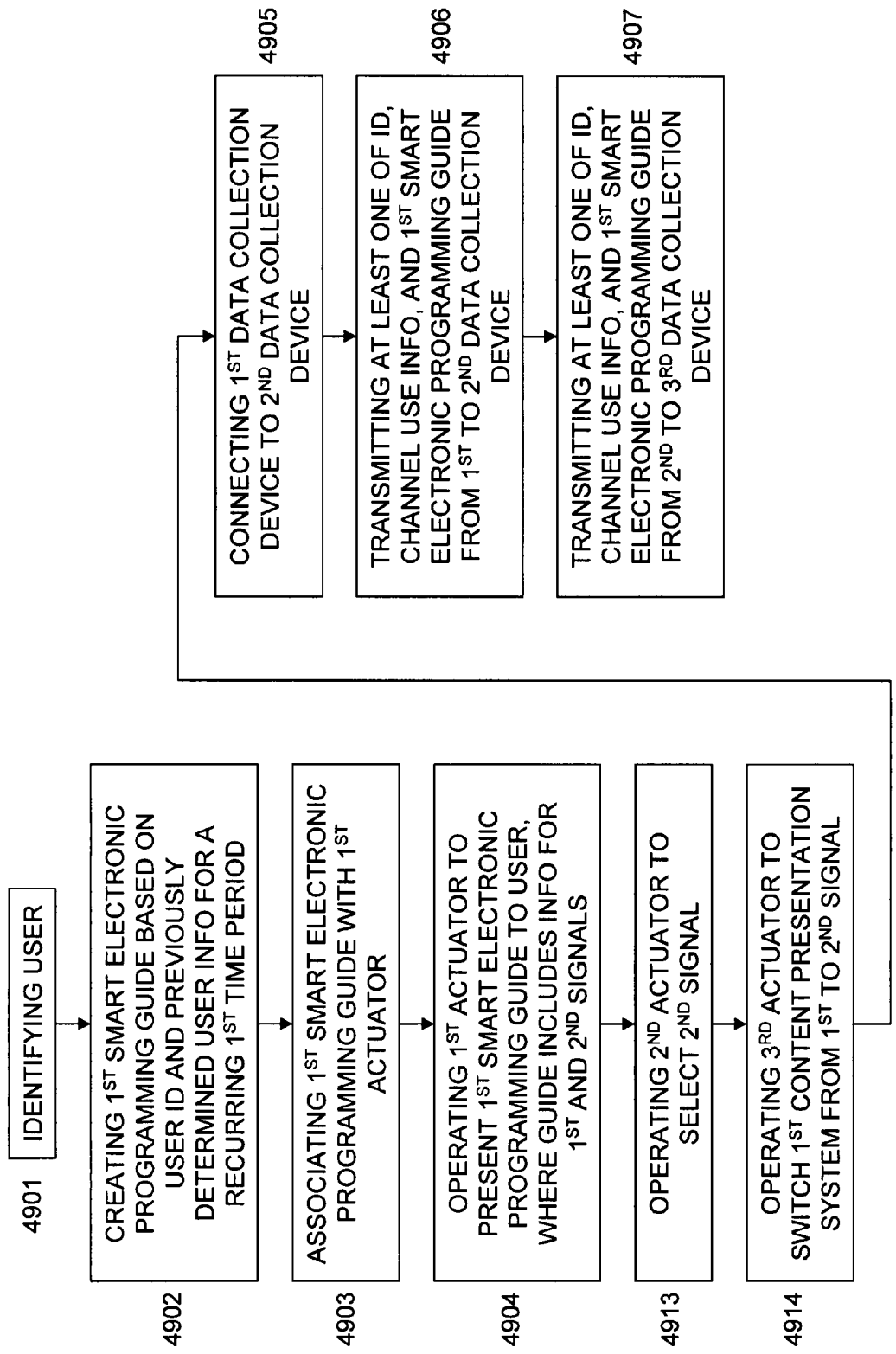
FIG. 49 is a flow diagram for switching signals using a smart electronic programming guide according to an embodiment of the disclosure.

FIG. 49 is a flow diagram for switching signals using a smart electronic programming guide according to an embodiment of the disclosure where blocks 4901, 4902, 4903, 4904, 4913, and 4914 are similar to blocks 4601, 4602, 4603, 4604, 4613, and 4614, respectively. In this embodiment, the user's information/preferences that may be stored and/or accessed via a first data collection device is shared such that the user's information/preferences may be stored and/or accessed via a second data collection device so that the first actuator may be used to interact with both the first and second data collection devices. The depicted embodiment includes, at block 4905, operatively connecting a first data collection device to a second data collection device where the first data collection device is operatively connected to the first content presentation system and the second data collection device is operatively connected to a second content presentation system, and where the first and second content presentation systems are each operatively connected to the content provider, and at block 4906 transmitting at least one of the identity, the channel use information, and the first smart electronic programming guide from the first data collection device to the second data collection device. A further embodiment includes, at block 4907, transmitting at least one of the identity, the channel use information, and the first smart electronic programming guide from the second data collection device to a third data collection device.

Figure 50:
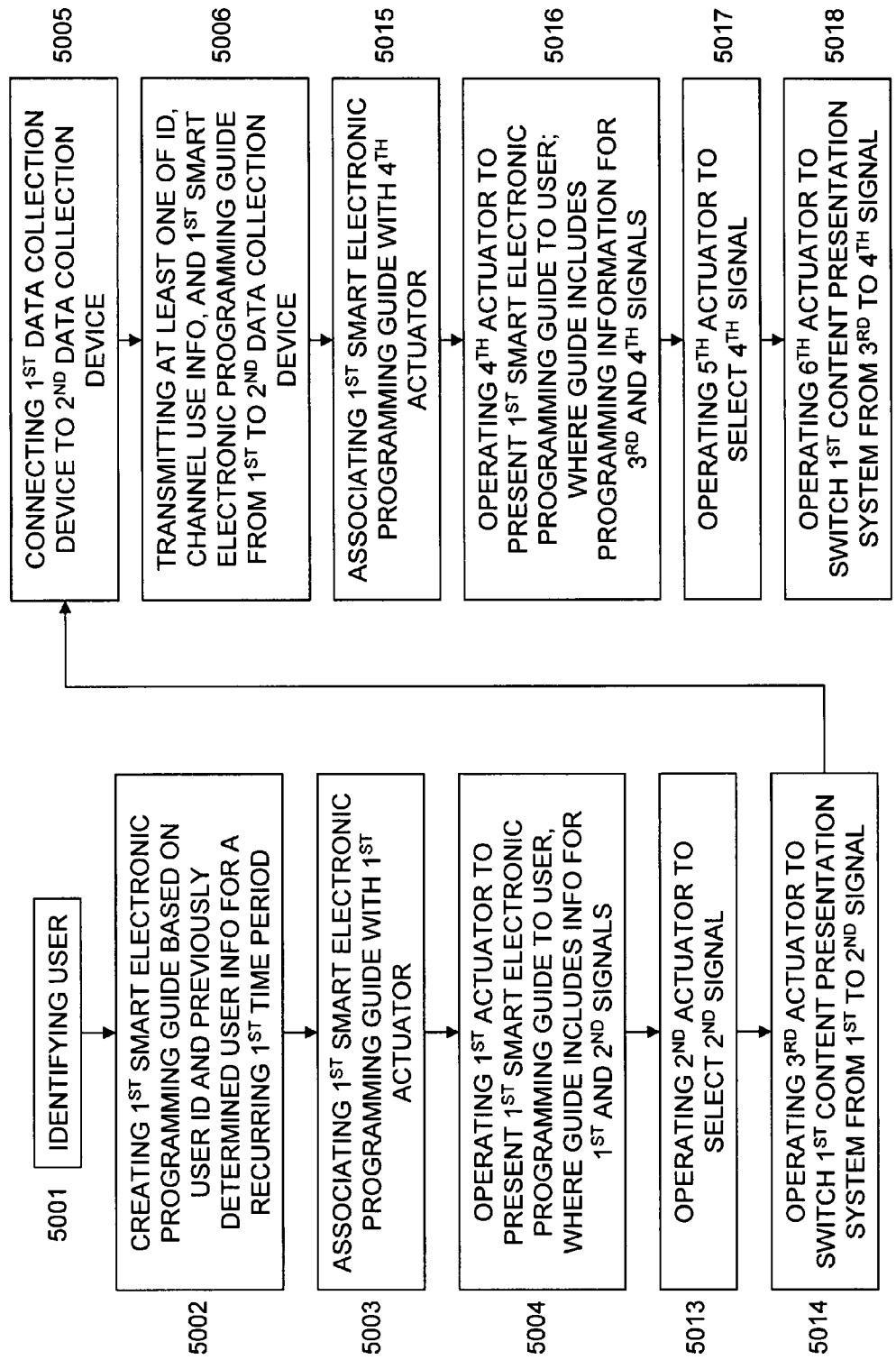
FIG. 50 is a flow diagram for switching signals using a smart electronic programming guide according to an embodiment of the disclosure.

FIG. 50 is a flow diagram for switching signals using a smart electronic programming guide according to an embodiment of the disclosure where blocks 5001, 5002, 5003, 5004, 5013, and 5014 are similar to blocks 4601, 4602, 4603, 4604, 4613, and 4614, respectively. Additionally, blocks 5005 and 5006 are similar to blocks 4905 and 4906, respectively. In this embodiment, the user's information/preferences that may be stored and/or accessed using, for example, a first remote control device via a first data collection device may also be stored and/or accessed using, for example, a second remote control device via a second data collection device. This embodiment includes, at block 5015, associating the first smart electronic programming guide with a fourth actuator operable by the user for interacting with the second content presentation system, at block 5016 operating the fourth actuator to thereby present the first smart electronic programming guide to the user, where the first smart electronic programming guide includes programming information for a third signal and a fourth signal, at block 5017 operating a fifth actuator to select the fourth signal (e.g. selecting the fourth signal on the first smart electronic programming guide), and at block 5018 operating a sixth actuator to thereby switch the first content presentation system from presenting the third signal provided by the content provider to presenting the fourth signal provided by the content provider.

In an embodiment, at least any two of the fourth, fifth, or sixth actuators may be the same. In a further embodiment, the first and the third signals may be the same and/or the second and the fourth signals may be the same.

Figure 51:
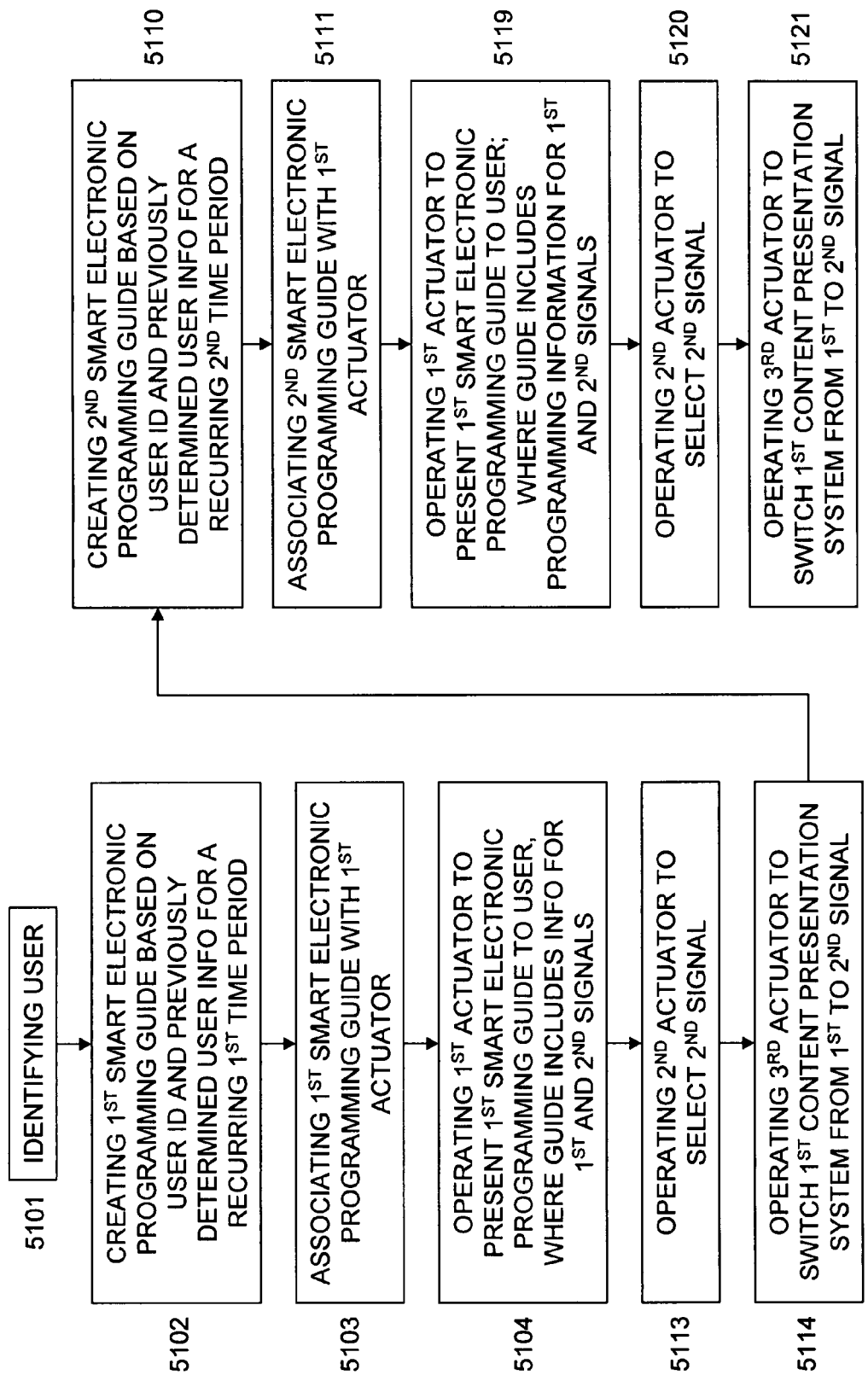
FIG. 51 is a flow diagram for switching signals using a smart electronic programming guide according to an embodiment of the disclosure.

FIG. 51 is a flow diagram for switching signals using a smart electronic programming guide according to an embodiment of the disclosure where blocks 5101, 5102, 5103, 5104, 5113, and 5114 are similar to blocks 4601, 4602, 4603, 4604, 4613, and 4614, respectively. In the method depicted by the flow diagram, in addition to creating a first smart electronic programming guide and associating it with a first actuator, a second smart electronic programming guide is created and is also associated with the first actuator. In this way, the user can access two separate programming guides through the same actuator where, for example, the first programming guide may be associated with the user's sports preferences while the second programming guide may be associate with the user's new preferences. The method includes at block 5110 creating a second smart electronic programming guide based on the identity of the user and based on previously determined information for the user wherein the information is determined for a recurring second time period, at block 5111 associating the second smart electronic programming guide with the first actuator operable by the user for interacting with the first content presentation system, at block 5119 operating the first actuator to thereby present the second smart electronic programming guide to the user, where the second smart electronic programming guide includes programming information for the first and second signals, at block 5120 operating a second actuator to select the second signal, and at block 5121 operating a third actuator to thereby switch the first content presentation system from presenting the first signal provided by the content provider to presenting the second signal provided by the content provider.

In a further embodiment, at least any two of the first, second, or third actuators may be the same.

Figure 52:
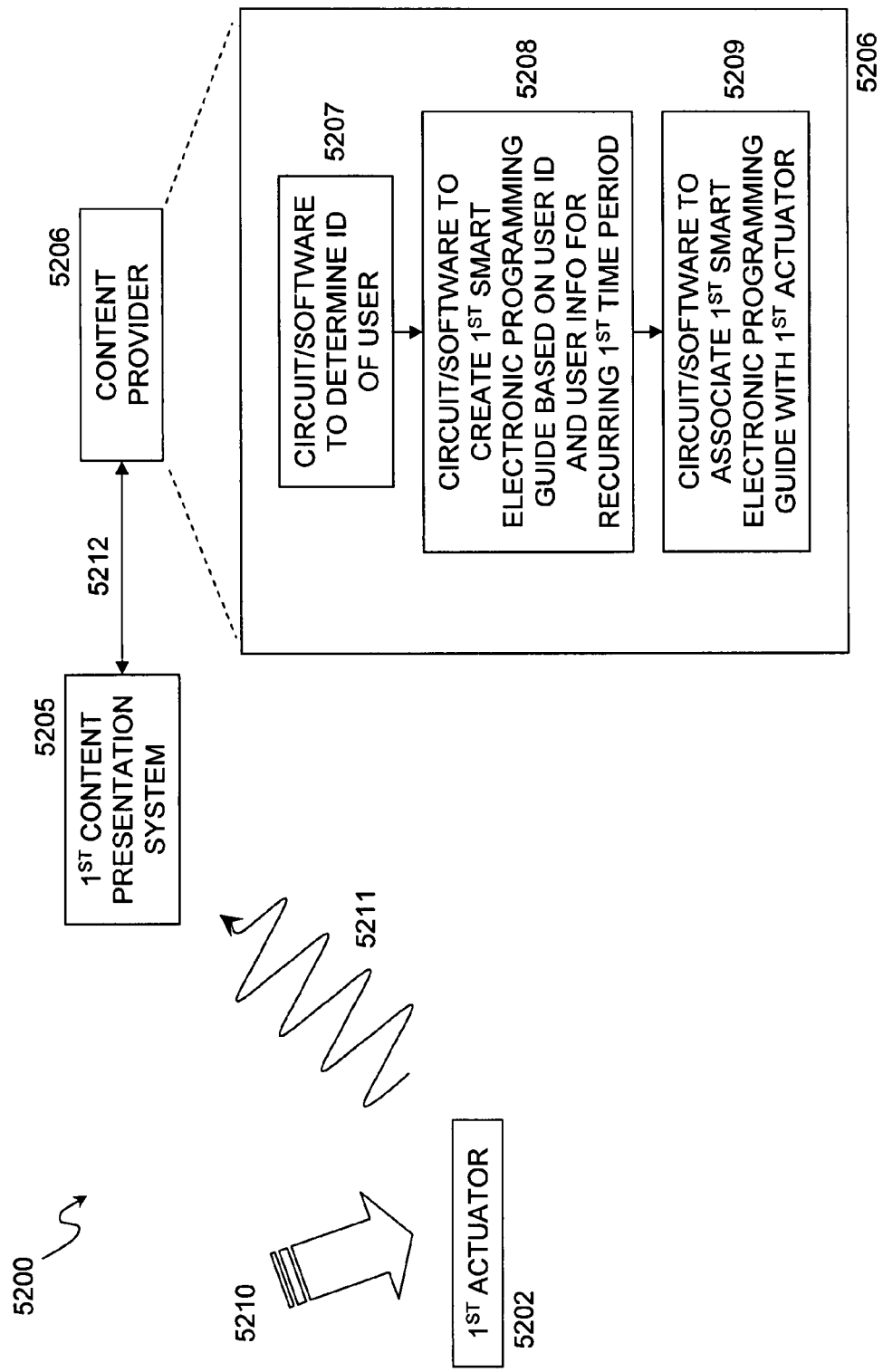
FIG. 52 is a block diagram of a system for switching signals using a smart electronic programming guide according to an embodiment of the disclosure.

Referring now to FIG. 52, a block diagram is shown of a system 5200 for switching signals using a smart electronic programming guide according to an embodiment of the disclosure. The system 5200 may be used to switch from a first signal provided by a content provider to a second signal provided by the content provider. The system 5200 may include a first content presentation system 5205, circuitry 5207 for determining an identity of a user of the first content presentation system 5205 that is operatively connected via transmission path 5212 to the content provider 5206, wherein the content provider 5206 provides one or more signals to the first content presentation system 5205, circuitry 5208 for creating a first smart electronic programming guide based on the identity of the user and based on previously determined information for the user wherein the information is determined for a recurring first time period, a first actuator 5202 operable by the user for interacting via transmission path 5211 with the first content presentation system 5205, and circuitry 5209 for associating the first smart electronic programming guide with the first actuator 5202 wherein the operation 5210 of the first actuator switches the first content presentation system 5205 from presenting the first signal provided by the content provider 5206 to presenting the second signal provided by the content provider 5206. The transmission paths 5211 and/or 5212 may each be wired, wireless, or as previously described herein.

In one embodiment, the recurring first time period may be, for example, a time period of one half hour duration or one hour duration, and, optionally, the recurring first time period may occur at a same time of day for a plurality of days and/or may occur at a same time of day on the same day of the week for a plurality of weeks.

Figure 53:
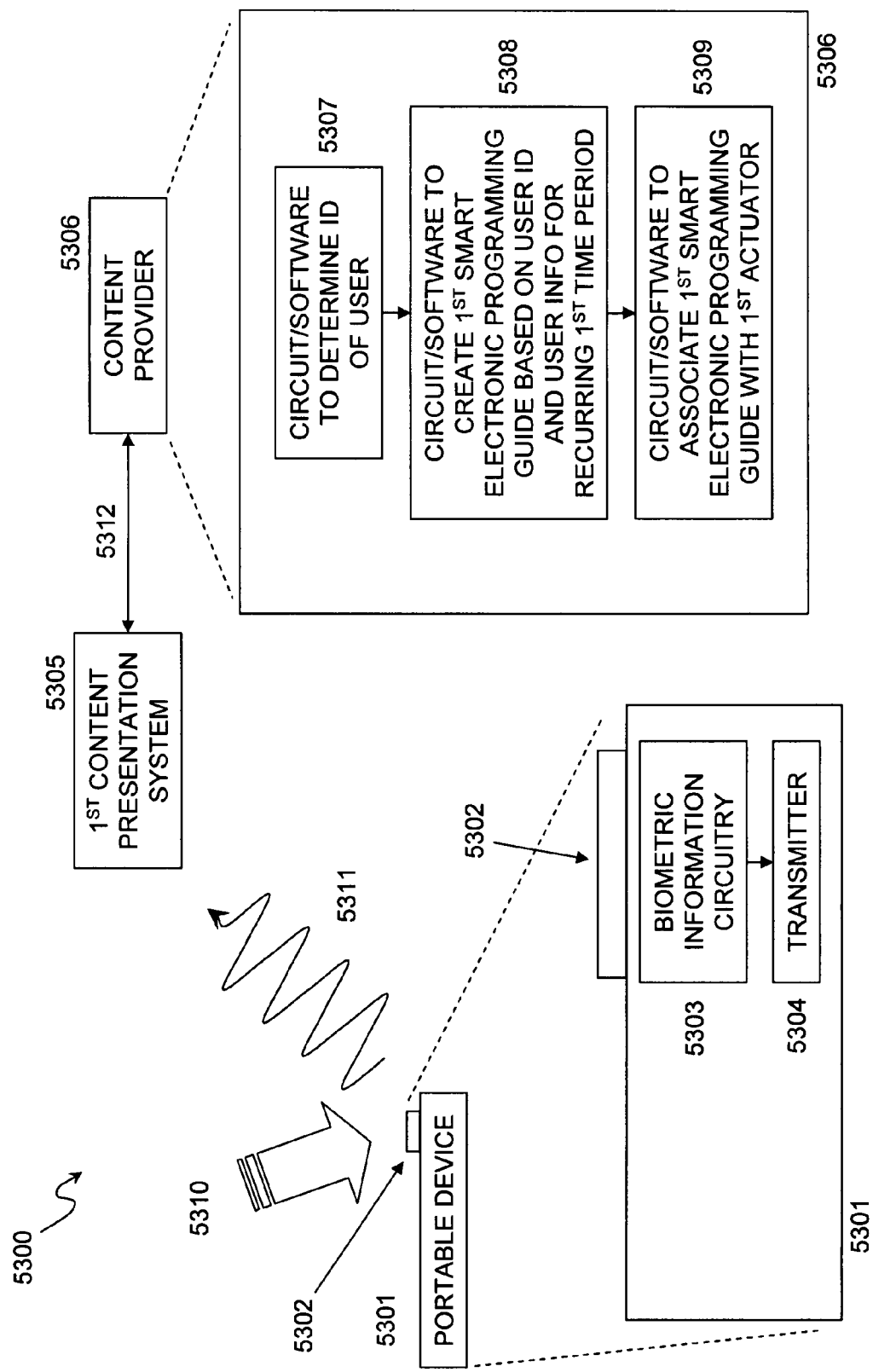
FIG. 53 is a block diagram of a system for switching signals using a smart electronic programming guide according to an embodiment of the disclosure.

FIG. 53 is a block diagram of a system 5300 for switching signals using a smart electronic programming guide according to an embodiment of the disclosure. Blocks 5305, 5306, 5307, 5308, and 5309 may contain circuitry similar to circuitry described above in blocks 5205, 5206, 5207, 5208, and 5209, respectively. Additionally, the transmission paths 5311 and 5312 may be similar to the transmission paths 5211 and 5212, respectively. Furthermore, the actuator 5302 may be similar to the actuator 5202 and operation 5310 of the actuator 5302 may be similar to operation 5210 of the actuator 5202. In the system 5300 the circuitry for determining the identity of the user may include a first portable device 5301 including the first actuator 5302 which is operable by the user 5301 for interacting via the transmission path 5311 with the first content presentation system 5305, and where the first actuator 5301 obtains biometric information from the user and may include circuitry 5303 for obtaining biometric information from the user via the first actuator 5302, and circuitry 5304 (which may be a transmitter) for providing the obtained biometric information to the content provider 5306.

Figure 54:
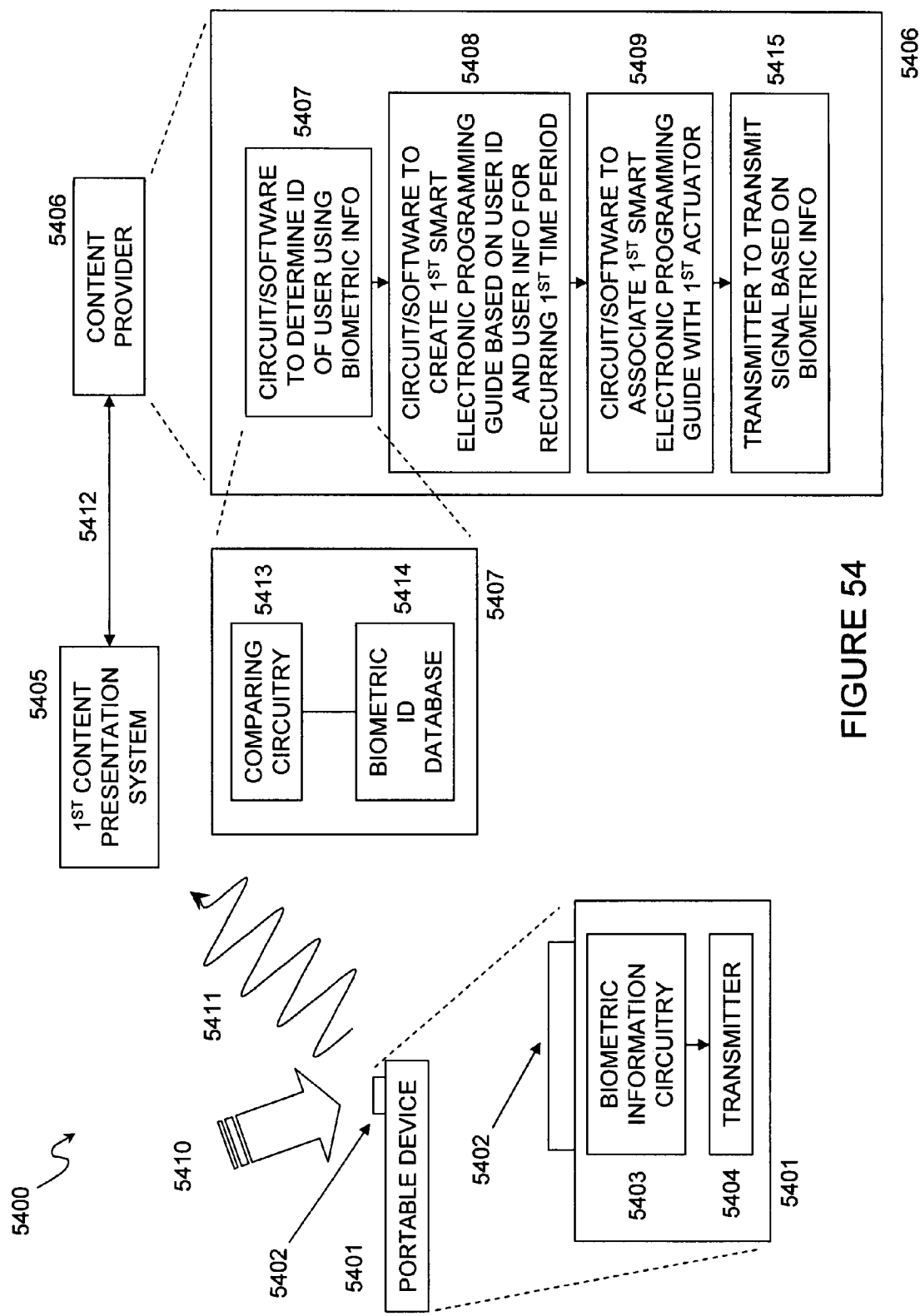
FIG. 54 is a block diagram of a system for switching signals using a smart electronic programming guide according to an embodiment of the disclosure.

FIG. 54 is a block diagram of a system 5400 for switching signals using a smart electronic programming guide according to an embodiment of the disclosure. Blocks 5401, 5403, 5404, 5405, 5406, 5407, 5408, and 5409 may contain circuitry similar to circuitry described above in blocks 5201, 5203, 5204, 5205, 5206, 5207, 5208, and 5209, respectively. Additionally, the transmission paths 5411 and 5412 may be similar to the transmission paths 5211 and 5212, respectively. Furthermore, the actuator 5402 may be similar to the actuator 5202 and operation 5410 of the actuator 5402 may be similar to operation 5210 of the actuator 5202. In the system 5400, circuitry 5407 may further be capable for determining at the content provider 5406 the identification of the user based on the provided biometric information. Furthermore, the circuitry 5407 for determining the identification of the user may include circuitry 5413 for comparing the provided biometric information with a pre-existing database 5414 of biometric information.

In a further embodiment, a transmitter 5415 may be included for transmitting a signal from the content provider 5406 based at least on the provided biometric information.

Figure 55:
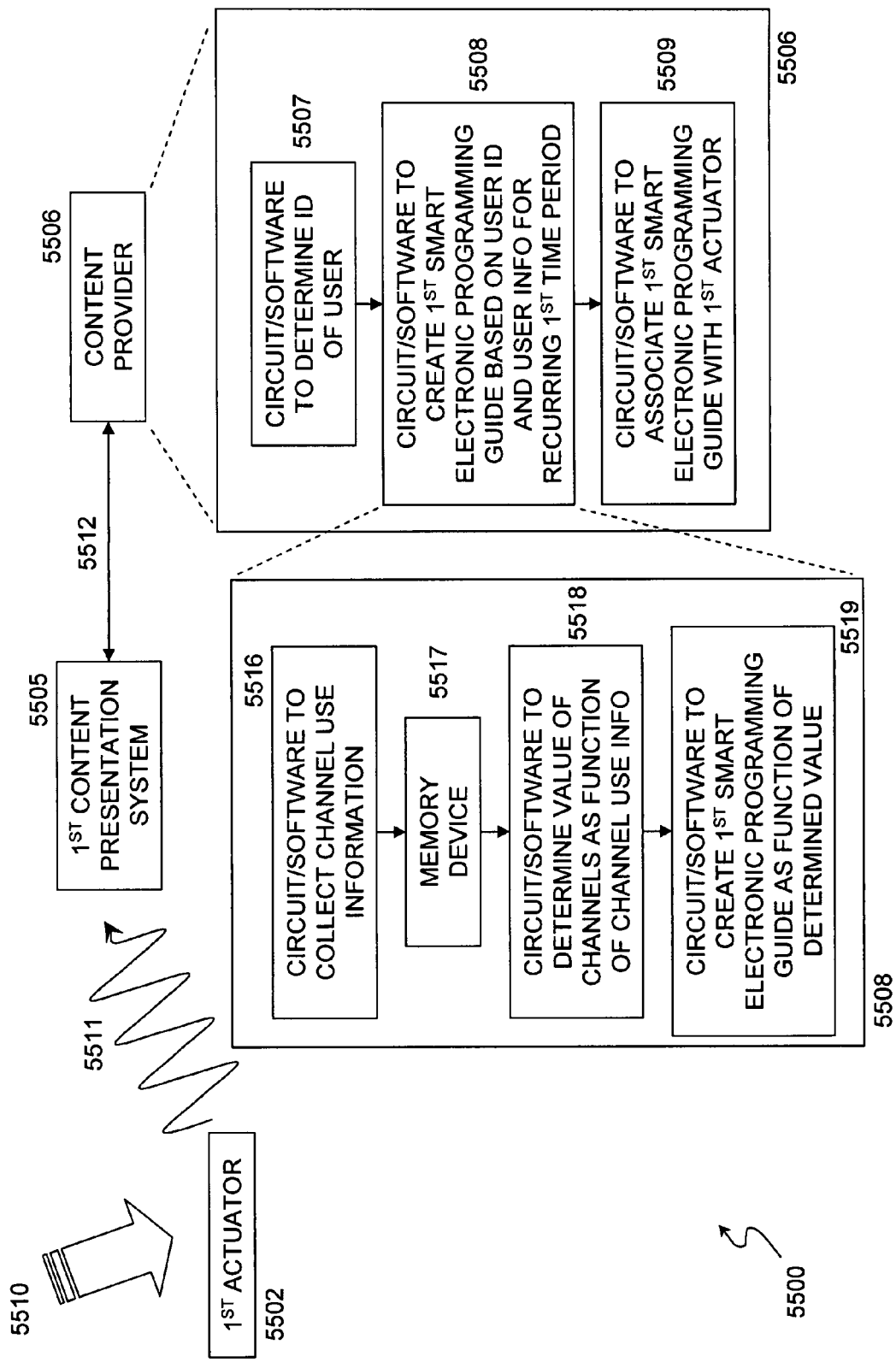
FIG. 55 is a block diagram of a system for switching signals using a smart electronic programming guide according to an embodiment of the disclosure.

FIG. 55 is a block diagram of a system 5500 for switching signals using a smart electronic programming guide according to an embodiment of the disclosure. Blocks 5505, 5506, 5507, 5508, and 5509 may contain circuitry similar to circuitry described above in blocks 5205, 5206, 5207, 5208, and 5209, respectively. Additionally, the transmission paths 5511 and 5512 may be similar to the transmission paths 5211 and 5212, respectively. Furthermore, the actuator 5502 may be similar to the actuator 5202 and operation 5510 of the actuator 5502 may be similar to operation 5210 of the actuator 5202. In the system 5500, the circuitry 5508 for creating the first smart electronic programming guide may include circuitry 5516 for collecting channel use information for each of a plurality of channels from the user's interaction with the first content presentation system 5505, a memory device 5517 for storing the channel use information, circuitry 5518 for determining a value for each of the plural channels as a function of the channel use information and circuitry 5519 for creating the first smart electronic programming guide for the plural channels as a function of the determined value.

Figure 56:
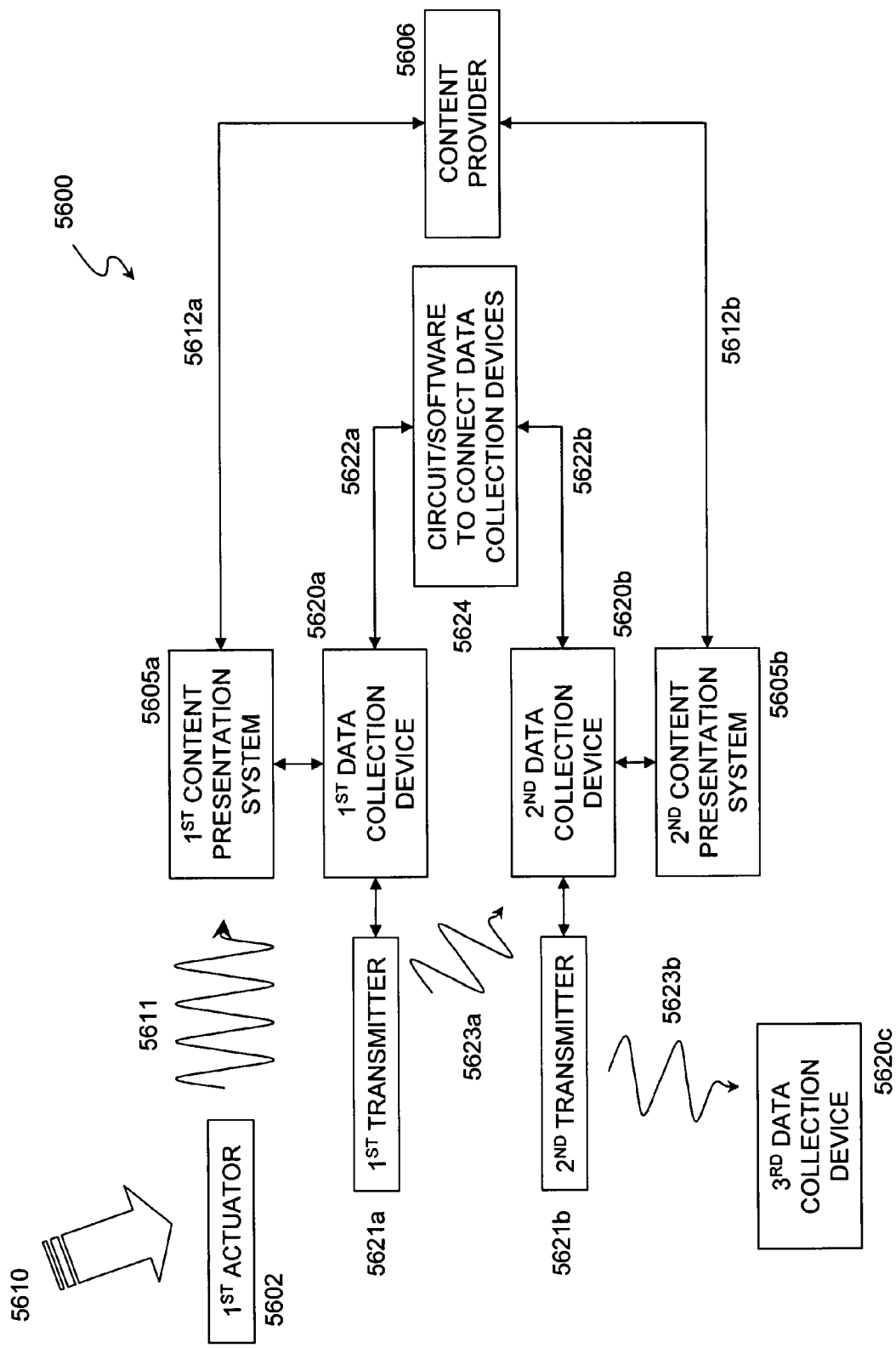
FIG. 56 is a block diagram of a system for switching signals using a smart electronic programming guide according to an embodiment of the disclosure.

FIG. 56 is a block diagram of a system for switching signals using a smart electronic programming guide according to an embodiment of the disclosure. Blocks 5605*a* and 5605*b* may each contain circuitry similar to circuitry described above in blocks 5205, and block 5606 may contain circuitry similar to circuitry described above in block 5206. Furthermore, the transmission path 5611 may be similar to the transmission path 5211, while the transmission paths 5612*a* and 5612*b* may each be similar to the transmission path 5212. Additionally, the actuator 5602 may be similar to the actuator 5202 and operation 5610 of the actuator 5602 may be similar to operation 5210 of the actuator 5202. The system 5600 may include circuitry 5624 for operatively connecting a first data collection device 5620*a* to a second data collection device 5620*b*, via the transmission paths 5622*a* and 5622*b*, and where the first data collection device 5620*a* is operatively connected to the first content presentation system 5605*a* and the second data collection device 5620*b* is operatively connected to a second content presentation system 5605*b*. Alternatively, first content presentation system 5605*a* and first data collection device 5620*a* may be an integral unit. Additionally, second content presentation system 5605*b* and second data collection device 5620*b* may be an integral unit. The first and second data collection devices may collect data such as, but not limited to, an identity of a user, channel use information for the user, and a first preferred channel list for the user. The interconnection of the first and second data collection devices, such as the circuitry 5624, allows for one-way or two-way transmission of at least one of the identity, the channel use information, and the first smart electronic programming guide from/to the first data collection device 5620*a* to/from the second data collection device 5620*b*. Each of the first and second content presentation systems (5605*a* and *b*, respectively) may be operatively connected to the content provider 5606. In addition, an optional first transmitter 5621a may transmit via the transmission path 5623a at least one of the identity, the channel use information, and the first smart electronic programming guide from the first data collection device 5620a to the second data collection device 5620b. The connection circuitry 5624 and the first transmitter 5621a may be the same. In a further embodiment, the system 5600 may include a second transmitter 5621b for transmitting via the transmission path 5623b at least one of the identity, the channel use information, and the first smart electronic programming guide from the second data collection device 5620b to a third data collection device 5620c.

Figure 57:
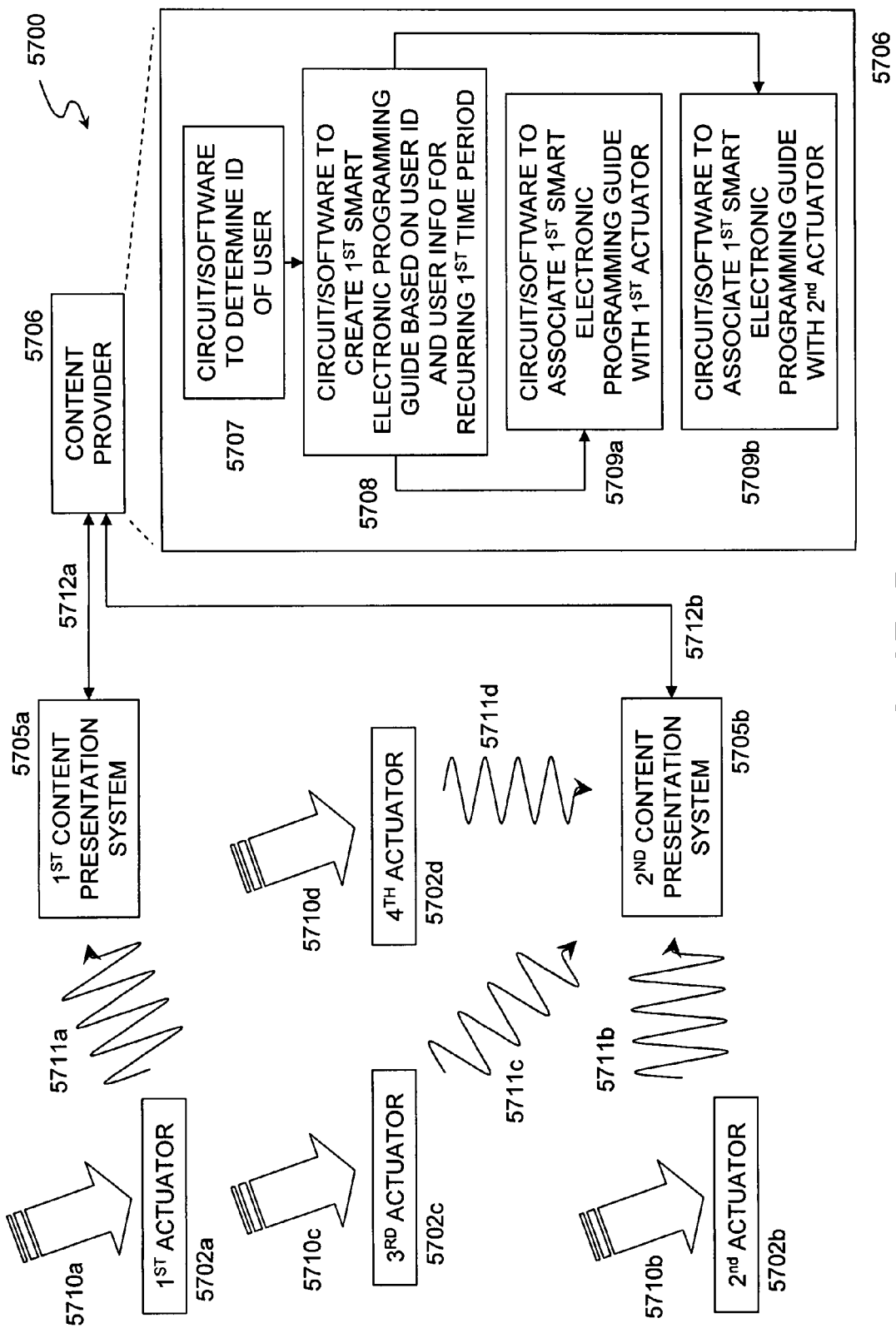
FIG. 57 is a block diagram of a system for switching signals using a smart electronic programming guide according to an embodiment of the disclosure.

FIG. 57 is a block diagram of a system 5700 for switching signals using a smart electronic programming guide according to an embodiment of the disclosure. Blocks 5705a and 5705b may contain circuitry similar to circuitry described above in blocks 5605a and 5605b, respectively. Blocks 5706, 5707, 5708, and 5709a may contain circuitry similar to circuitry described above in blocks 5206, 5207, 5208, and 5209, respectively. Furthermore, the transmission path 5711a may be similar to the transmission path 5611, while the transmission paths 5712a and 5712b may be similar to the transmission paths 5612a and 5612b, respectively. Additionally, the first actuator 5702a may be similar to the actuator 5202 and operation 5710a of the first actuator 5702a may be similar to operation 5210 of the actuator 5202. The system 5700 may also include circuitry 5709b for associating the first smart electronic programming guide with a second actuator 5702b operable by the user for interacting with the second content presentation system 5705b, wherein the operation 5710b of the second actuator 5702b sends a signal via the transmission path 5711b which causes the first smart electronic programming guide to be presented to the user, where the first smart electronic programming guide may include programming information for a third signal and a fourth signal. Additionally, the system 5700 may include a third actuator 5702c the operation 5710c of which by the user sends a signal via the transmission path 5711c to select the fourth signal, and a fourth actuator 5702d the operation 5710d of which by the user send a signal via the transmission path 5711d to switch the second content presentation system 5712b from presenting the third signal provided by the content provider 5706 to presenting the fourth signal provided by the content provider 5706.

In an embodiment, at least any two of the second, third, or fourth actuators may be the same. In a further embodiment, the first and the third signals may be the same and/or the second and the fourth signals may be the same.

Figure 58:
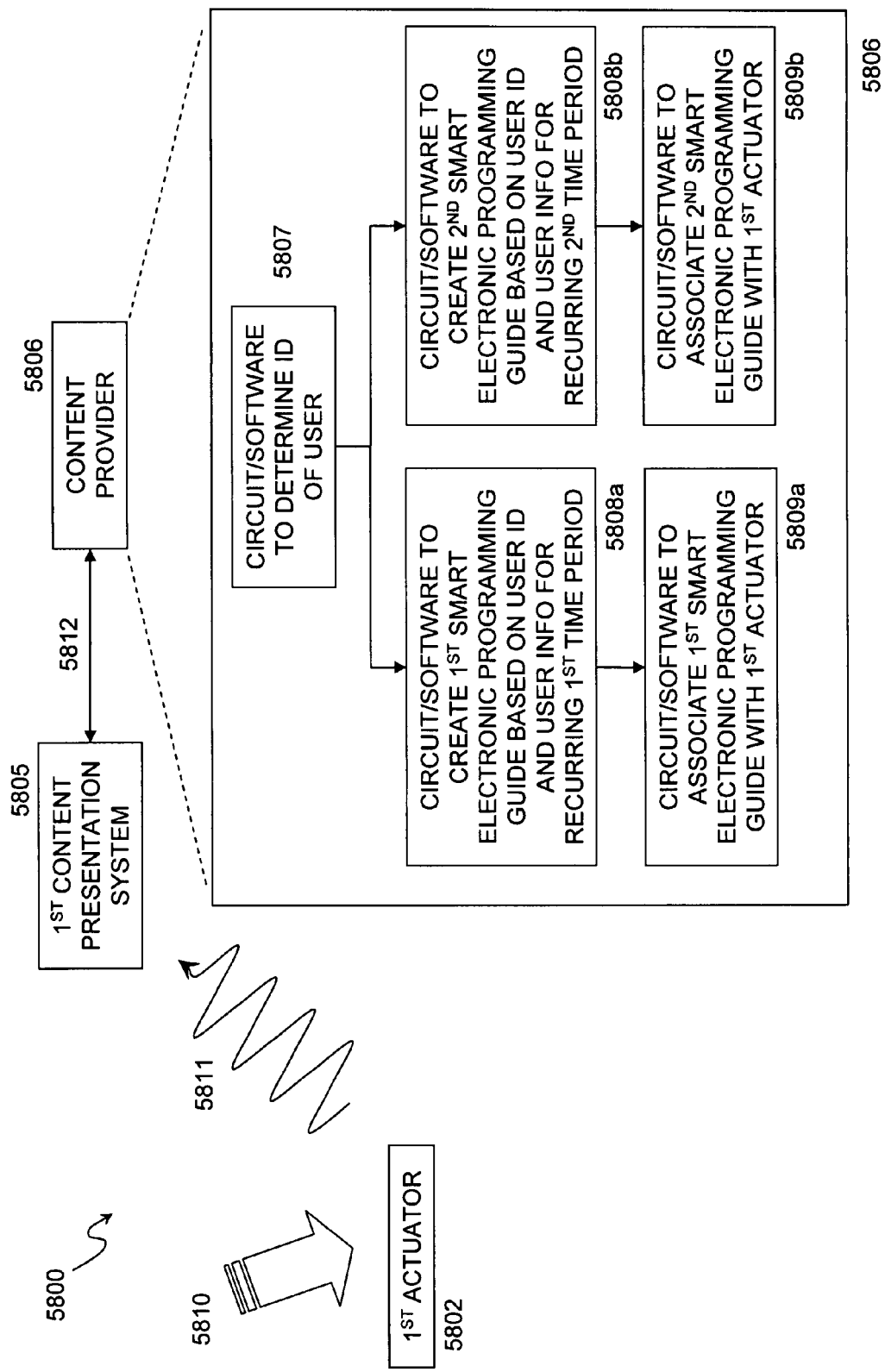
FIG. 58 is a block diagram of a system for switching signals using a smart electronic programming guide according to an embodiment of the disclosure.

FIG. 58 is a block diagram of a system 5800 for switching signals using a smart electronic programming guide according to an embodiment of the disclosure. Blocks 5805, 5806, 5807, 5808a, and 5809a may contain circuitry similar to circuitry described above in blocks 5205, 5206, 5207, 5208, and 5209, respectively. Additionally, the transmission paths 5811 and 5812 may be similar to the transmission paths 5211 and 5212, respectively. Furthermore, the actuator 5802 may be similar to the actuator 5202 and operation 5810 of the actuator 5802 may be similar to operation 5210 of the actuator 5202. The system 5800 may further include circuitry 5808b for creating a second smart electronic programming guide based on the identity of the user and based on previously determined information for the user where the information is determined for a recurring second time period, and circuitry 5809b for associating the second smart electronic programming guide with the first actuator 5802 operable by the user for interacting with the first content presentation system 5805, wherein operating the first actuator 5802 switches the first content presentation system 5805 from presenting a third signal provided by the content provider 5806 to presenting a fourth signal provided by the content provider 5806.

In a further embodiment, the first and the third signals may be the same and/or the second and the fourth signals may be the same.

Figure 59:
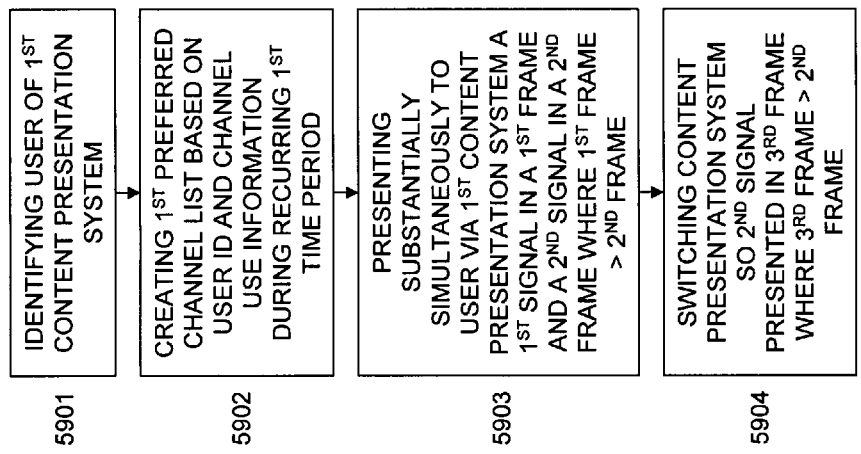
FIG. 59 is a flow diagram for switching signals using picture-in-picture-assisted time-adaptive channel surfing according to an embodiment of the disclosure.

With attention now directed toward FIG. 59, a flow diagram is depicted for switching signals using picture-in-picture-assisted time-adaptive channel surfing according to an embodiment of the disclosure. Specifically, the depicted method may be useful for switching from a first signal provided by a content provider to a second signal provided by the content provider where, at block 5901, a user of a first content presentation system is identified where the first content presentation system is operatively connected to the content provider and the content provider provides a plurality of signals to the first content presentation system, at block 5902 a first preferred channel list is created which includes channel information for each of select ones of the plural signals and where the preferred channel list is created based on the identity of the user and/or based on channel use information for the user during a recurring first time period, at block 5903 where a first signal and a second signal are presented substantially simultaneously to the user via the first content presentation system, where the first signal is one of the select ones of plural signals in a first frame and the second signal is one of the select ones of plural signals in a second frame, where the first frame is larger than the second frame, and at block 5904, the content presentation system switches so that the second signal is presented in a third frame that is larger than the second frame.

In an embodiment, the content provider may include one or more broadcasters, one or more cable television systems, one or more magnetic storage devices, one or more optical storage devices, one or more electronic storage devices, and combinations thereof. The content presentation system may include a television, an internet-connected device, a portable entertainment device, a device having a video screen, and combinations thereof. In another embodiment, the content presentation system may include a video display screen where the first frame is substantially the same size as the video display screen, the second frame may comprise a picture-in-picture display, and the third frame may be substantially the same size as the video display screen. In a certain embodiment, when the second signal is displayed on the video display screen in the third frame, the first frame is not displayed, or the signals may be interchanged so that the second signal is in the larger frame and the first signal is in the smaller (e.g., picture-in-picture) frame. Furthermore, each of the first and second signals may include, for example, a video component and an audio component. The video resolution of the first signal in presented in the first frame will typically be greater than the video resolution of the second signal in the second frame. Additionally, the audio component of the second signal when presented in the second frame will typically be muted.

In another embodiment, the content presentation system may include a video display screen where each signal of the select ones of plural signals is displayed in a separate frame.

In a further embodiment, if the second signal comprises advertising content during a time when the second signal is presented in the second frame, the second signal may not be displayed and the second frame may instead display a screen of a uniform color. Alternatively, if the second signal comprises advertising content during a time when the second signal is presented in the second frame, a saved version of the second signal comprising nonadvertising content may be displayed in the second frame (e.g., a still frame or a loop of non-advertising content received via the second signal) and, optionally, a color of the second frame may be a predetermined color.

The channel information may include at least one of a channel number and a network identifier as well as a brief description of an entertainment (e.g., sports, news, weather, talk show, emergency broadcast, etc.) program. The channel use information may include a channel number of a first one of the plural signals, a time of initiating a presentation of content associated with the first signal to the user; a date of initiating a presentation of content associated with the first signal to the user; a duration of a presentation of content associated with the first signal to the user; a total duration of a presentation of content associated with each of the plural signals to the user, and combinations thereof. The recurring first time period may be, for example, a time period of one half hour duration or one hour duration, and, optionally, the recurring first time period may occur at a same time of day for a plurality of days and/or may occur at a same time of day on the same day of the week for a plurality of weeks.

Figure 60:
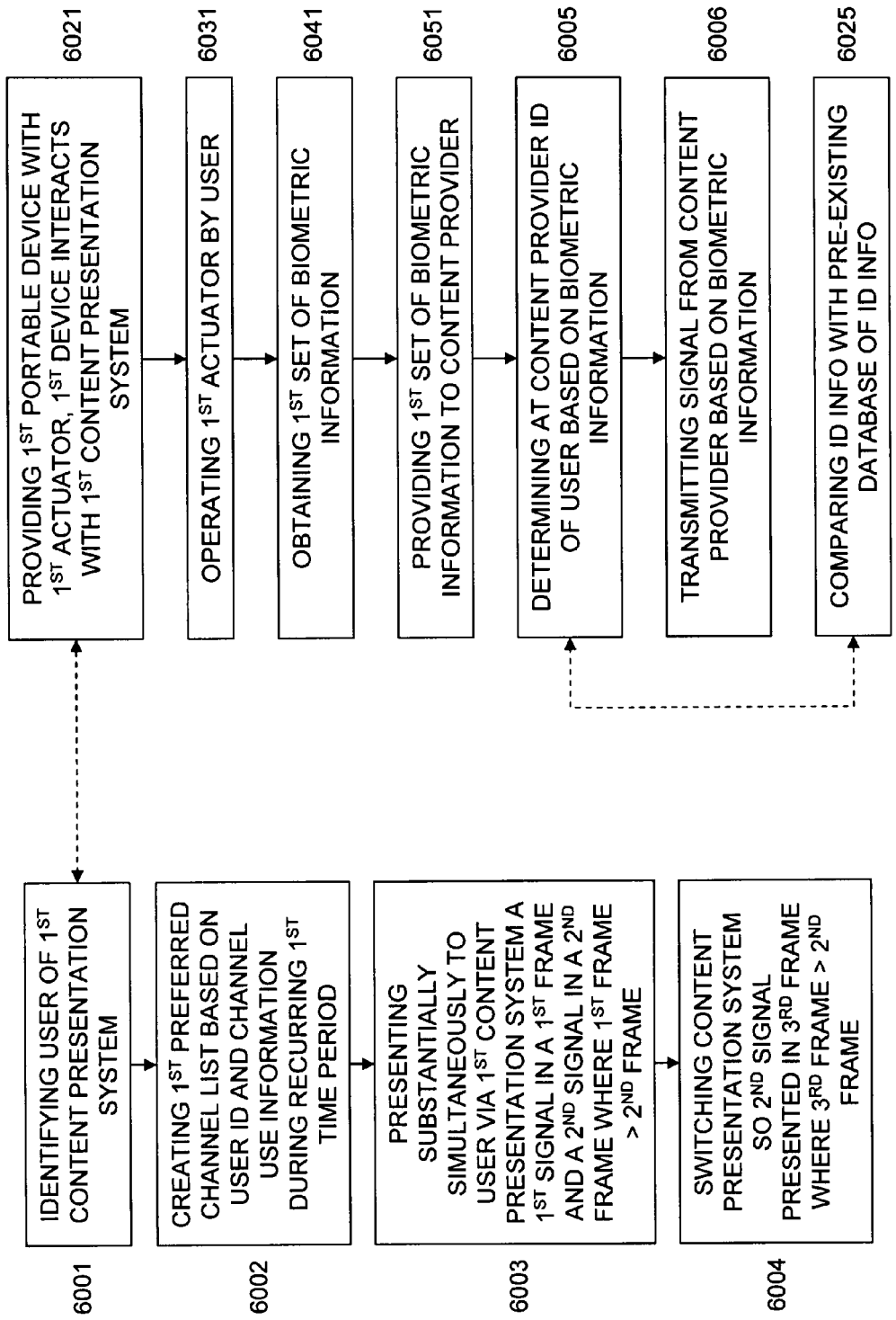
FIG. 60 is a flow diagram for switching signals using picture-in-picture-assisted time-adaptive channel surfing according to an embodiment of the disclosure.

FIG. 60 is a flow diagram for switching signals using picture-in-picture-assisted time-adaptive channel surfing according to an embodiment of the disclosure where blocks 6001, 6002, 6003, and 6004 are similar to blocks 5901, 5902, 5903, and 5904, respectively. In an embodiment, the determining of the identity of the user in block 6001 may include at block 6021 providing a first portable device to interact with the first content presentation system where the first portable device includes a first actuator which is operable by the user for interacting with the first content presentation system via the first portable device, and where the first actuator obtains biometric information from the user, at block 6031 operating the first actuator by the user, at block 6041 obtaining biometric information from the user via the first actuator, and at block 6051 providing the obtained biometric information to the content provider.

A further embodiment includes, at block 6005, determining at the content provider the identification of the user based on the provided biometric information, where determining the identification of the user may include, at block 6025, comparing the provided biometric information with a pre-existing database of biometric information. An additional embodiment may include, at block 6006, transmitting a signal from the content provider based at least on the provided biometric information.

Figure 61:
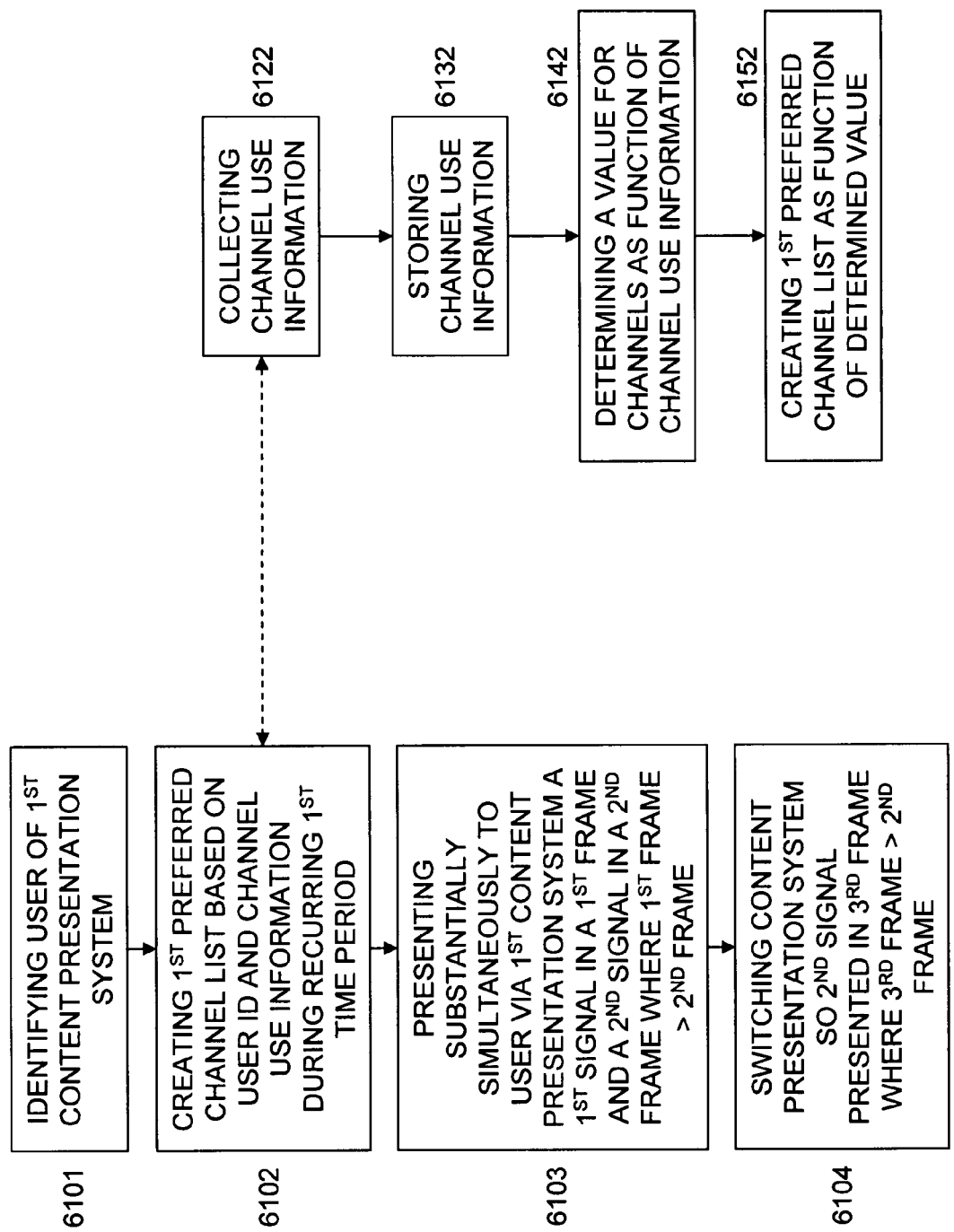
FIG. 61 is a flow diagram for switching signals using picture-in-picture-assisted time-adaptive channel surfing according to an embodiment of the disclosure.

FIG. 61 is a flow diagram for switching signals using picture-in-picture-assisted time-adaptive channel surfing according to an embodiment of the disclosure where blocks 6101, 6102, 6103, and 6104 are similar to blocks 5901, 5902, 5903, and 5904, respectively. In an embodiment, the creating the first preferred channel list at block 6102 may include, at block 6122, collecting channel use information for each of a plurality of channels from the user's interaction with the first content presentation system, at block 6132, optionally storing the channel use information, at block 6142, determining a value for each of the plural channels as a function of the channel use information, and at block 6152, creating the first preferred channel list for the plural channels as a function of the determined value.

Figure 62:
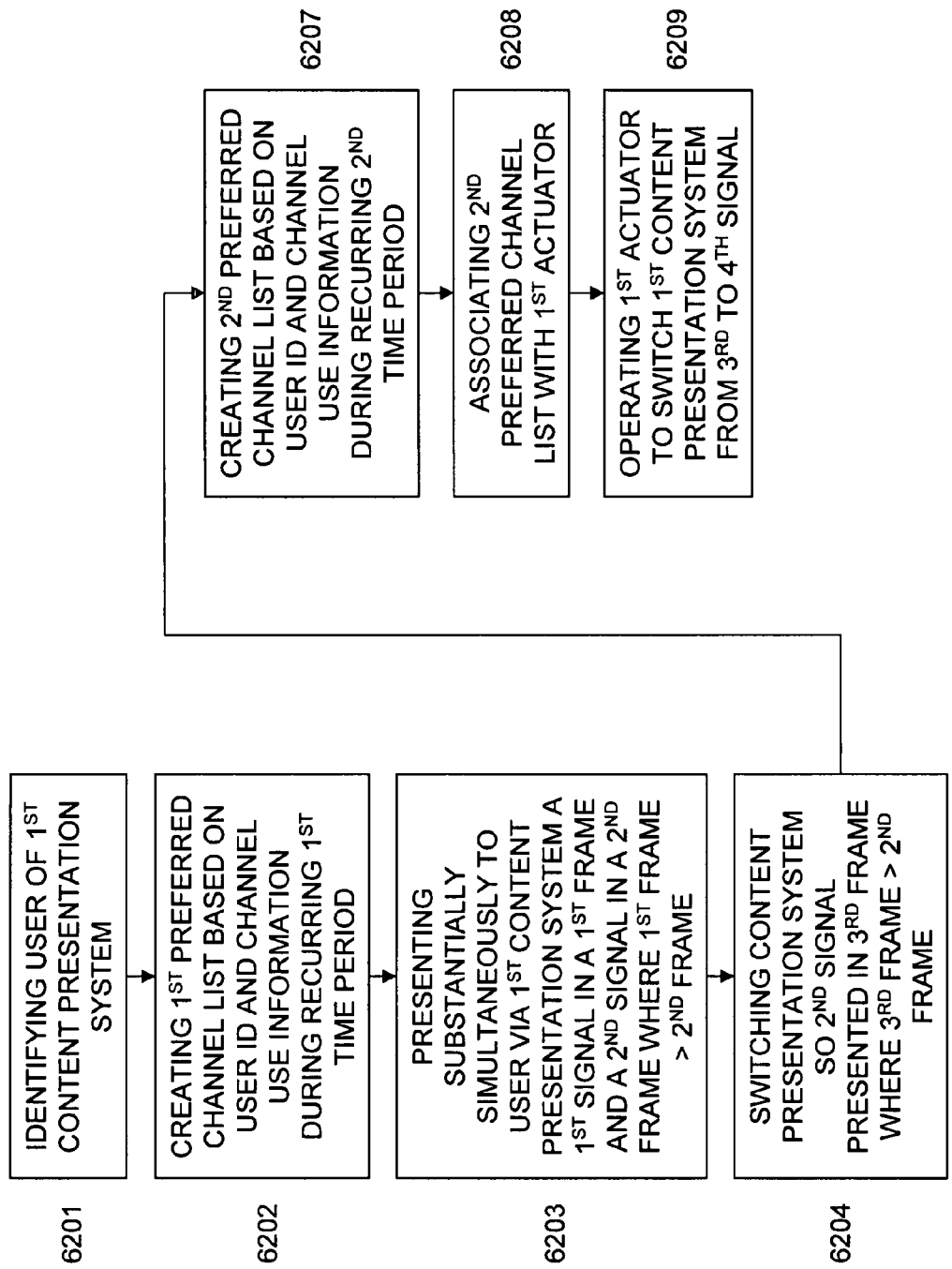
FIG. 62 is a flow diagram for switching signals using picture-in-picture-assisted time-adaptive channel surfing according to an embodiment of the disclosure.

FIG. 62 is a flow diagram for switching signals using picture-in-picture-assisted time-adaptive channel surfing according to an embodiment of the disclosure where blocks 6201, 6202, 6203, and 6204 are similar to blocks 5901, 5902, 5903, and 5904, respectively. An embodiment further includes, at block 6207, creating a second preferred channel list based on the identity of the user and based on previously determined information for the user where the information is determined for a recurring second time period, at block 6208, associating the second preferred channel list with a first actuator operable by the user for interacting with the first content presentation system, and at block 6209, operating the first actuator to thereby switch the first content presentation system from presenting a third signal provided by the content provider to presenting a fourth signal provided by the content provider. In an additional embodiment, the first and the third signals may be the same, and/or the second and the fourth signals may be the same.

Figure 63:
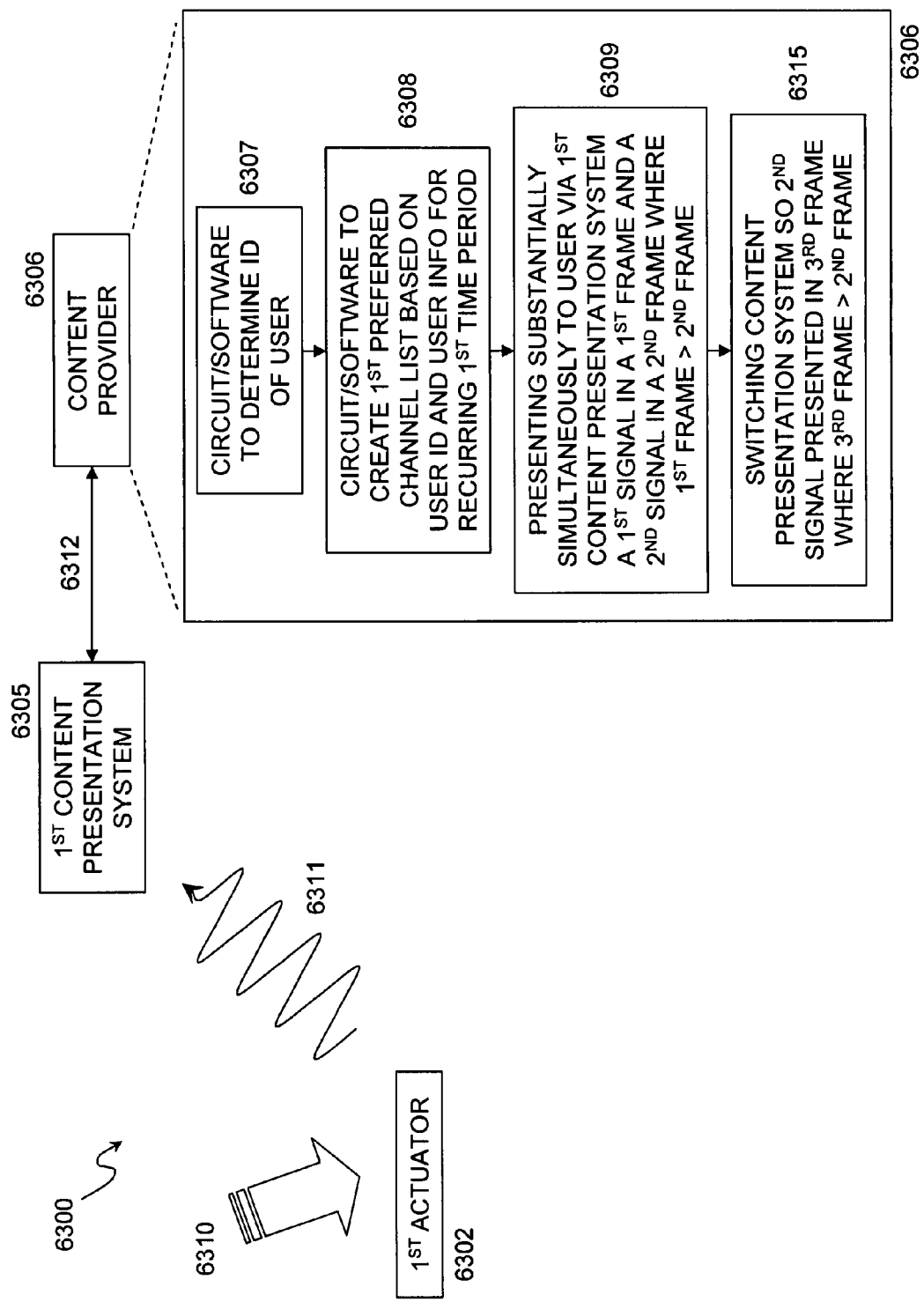
FIG. 63 is a block diagram of a system for switching signals using picture-in-picture-assisted time-adaptive channel surfing according to an embodiment of the disclosure.

FIG. 63 is a block diagram of a system 6300 for switching signals using picture-in-picture-assisted time-adaptive channel surfing according to an embodiment of the disclosure. The system 6300 may be used advantageously for switching from a first signal provided by a content provider 6306 to a second signal provided by the content provider 6306 and may include a first content presentation system 6305, circuitry 6307 for determining an identity of a user of the first content presentation system 6305 that is operatively connected via the transmission path 6312 to the content provider 6306, where the content provider 6306 provides a plurality of signals to the first content presentation system 6305, circuitry 6308 for creating a first preferred channel list which includes channel information for each of select ones of the plural signals, where the preferred channel list is created based on the identity of the user and/or based on channel use information for the user during a recurring first time period, circuitry 6309 for presenting substantially simultaneously to the user via the first content presentation system 6305 a first signal of the select ones of plural signals in a first frame and a second signal of the select ones of plural signals in a second frame, where the first frame is larger than the second frame, and circuitry 6315 for switching the content presentation system 6305 so that the second signal is presented in a third frame that is larger than the second frame. The user may interact with the content presentation system 6305 using a device, e.g., a remote control device, having an actuator 6302. When the user operates 6310 the actuator 6302, a signal is sent via the transmission path 6311 to the content presentation system 6305, as has been hereinbefore described.

In an embodiment, the content provider 6406 may include one or more broadcasters, one or more cable television systems, one or more magnetic storage devices, one or more optical storage devices, one or more electronic storage devices, and combinations thereof. The content presentation system 6305 may include a television, a radio, an internet-connected device, a music playing device, a portable entertainment device, a personal digital assistant, a cellular phone/information system, or other device having a video screen, and combinations thereof. In another embodiment, the content presentation system 6305 may include a video display screen where the first frame is substantially the same size as the video display screen, the second frame may comprise a picture-in-picture display, and the third frame may be substantially the same size as the video display screen. In a certain embodiment, when the second signal is displayed on the video display screen in the third frame, the first frame is not displayed, or the signals may be interchanged so that the second signal is in the larger frame and the first signal is in the smaller (e.g., picture-in-picture) frame. Furthermore, each of the first and second signals may include, for example, a video component and an audio component. The video resolution of the first signal in presented in the first frame will typically be greater than the video resolution of the second signal in the second frame. Additionally, the audio component of the second signal when presented in the second frame will typically be muted.

In another embodiment, the content presentation system 6305 may include a video display screen where each signal of the select ones of plural signals is displayed in a separate frame.

In a further embodiment, if the second signal comprises advertising content during a time when the second signal is presented in the second frame, the second signal may not be displayed and the second frame may instead display a screen of a uniform color. Alternatively, if the second signal comprises advertising content during a time when the second signal is presented in the second frame, a saved version of the second signal comprising nonadvertising content may be displayed in the second frame (e.g., a still frame or a loop of non-advertising content received via the second signal) and, optionally, a color of the second frame may be a predetermined color.

The channel information may include at least one of a channel number and a network identifier as well as a brief description of an entertainment (e.g., sports, news, weather, talk show, emergency broadcast, etc.) program. The channel use information may include a channel number of a first one of the plural signals, a time of initiating a presentation of content associated with the first signal to the user; a date of initiating a presentation of content associated with the first signal to the user; a duration of a presentation of content associated with the first signal to the user; a total duration of a presentation of content associated with each of the plural signals to the user, and combinations thereof. The recurring first time period may be, for example, a time period of one half hour duration or one hour duration, and, optionally, the recurring first time period may occur at a same time of day for a plurality of days and/or may occur at a same time of day on the same day of the week for a plurality of weeks.

Figure 64:
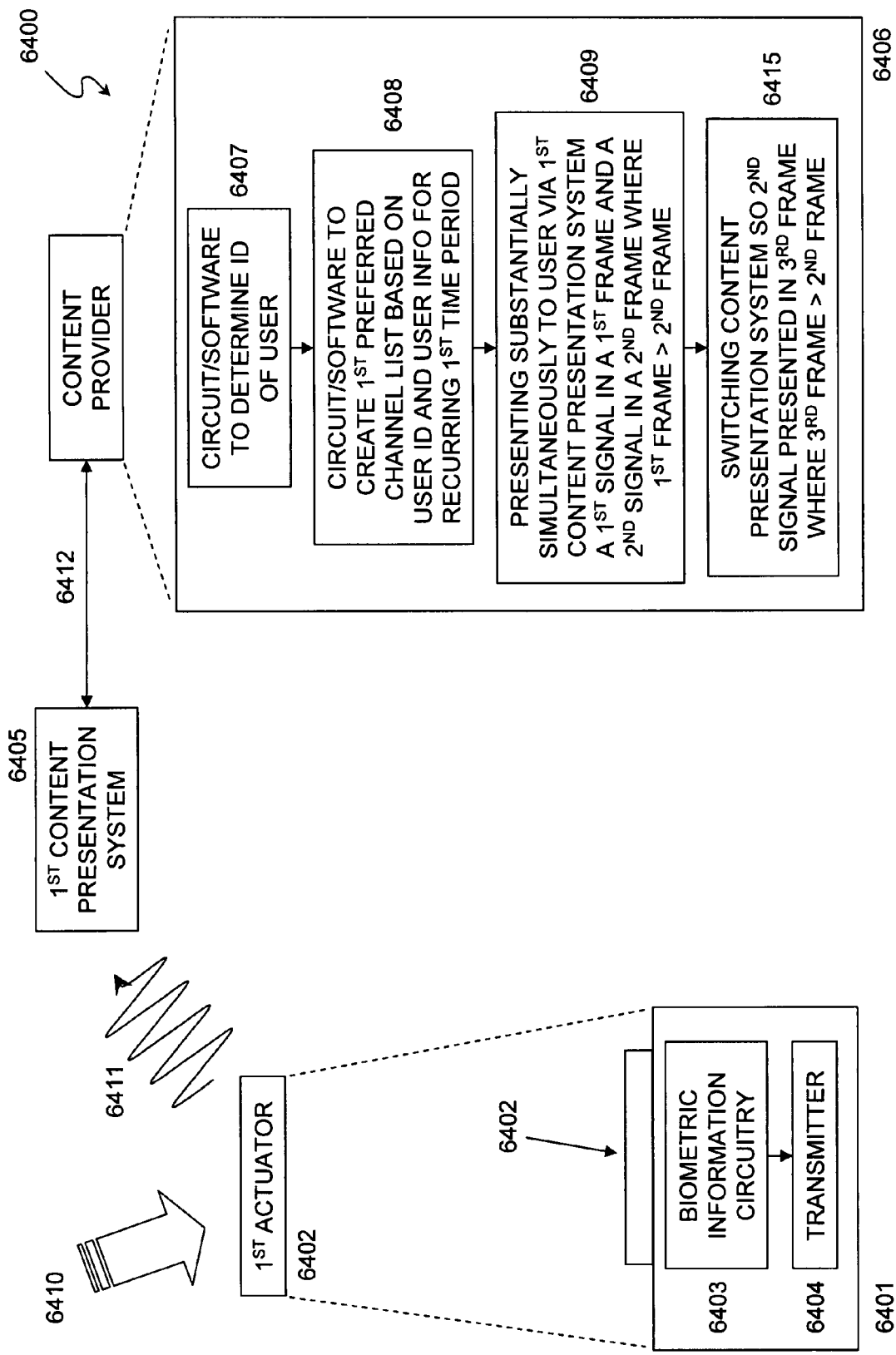
FIG. 64 is a block diagram of a system for switching signals using picture-in-picture-assisted time-adaptive channel surfing according to an embodiment of the disclosure.

FIG. 64 is a block diagram of a system for switching signals using picture-in-picture-assisted time-adaptive channel surfing according to an embodiment of the disclosure. Blocks 6405, 6406, 6407, 6408, 6409, and 6415 may contain circuitry similar to circuitry described above in blocks 6305, 6306, 6307, 6308, 6309, and 6315, respectively. Additionally, the transmission paths 6411 and 6412 may be similar to the transmission paths 6311 and 6312, respectively. Furthermore, the actuator 6402 may be similar to the actuator 6302 and operation 6410 of the actuator 6402 may be similar to operation 6310 of the actuator 6302. The system 6400 may include a first portable device 6401 including a first actuator 6402 which is operable 6410 by the user for interacting with the first content presentation system 6405 via the transmission path 6411, and where the first actuator 6402 obtains biometric information from the user via circuitry 6403 and circuitry 6404 for providing the obtained biometric information to the content provider 6406.

Figure 65:
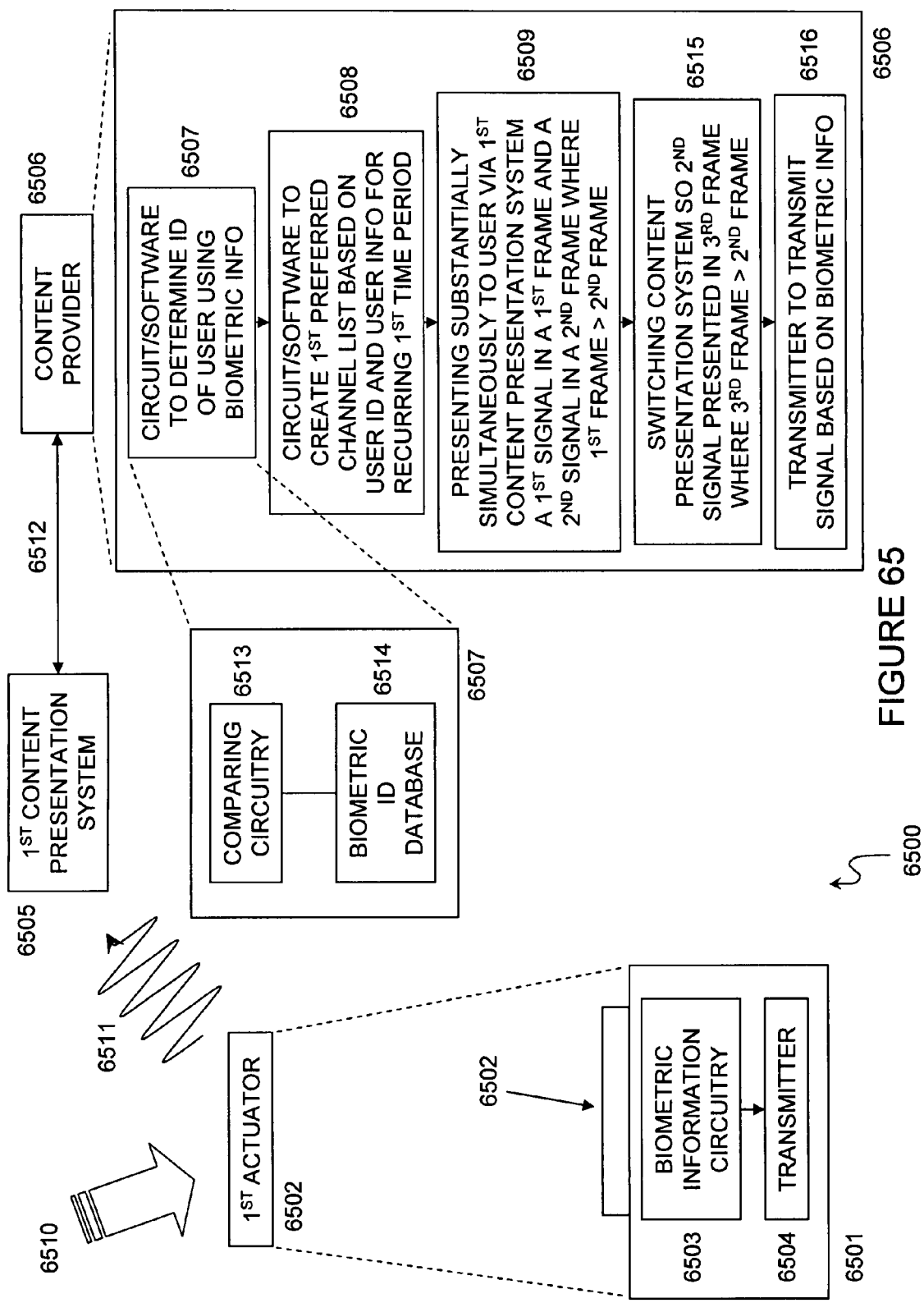
FIG. 65 is a block diagram of a system for switching signals using picture-in-picture-assisted time-adaptive channel surfing according to an embodiment of the disclosure.

FIG. 65 is a block diagram of a system 6500 for switching signals using picture-in-picture-assisted time-adaptive channel surfing according to an embodiment of the disclosure. Blocks 6505, 6506, 6507, 6508, 6509, and 6515 may contain circuitry similar to circuitry described above in blocks 6305, 6306, 6307, 6308, 6309, and 6315, respectively. Blocks 6501, 6503, and 6504 may contain circuitry similar to circuitry described above in blocks 6401, 6403, and 6404, respectively. Additionally, the transmission paths 6511 and 6512 may be similar to the transmission paths 6311 and 6312, respectively. Furthermore, the actuator 6502 may be similar to the actuator 6302 and operation 6510 of the actuator 6502 may be similar to operation 6310 of the actuator 6302. The system 6500 may include circuitry 6507 for determining at the content provider the identification of the user based on the provided biometric information which may include circuitry 6513 for comparing the provided biometric information with a pre-existing database 6514 of biometric information. Furthermore, the content provider 6506 may also a transmitter 6516 for transmitting a signal from the content provider 6506 based at least on the provided biometric information.

Figure 66:
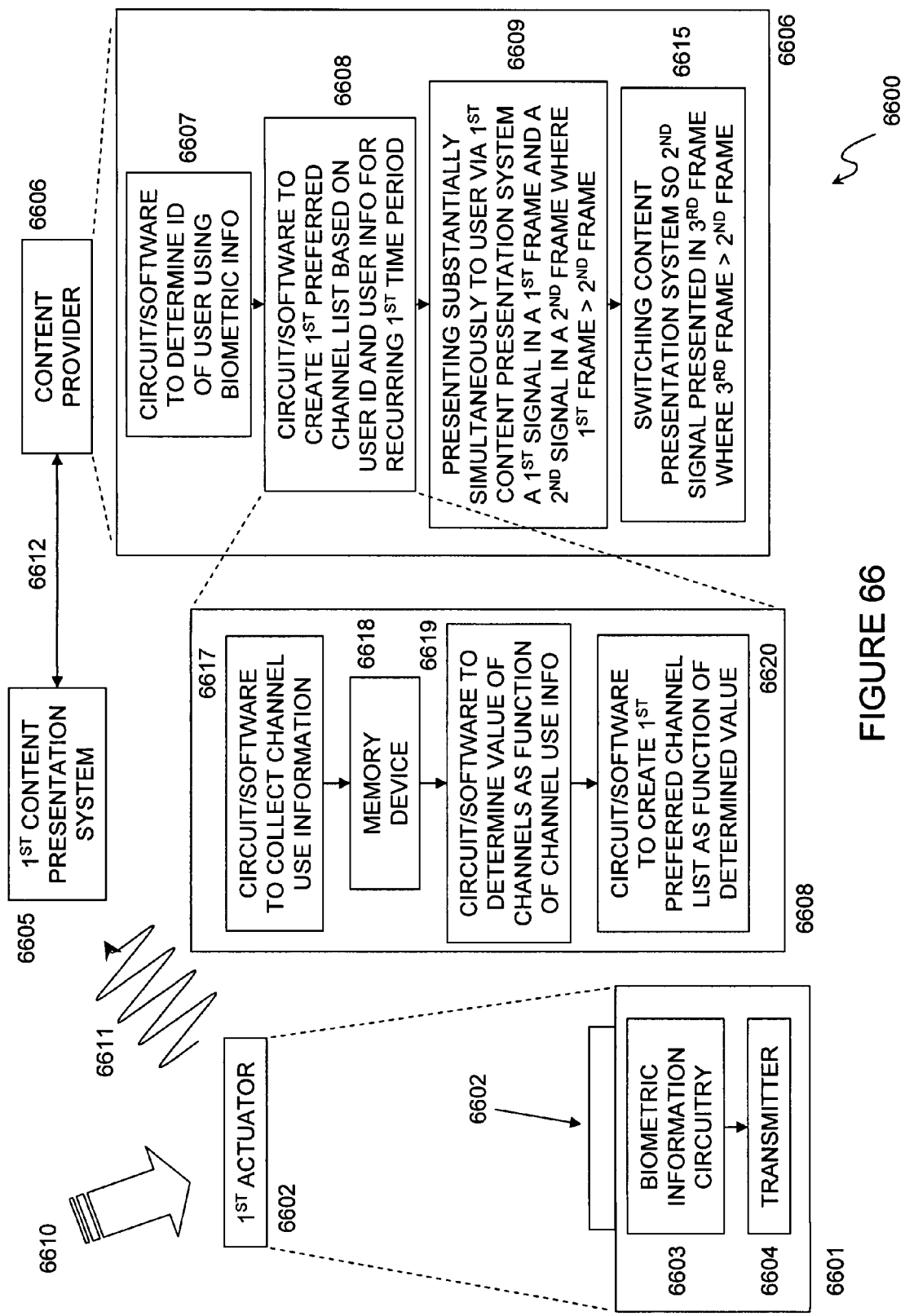
FIG. 66 is a block diagram of a system for switching signals using picture-in-picture-assisted time-adaptive channel surfing according to an embodiment of the disclosure.

FIG. 66 is a block diagram of a system 6600 for switching signals using picture-in-picture-assisted time-adaptive channel surfing according to an embodiment of the disclosure. Blocks 6605, 6606, 6607, 6608, 6609, and 6615 may contain circuitry similar to circuitry described above in blocks 6505, 6506, 6507, 6508, 6509, and 6515, respectively. Blocks 6601, 6603, and 6604 may contain circuitry similar to circuitry described above in blocks 6401, 6403, and 6404, respectively. Additionally, the transmission paths 6611 and 6612 may be similar to the transmission paths 6311 and 6312, respectively. Furthermore, the actuator 6602 may be similar to the actuator 6302 and operation 6610 of the actuator 6602 may be similar to operation 6310 of the actuator 6302. The circuitry 6608 for creating the first preferred channel list may include circuitry 6617 for collecting channel use information for each of a plurality of channels from the user's interaction with the first content presentation system 6605, a memory device 6618 for storing the channel use information, circuitry 6619 for determining a value for each of the plural channels as a function of the channel use information, and circuitry 6620 for creating the first preferred channel list for the plural channels as a function of the determined value.

Figure 67:
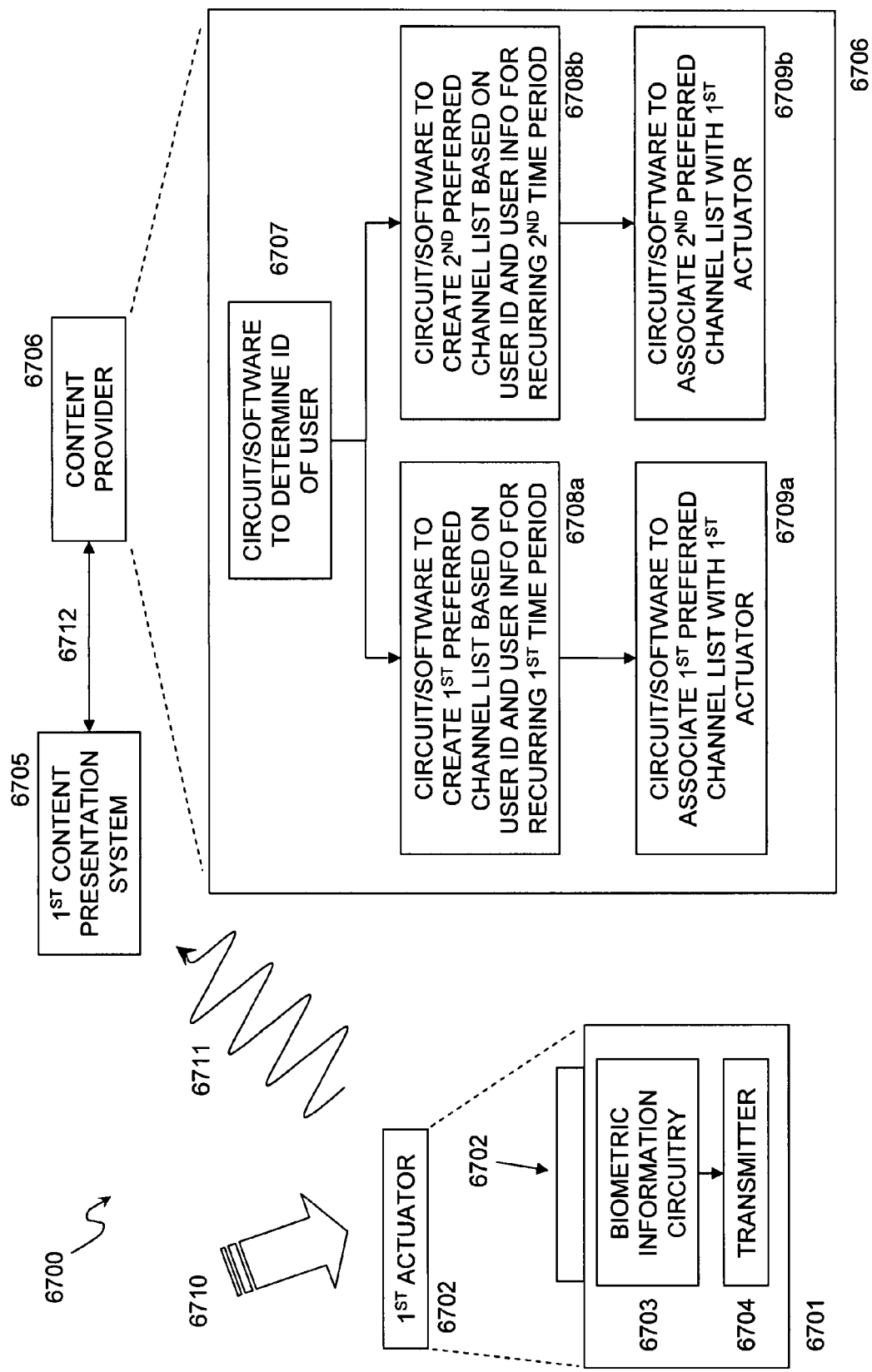
FIG. 67 is a block diagram of a system for switching signals using picture-in-picture-assisted time-adaptive channel surfing according to an embodiment of the disclosure.

FIG. 67 is a block diagram of a system for switching signals using picture-in-picture-assisted time-adaptive channel surfing according to an embodiment of the disclosure. Blocks 6705, 6706, 6707, 6708a, and 6709a, may contain circuitry similar to circuitry described above in blocks 6505, 6506, 6507, 6508, and 6509, respectively. Blocks 6701, 6703, and 6704 may contain circuitry similar to circuitry described above in blocks 6401, 6403, and 6404, respectively. Additionally, the transmission paths 6711 and 6712 may be similar to the transmission paths 6311 and 6312, respectively. Furthermore, the actuator 6702 may be similar to the actuator 6302 and operation 6710 of the actuator 6702 may be similar to operation 6310 of the actuator 6302. The content provider 9706 may further include circuitry 6708b for creating a second preferred channel list based on the identity of the user and based on previously determined information for the user where the information is determined for a recurring second time period, circuitry 6709b for associating the second preferred channel list with the first actuator 6702 operable 6710 by the user for interacting with the first content presentation system via the transmission path 6711, where operating 6710 the first actuator 6702 switches the first content presentation system 6705 from presenting a third signal provided by the content provider 6706 to presenting a fourth signal provided by the content provider 6706.

In a further embodiment, the first and the third signals may be the same and/or the second and the fourth signals may be the same.

Figure 68:
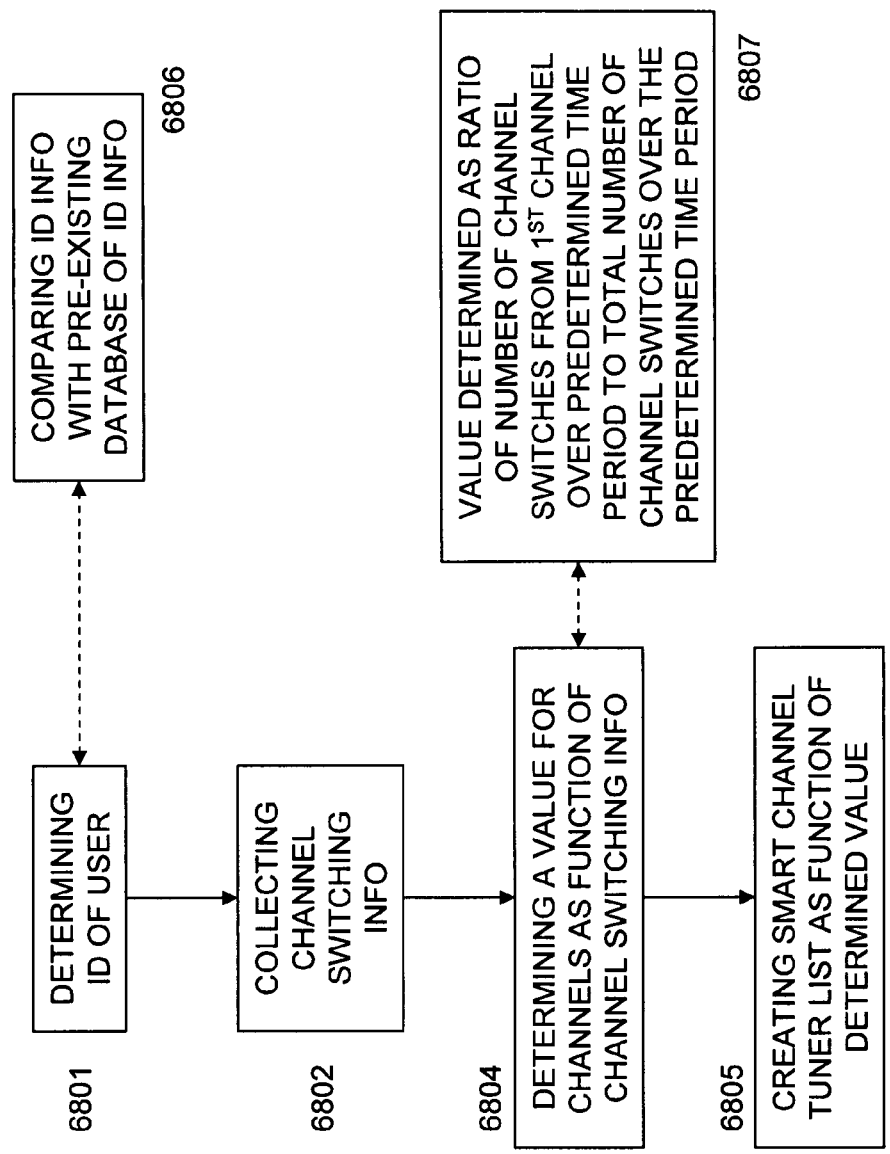
FIG. 68 is a flow diagram for creating a smart channel tuner list according to an embodiment of the disclosure.

Now directing attention to FIG. 68, a flow diagram is presented for creating a smart channel tuner list according to an embodiment of the disclosure. The depicted method may include, at block 6801, determining an identity of a user interacting with a content presentation system, at block 6802, collecting channel switching information from the first channel to each of a plurality of second channels from the user's interaction with the content presentation system, at block 6804, determining a value for each of the plural second channels as a function of the channel switching information, and at block 6805, creating a smart channel tuner list as a function of the determined value. The content presentation system may include a television, a radio, an internet-connected device, a music playing device, a portable entertainment device, a personal digital assistant, a cellular phone/information system, and combinations thereof.

In an embodiment, the identification of the user may be determined using identification information such as biometrics, voice activation, fingerprint, user-entered password, use of a unique key on a remote device by which the user interacts with the content presentation system, use of a unique remote device by which the user interacts with the content presentation system, and combinations thereof.

In a further embodiment, the determining of an identity of a user at block 6801 may include comparing the identification information with a pre-existing database of identification information at block 6806. In still a further embodiment, the determining of a value for the channels at block 6804 may include, at block 6807, determining the value for one channel of the plural second channels is as a ratio of the number of channel switches from the first channel to the one channel to a total number of channel switches from the first channel to any other channel over a predetermined time period. The predetermined time period may be approximately one half hour, approximately one hour, approximately one day, less than or equal to one week, or more than one week. Alternatively, the predetermined time period may correspond to a predetermined time slot where the predetermined time slot recurs on a daily basis and/or recurs on a weekly basis.

In another embodiment, the smart channel tuner list may only include ones of the plural second channels that have a determined value greater than a predetermined amount, or that have a determined value for a predetermined time slot greater than a predetermined amount.

In still a further embodiment, the smart channel tuner list may include a channel immediately adjacent to the first channel, i.e., a channel that has a channel number one above and/or one below the channel number for the first channel.

Figure 69:
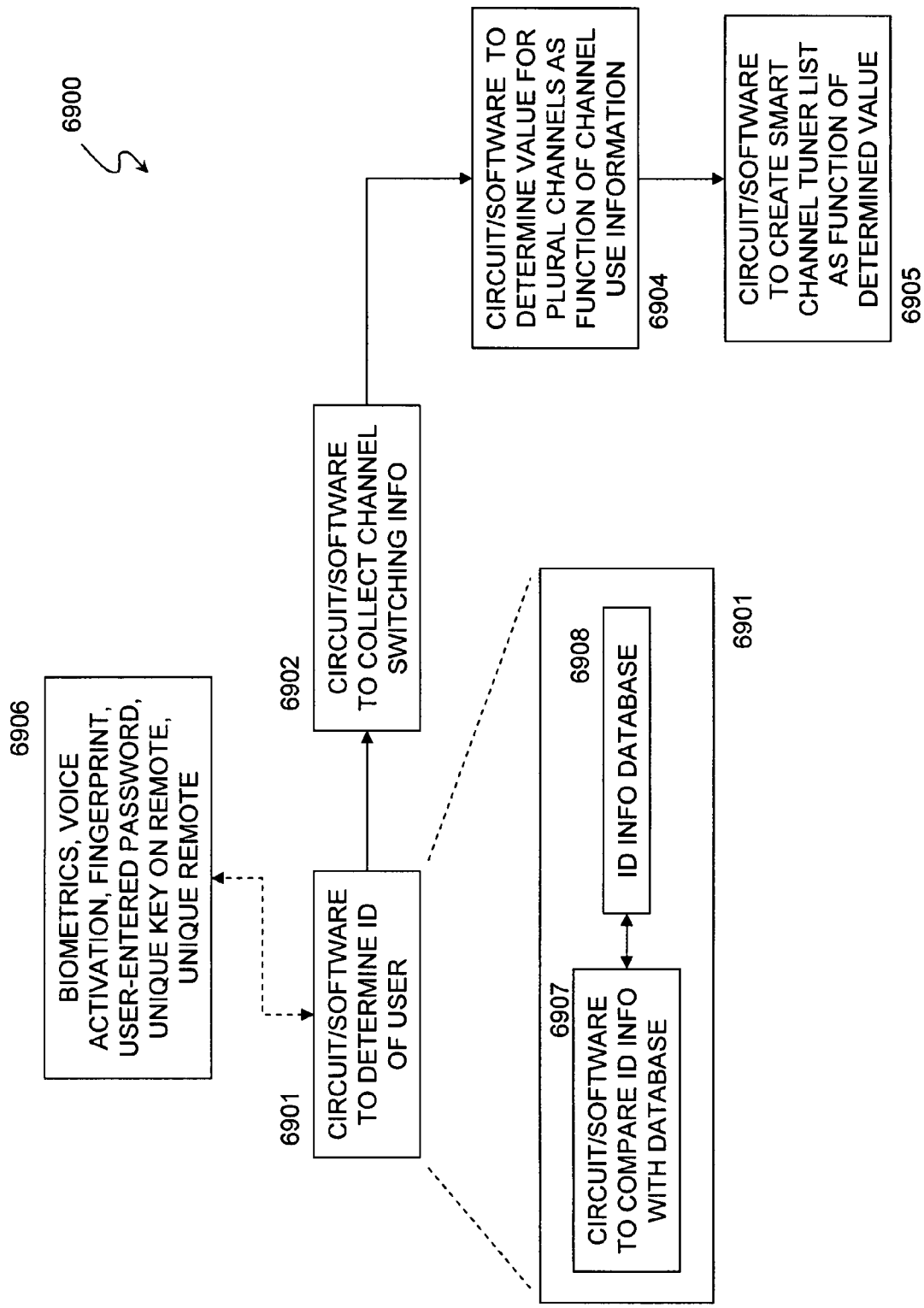
FIG. 69 is a block diagram of a system for creating a smart channel tuner list according to an embodiment of the disclosure.

Referring now to FIG. 69, a block diagram of a system 6900 is presented where the system 6900 may be used for creating a smart channel tuner list according to an embodiment of the disclosure. The system 6900 may include circuitry 6901 for determining an identity of a user interacting with a content presentation system (not shown for clarity), circuitry 6902 for collecting channel switching information from the first channel to each of a plurality of second channels from the user's interaction with the content presentation system, circuitry 6904 for determining a value for each of the plural second channels as a function of the channel switching information, and circuitry 6905 for creating a smart channel tuner list as a function of the determined value. The content presentation system, as previously described, may include a television, a radio, an internet-connected device, a music playing device, a portable entertainment device, a personal digital assistant, a cellular phone/information system, and combinations thereof.

In an embodiment, the circuitry 6901 for determining an identity of a user may include circuitry 6906 where the user is determined using identification information such as biometrics, voice activation, fingerprint, user-entered password, use of a unique key on a remote device by which the user interacts with the content presentation system, use of a unique remote device by which the user interacts with the content presentation system, and combinations thereof. In a further embodiment, the circuitry 6901 for determining an identity of a user may include circuitry 6907 for comparing the identification information with a pre-existing database 6908 of identification information.

In another embodiment, the smart channel tuner list may only include ones of the plural second channels that have a determined value greater than a predetermined amount or the smart channel tuner list may only include ones of the plural second channels that have a determined value for a predetermined time slot greater than a predetermined amount.

In yet another embodiment, the smart channel tuner list may include a channel immediately adjacent to the first channel, e.g., a channel that has a channel number one number greater or less than the channel number of the first channel.

Figure 70:
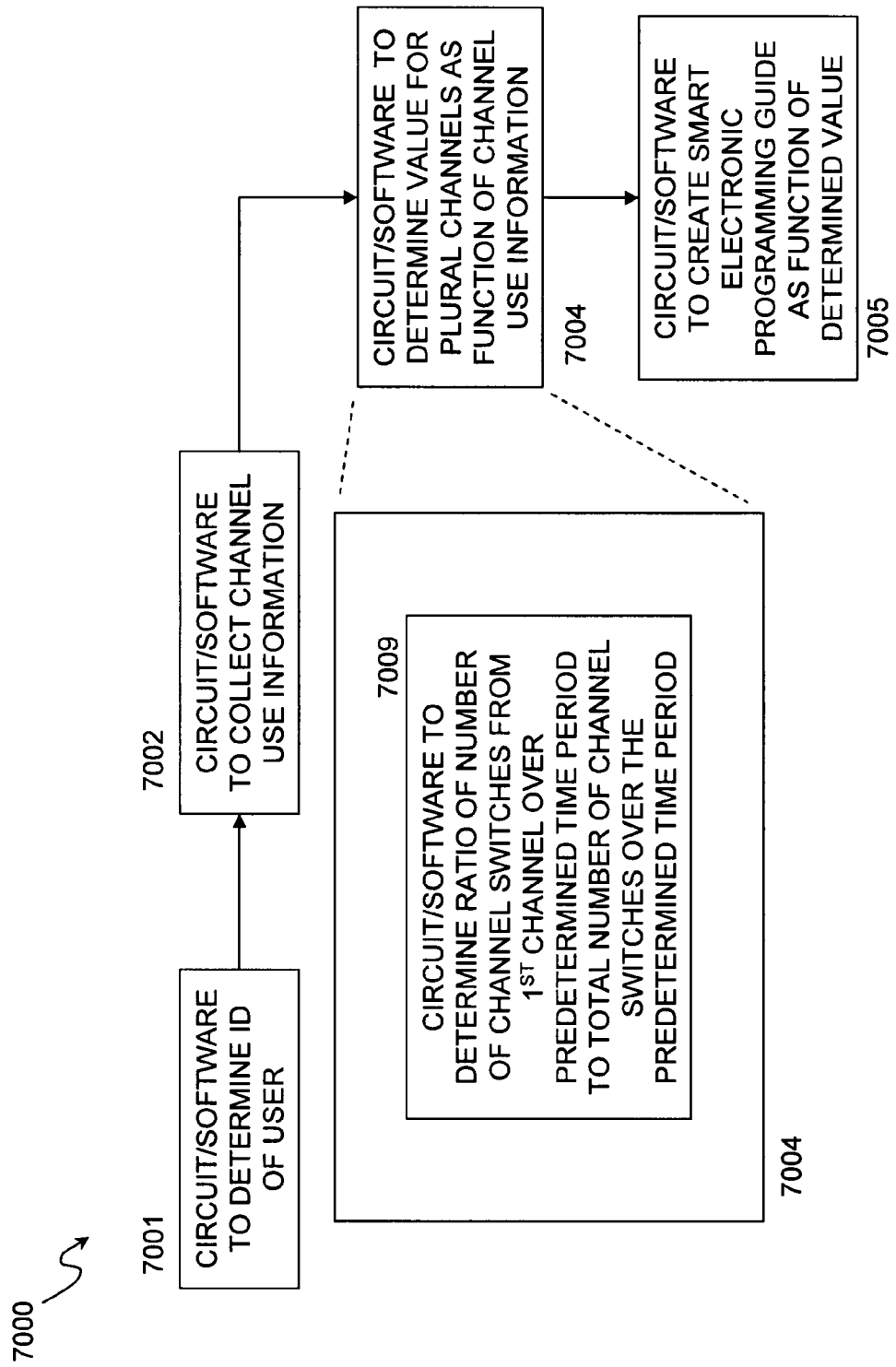
FIG. 70 is a block diagram of a system for creating a smart channel tuner list according to an embodiment of the disclosure.

FIG. 70 is a block diagram of a system 7000 for creating a smart channel tuner list according to an embodiment of the disclosure. Blocks 7001, 7002, 7004, and 7005 may contain circuitry similar to circuitry described above in blocks 6901, 6902, 6904, and 6905, respectively. In this embodiment, the circuitry 7004 for determining the value for the one channel of the plural second channels may include circuitry 7009 for determining a ratio of the number of channel switches from the first channel to the one channel to a total number of channel switches from the first channel to any other channel over a predetermined time period. The predetermined time period may be approximately one half hour, approximately one hour, approximately one day, less than or equal to one week, or more than one week. Alternatively, the predetermined time period may correspond to a predetermined time slot where the predetermined time slot recurs on a daily basis and/or recurs on a weekly basis.

Figure 71:
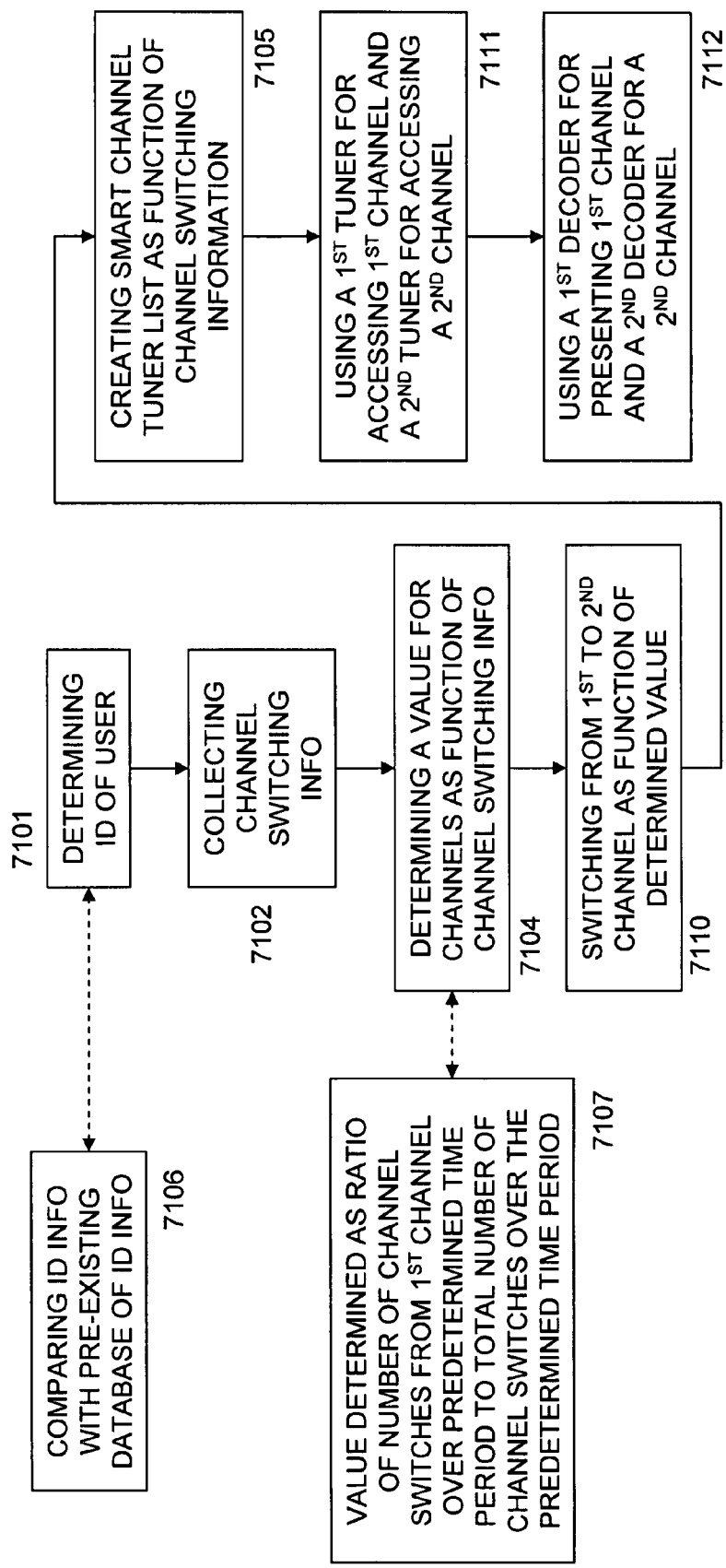
FIG. 71 is a flow diagram for switching signals using a smart channel tuner list according to an embodiment of the disclosure.

FIG. 71 is a flow diagram for switching signals using a smart channel tuner list according to an embodiment of the disclosure. The depicted method may include, at block 7101, determining an identity of a user interacting with a content presentation system, at block 7102, collecting channel switching information from the first channel to each of a plurality of second channels from the user's interaction with the content presentation system, at block 7104, determining a value for each of the plural second channels as a function of the channel switching information, and at block 7110, switching from a first channel to one of the second channels as a function of the determined value. The content presentation system may include a television, a radio, an internet-connected device, a music playing device, a portable entertainment device, a personal digital assistant, a cellular phone/information system, and combinations thereof.

In an embodiment, the identification of the user may be determined using identification information such as biometrics, voice activation, fingerprint, user-entered password, use of a unique key on a remote device by which the user interacts with the content presentation system, use of a unique remote device by which the user interacts with the content presentation system, and combinations thereof.

In a further embodiment, the determining of an identity of a user at block 7101 may include comparing the identification information with a pre-existing database of identification information at block 7106. In still a further embodiment, the determining of a value for the channels at block 7104 may include, at block 7107, determining the value for one channel of the plural second channels is as a ratio of the number of channel switches from the first channel to the one channel to a total number of channel switches from the first channel to any other channel over a predetermined time period. The predetermined time period may be approximately one half hour, approximately one hour, approximately one day, less than or equal to one week, or more than one week. Alternatively, the predetermined time period may correspond to a predetermined time slot where the predetermined time slot recurs on a daily basis and/or recurs on a weekly basis.

In another embodiment, the smart channel tuner list may only include ones of the plural second channels that have a determined value greater than a predetermined amount, or that have a determined value for a predetermined time slot greater than a predetermined amount.

In still a further embodiment, the smart channel tuner list may include a channel immediately adjacent to the first channel, i.e., a channel that has a channel number one above and/or one below the channel number for the first channel.

An embodiment further includes at block 7105 creating a smart channel tuner list as a function of the channel switching information. Another embodiment includes at block 7111 using a first tuner for accessing the first channel and using a second tuner for accessing one of the plural second channels. Another embodiment at block 7112 using a first decoder for presenting the first channel on the content provider and using a second decoder for one of the plural second channels.

Figure 72:
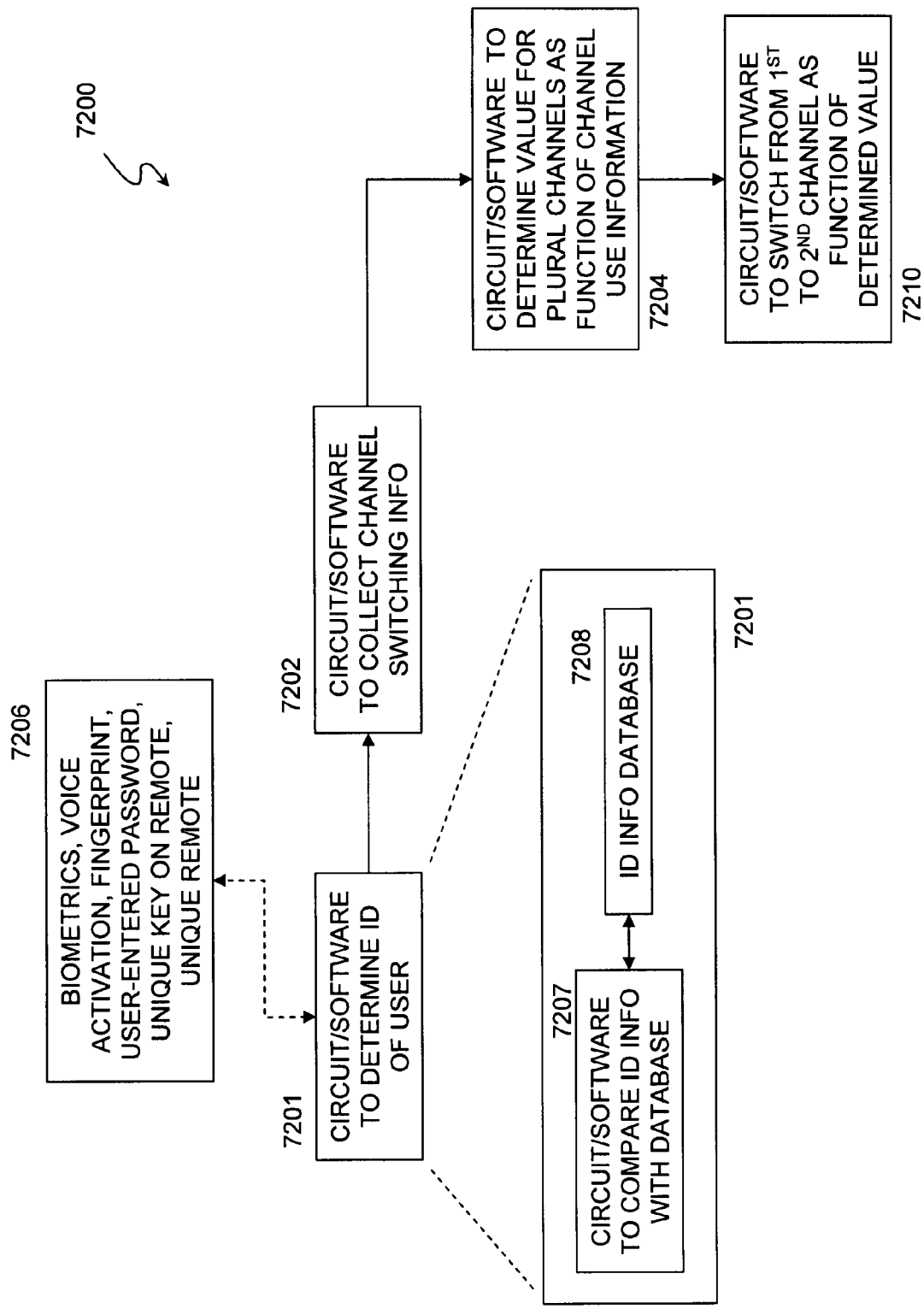
FIG. 72 is a block diagram of a system for switching signals using a smart channel tuner list according to an embodiment of the disclosure.

FIG. 72 is a block diagram of a system 7200 for switching signals using a smart channel tuner list according to an embodiment of the disclosure. More specifically, the system 7200 may be used for switching from a first channel provided by a content provider (not shown for clarity) to a second channel provided by the content provider. The system 7200 may include circuitry 7201 for determining an identity of a user interacting with a content presentation system (not shown for clarity), circuitry 7202 for collecting channel switching information from the first channel to each of a plurality of second channels from the user's interaction with the content presentation system, circuitry 7204 for determining a value for each of the plural second channels as a function of the channel switching information, and circuitry 7210 for switching from the first channel to one of the second channels as a function of the determined value. The content presentation system, as previously described, may include a television, a radio, an internet-connected device, a music playing device, a portable entertainment device, a personal digital assistant, a cellular phone/information system, and combinations thereof.

In an embodiment, the circuitry 7201 for determining an identity of a user may include circuitry 7206 where the user is determined using identification information such as biometrics, voice activation, fingerprint, user-entered password, use of a unique key on a remote device by which the user interacts with the content presentation system, use of a unique remote device by which the user interacts with the content presentation system, and combinations thereof. In a further embodiment, the circuitry 7201 for determining an identity of a user may include circuitry 7207 for comparing the identification information with a pre-existing database 7208 of identification information.

In another embodiment, the smart channel tuner list may only include ones of the plural second channels that have a determined value greater than a predetermined amount or the smart channel tuner list may only include ones of the plural second channels that have a determined value for a predetermined time slot greater than a predetermined amount.

In yet another embodiment, the smart channel tuner list may include a channel immediately adjacent to the first channel, e.g., a channel that has a channel number one number greater or less than the channel number of the first channel.

Figure 73:
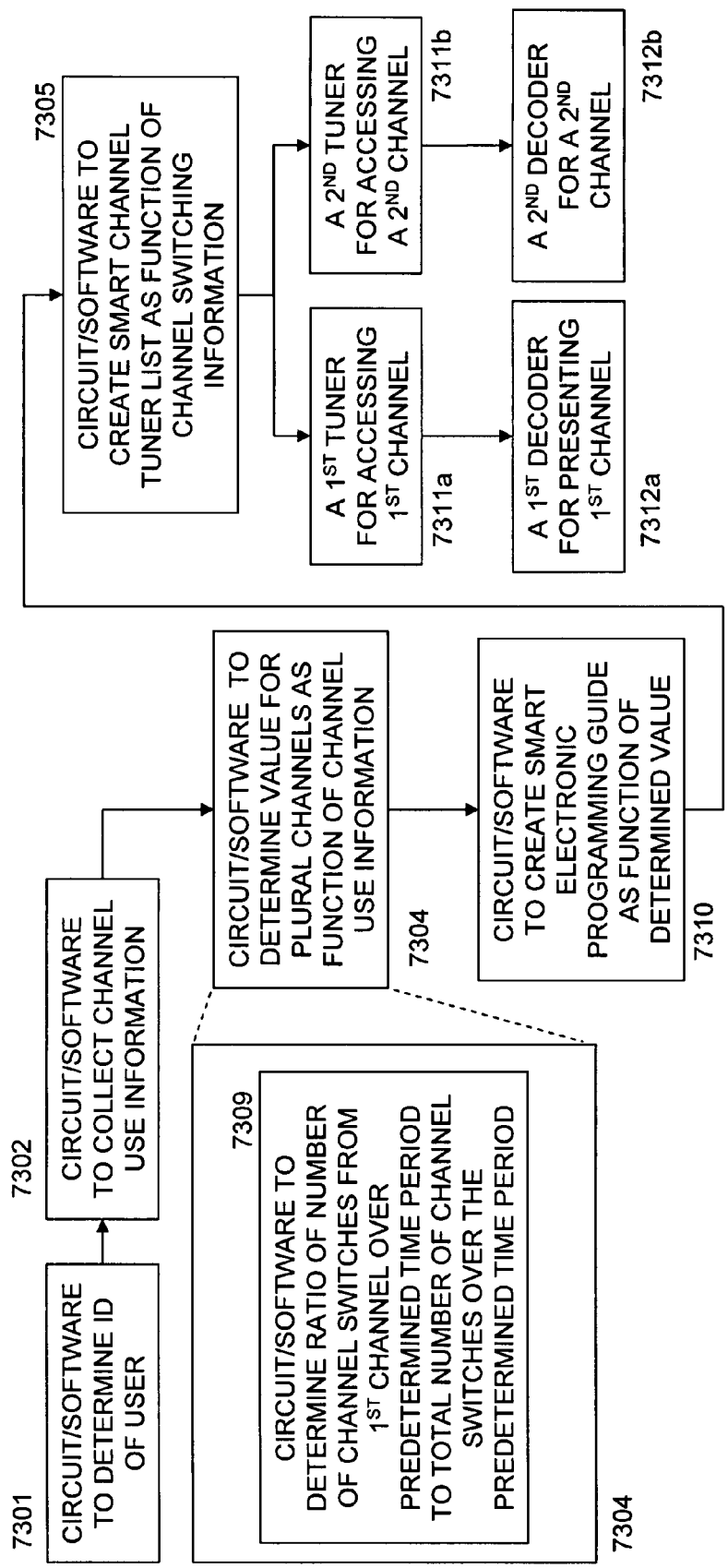
FIG. 73 is a block diagram of a system for switching signals using a smart channel tuner list according to an embodiment of the disclosure.

FIG. 73 is a block diagram of a system 7300 for switching signals using a smart channel tuner list according to an embodiment of the disclosure. Blocks 7301, 7302, 7304, and 7310 may contain circuitry similar to circuitry described above in blocks 7201, 7202, 7204, and 7210, respectively. In this embodiment, the circuitry 7304 for determining the value for the one channel of the plural second channels may include circuitry 7309 for determining a ratio of the number of channel switches from the first channel to the one channel to a total number of channel switches from the first channel to any other channel over a predetermined time period. The predetermined time period may be approximately one half hour, approximately one hour, approximately one day, less than or equal to one week, or more than one week. Alternatively, the predetermined time period may correspond to a predetermined time slot where the predetermined time slot recurs on a daily basis and/or recurs on a weekly basis.

In a further embodiment, the system 7300 may include circuitry 7305 for creating a smart channel tuner list as a function of the channel switching information. Another embodiment may also include a first tuner 7311*a* for accessing the first channel and a second tuner 7311*b* for accessing one of the plural second channels. Still another embodiment may also include a first decoder 7312*a* for presenting the first channel on the content provider and a second decoder 7312*b* for decoding one of the plural second channels. The first and second tuners and the first and second decoders may be typical prior art tuners and decoders, as are known in the art.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those of skill in the art from a perusal hereof.

We claim:

1. A method for creating a smart channel tuner list, comprising:
    determining an identity of a user interacting with a content presentation system;
    collecting in the content provider channel switching information from said a first channel to each of a plurality of second channels from the user's interaction with the content presentation system; wherein the channel switching information includes the identity of the user, and time data that identifies each time the user switches to a given one of the plurality of second channels;
    determining a value for each of the plurality of second channels as a function of the channel switching information; and
    generating the smart channel tuner list that includes a subset of the plurality of second channels, wherein smart channel tuner list characterizes the user's programming preferences and the smart channel tuner list varies as a function of a time slot for programs occupying the subset of the plurality of second channels in the course of the user's interaction with the content presentation system.

2. The method of claim 1 wherein the user is determined using identification information selected from the list consisting of: biometrics, voice activation, fingerprint, user-entered password, use of a unique key on a remote device by which the user interacts with the content presentation system, use of a unique remote device by which the user interacts with the content presentation system, and combinations thereof.

3. The method of claim 2 wherein determining an identity of a user includes comparing said identification information with a pre-existing database of identification information.

4. The method of claim 1 wherein the value for one channel of the plurality of second channels is determined as a ratio of the number of channel switches from said first channel to said one channel to a total number of channel switches from said first channel to any other channel over a predetermined time period.

5. The method of claim 4 wherein said predetermined time period is approximately one half hour.

6. The method of claim 4 wherein said predetermined time period is approximately an hour.

7. The method of claim 4 wherein said predetermined time period is approximately one day.

8. The method of claim 4 wherein said predetermined time period is less than or equal to one week.

9. The method of claim 4 wherein said predetermined time period is more than one week.

10. The method of claim 4 wherein said predetermined time period corresponds to a predetermined time slot.

11. The method of claim 10 wherein said predetermined time slot recurs on a daily basis.

12. The method of claim 10 wherein said predetermined time slot recurs on a weekly basis.

13. The method of claim 1 wherein the subset of the plurality of second channels only includes ones of the plurality of second channels that have a all the determined value greater than a predetermined amount.

14. The method of claim 1 wherein the subset of the plurality of second channels only includes ones of the plurality of second channels that have the determined value for a predetermined time slot greater than a predetermined amount.

15. The method of claim 1 wherein the subset of the plurality of second channels includes a channel immediately adjacent to said first channel.

16. The method of claim 1 wherein said content presentation system is selected from the group consisting of: a television, a radio, an internet-connected device, a music playing device, a portable entertainment device, a personal digital assistant, a cellular phone/information system, and combinations thereof.

17. The method of claim 1 wherein the identity of the user is determined by employing identification information provided from a unique remote device associated with the user, wherein the user interacts with the content presentation system via the unique remote device.

18. The method of claim 17 wherein the remote device is at least one of a personal digital assistant and a telephone.

19. The method of claim 1, further comprising removing, from the plurality of second channels, another subset of the second channels that have been viewed by the user less than a predetermined amount of time.

20. A system for creating a smart channel tuner list, comprising:
   circuitry for determining an identity of a user interacting with a content presentation system;
   circuitry for collecting channel switching information in a content provider from said first channel to each of a plurality of second channels from the user's interaction with the content presentation system; wherein the channel switching information includes the identity of the user, and time data that identifies each time the user switches to a given one of the plurality of second channels;
   circuitry for determining a value for each of the plurality of second channels as a function of the channel switching information; and
   circuitry for creating a smart channel tuner list that includes a subset of the plural channels as a function of the determined value and the identity of the user and wherein the smart channel tuner list characterizes the user's programming preferences and the smart channel tuner list varies as a function of a time slot for programs occupying the subset of the plurality of second channels in the course of the user's interaction with the content presentation system.

21. The system of claim 20 wherein the user is determined using identification information selected from the list consisting of: biometrics, voice activation, fingerprint, user-entered password, use of a unique key on a remote device by which the user interacts with the content presentation system, use of a unique remote device by which the user interacts with the content presentation system, and combinations thereof.

22. The system of claim 21 wherein said circuitry for determining an identity of a user includes circuitry for comparing said identification information with a pre-existing database of identification information.

23. The system of claim 20 wherein said circuitry for determining the value for said one channel of the plurality of second channels includes circuitry for determining a ratio of the number of channel switches from said first channel to said one channel to a total number of channel switches from said first channel to any other channel over a predetermined time period.

24. The system of claim 23 wherein said predetermined time period is approximately one half hour.

25. The system of claim 23 wherein said predetermined time period is approximately an hour.

26. The system of claim 23 wherein said predetermined time period is approximately one day.

27. The system of claim 23 wherein said predetermined time period is less than or equal to one week.

28. The system of claim 23 wherein said predetermined time period is more than one week.

29. The system of claim 23 wherein said predetermined time period corresponds to a first predetermined time slot.

30. The system of claim 29 wherein said predetermined time slot recurs on a daily basis.

31. The system of claim 29 wherein said predetermined time slot recurs on a weekly basis.

32. The system of claim 20 wherein the subset of the plurality of second channels only includes ones of the plurality of second channels that have the determined value greater than a predetermined amount.

33. The system of claim 20 wherein the subset of the plurality of second channels only includes ones of the plurality of second that have the determined value for a predetermined time slot greater than a predetermined amount.

34. The system of claim 20 wherein the subset of the plurality of second channels includes a channel immediately adjacent to said first channel.

35. The system of claim 20 wherein said content presentation system is selected from the group consisting of: a television, a radio, an internet-connected device, a music playing device, a portable entertainment device, a personal digital assistant, a cellular phone/information system, and combinations thereof.

36. A system for switching from a first channel provided by a content provider to a second channel provided by the content provider, comprising:
   determining an identity of a user interacting with a content presentation system;
   collecting in the content provider channel switching information from said first channel to each of a plurality of second channels from the user's interaction with the content presentation system;
   determining a value for each of the plurality of second channels as a function of the channel switching information; and switching from said first channel to one of said second channels as a function of the determined value, wherein the one of the second channels selected for the switching varies as a function of a time slot for a program occupying the one of the second channels in the course of the user's interaction with the content presentation system.

37. The method of claim 36 wherein the user is determined using identification information selected from the list consisting of: biometrics, voice activation, fingerprint, user-entered password, use of a unique key on a remote device by which the user interacts with the content presentation system, use of a unique remote device by which the user interacts with the content presentation system, and combinations thereof.

38. The method of claim 37 wherein determining an identity of a user includes comparing said identification information with a pre-existing database of identification information.

39. The method of claim 36 wherein the value for one channel of the plurality of second channels is determined as a ratio of the number of channel switches from said first channel to said one channel to a total number of channel switches from said first channel to any other channel over a predetermined time period.

40. The method of claim 39 wherein said predetermined time period is approximately one half hour.

41. The method of claim 39 wherein said predetermined time period is approximately an hour.

42. The method of claim 39 wherein said predetermined time period is approximately one day.

43. The method of claim 39 wherein said predetermined time period is less than or equal to one week.

44. The method of claim 39 wherein said predetermined time period is more than one week.

45. The method of claim 39 wherein said predetermined time period corresponds to a predetermined time slot.

46. The method of claim 45 wherein said predetermined time slot recurs on a daily basis.

47. The method of claim 45 wherein said predetermined time slot recurs on a weekly basis.

48. The method of claim 36 wherein said smart channel tuner list only includes ones of the plurality of second channels that have the determined value greater than a predetermined amount.

49. The method of claim 36 wherein said smart channel tuner list only includes ones of the plurality of second channels that have the determined value for a predetermined time slot greater than a predetermined amount.

50. The method of claim 36 wherein said smart channel tuner list includes a channel immediately adjacent to said first channel.

51. The method of claim 36 wherein said content presentation system is selected from the group consisting of: a television, a radio, an internet-connected device, a music playing device, a portable entertainment device, a personal digital assistant, a cellular phone/information system, and combinations thereof.

52. The method of claim 36 further comprising creating a smart channel tuner list as a function of the channel switching information.

53. The method of claim 52 further comprising using a first tuner for accessing said first channel and using a second tuner for accessing one of the plurality of second channels.

54. The method of claim 52 further comprising using a first decoder for presenting said first channel on said content provider and using a second decoder for one of the plurality of second channels.

55. A system for switching from a first channel provided by a content provider to a second channel provided by the content provider, comprising:
circuitry for determining an identity of a user interacting with a content presentation system;
circuitry for collecting channel switching information in the content provider from said first channel to each of a plurality of second channels from the user's interaction with the content presentation system;
circuitry for determining a value for each of the plurality of second channels as a function of the channel switching information; and
circuitry for switching from said first channel to one of said second channels as a function of the determined value and the identity of the user, wherein the one of the second channels selected for the switching varies as a function of a time slot for a program occupying the one of the second channels in the course of the user's interaction with the content presentation system.

56. The system of claim 55 wherein the user is determined using identification information selected from the list consisting of: biometrics, voice activation, fingerprint, user-entered password, use of a unique key on a remote device by which the user interacts with the content presentation system, use of a unique remote device by which the user interacts with the content presentation system, and combinations thereof.

57. The system of claim 56 wherein said circuitry for determining an identity of a user includes circuitry for comparing said identification information with a pre-existing database of identification information.

58. The system of claim 55 wherein said circuitry for determining the value for one channel of the plurality of second channels includes circuitry for determining a ratio of the number of channel switches from said first channel to said one channel to a total number of channel switches from said first channel to any other channel over a predetermined time period.

59. The system of claim 58 wherein said predetermined time period is approximately one half hour.

60. The system of claim 58 wherein said predetermined time period is approximately an hour.

61. The system of claim 58 wherein said predetermined time period is approximately one day.

62. The system of claim 58 wherein said predetermined time period is less than or equal to one week.

63. The system of claim 58 wherein said predetermined time period is more than one week.

64. The system of claim 58 wherein said predetermined time period corresponds to a predetermined time slot.

65. The system of claim 64 wherein said predetermined time slot recurs on a daily basis.

66. The system of claim 64 wherein said predetermined time slot recurs on a weekly basis.

67. The system of claim 55 wherein said smart channel tuner list only includes ones of the plurality of second channels that have the determined value greater than a predetermined amount.

68. The system of claim 55 wherein said smart channel tuner list only includes ones of the plurality of second channels that have the determined value for a predetermined time slot greater than a predetermined amount.

69. The system of claim 55 wherein said smart channel tuner list includes a channel immediately adjacent to said first channel.

70. The method of claim 55 wherein said content presentation system is selected from the group consisting of: a television, a radio, an internet-connected device, a music playing device, a portable entertainment device, a personal digital assistant, a cellular phone/information system, and combinations thereof.

71. The system of claim 55 further comprising circuitry for creating a smart channel tuner list as a function of the channel switching information.

72. The system of claim 71 further comprising a first tuner for accessing said first channel and a second tuner for accessing one of the plurality of second channels.

73. The system of claim 72 further comprising a first decoder for presenting said first channel and a second decoder for decoding one of the plurality of second channels.

\* \* \* \* \*